(12) United States Patent
Kaufmann et al.

(10) Patent No.: US 11,379,494 B2
(45) Date of Patent: Jul. 5, 2022

(54) TIMELINE INDEX FOR PARTITIONED TEMPORAL DATABASE TABLES

(71) Applicants:Martin Kaufmann, Zurich (CH); Norman May, Karlsruhe (DE); Elias Yousefi Amin Abadi, Basel (CH); Anil Kumar Goel, Waterloo (CA); Chang Ge, Waterloo (CA); Andreas Luethi, Buchs AG (CH); Puspanantha Shanmuganathan, Zurich (CH); Donald Kossmann, Zurich (CH)

(72) Inventors: Martin Kaufmann, Zurich (CH); Norman May, Karlsruhe (DE); Elias Yousefi Amin Abadi, Basel (CH); Anil Kumar Goel, Waterloo (CA); Chang Ge, Waterloo (CA); Andreas Luethi, Buchs AG (CH); Puspanantha Shanmuganathan, Zurich (CH); Donald Kossmann, Zurich (CH)

(73) Assignee: SAP SE, Walldorf (DE)

( * ) Notice: Subject to any disclaimer, the term of this patent is extended or adjusted under 35 U.S.C. 154(b) by 939 days.

(21) Appl. No.: 14/453,546

(22) Filed: Aug. 6, 2014

(65) Prior Publication Data
US 2016/0042039 A1 Feb. 11, 2016

(51) Int. Cl.
*G06F 16/2458* (2019.01)
*G06F 16/2455* (2019.01)

(52) U.S. Cl.
CPC ...... *G06F 16/2477* (2019.01); *G06F 16/2456* (2019.01)

(58) Field of Classification Search
CPC .......................... G06F 16/2477; G06F 16/2456
USPC .......................................................... 707/804
See application file for complete search history.

(56) References Cited

U.S. PATENT DOCUMENTS

| 8,301,652 B2 * | 10/2012 | Zhou .................. G06F 16/2477 707/769 |
| 2014/0172804 A1 | 6/2014 | Kaufmann et al. |
| 2015/0169697 A1 | 6/2015 | Kaufmann et al. |

OTHER PUBLICATIONS

Nascimento, Mario A., and Margaret H. Dunham. "Indexing valid time databases via B/sup+/-trees." IEEE Transactions on Knowledge and Data Engineering 11.6 (1999): 929-947.*
Gao, Dengfeng, et al. "Main memory-based algorithms for efficient parallel aggregation for temporal databases." Distributed and Parallel Databases 16.2 (2004): 123-163.*
Salzberg, Betty, and Vassilis J. Tsotras. "Comparison of access methods for time-evolving data." ACM Computing Surveys (CSUR) 31.2 (1999): 158-221. (Year: 1999).*

(Continued)

*Primary Examiner* — Mohsen Almani
(74) *Attorney, Agent, or Firm* — Klarquist Sparkman, LLP

(57) ABSTRACT

Partitioning of temporal databases can implement distributed storage of temporal data via time-based or space-based techniques to improve performance of operators on the database. A variety of operators can be supported for the partitioned tables, including temporal aggregation, time travel, and temporal join. The use of checkpoints can greatly increase performance in a variety of scenarios. The described partitioning techniques can be applied in a parallel execution context to great benefit. The partitioning can also reduce local memory footprint, facilitating in-memory database processing.

20 Claims, 52 Drawing Sheets

(56) References Cited

OTHER PUBLICATIONS

Chang et al., "Temporal Query Processing using Spatially-Partitioned Method," Duk-Ho Chang Electronics, CODAS 1996: 436-429, 4 pages.
Gao et al., "Join Operations in temporal databases," VLDB Journal, DOI 0.1007/s00778-003-0111-3, 2005, 28 pages.
Kaufmann et al., "Comprehensive and Interactive Temporal Query Processing with SAP HANA," Aug. 26-30, 2013, Riva del Garda, Trento, Italy, Proceedings of the VLDB Endowment, vol. 6, No. 12, 4 pages.
Kaufmann, "Storing and Processing Temporal Data in a Main Memory Column Store," Proceedings of the VLDB Endowment, vol. 6, No. 12, Aug. 2013, 6 pages.
Kaufmann et al., "Timeline Index: A Unified Data Structure for Processing Queries on a Temporal Data in SAP HANA," SIGMOD '13, Jun. 22-27, 2013, New York, New York, 12 pages.
Sikka et al., "SAP HANA: The Evolution from a Modem Main-Memory Data Platform to an Enterprise Application Platform," VLDB2013, $39^{th}$ International Conference on Very Large Data Bases, Nov. 2012, 2 pages.
Soo et al., "Efficient Evaluation of the Valid-Time Natural Join," Proceedings of the Tenth International Conference on Data Engineering, Jun. 7, 1993, 28 pages.
Walter et al., "Teradata Database 13.10 Overview," Apr. 28, 2010, 43 pages.

\* cited by examiner

Checkpoint 1 (Version 100)

| Key | Partition | ROW_ID |
|-----|-----------|--------|

Checkpoint 2 (Version 103)

| Key | Partition | ROW_ID |
|-----|-----------|--------|
| Alice | 1 | 1 |
| Bob | 1 | 2 |
| Carl | 1 | 3 |

Checkpoint 3 (Version 106)

| Key | Partition | ROW_ID |
|-----|-----------|--------|
| Bob | 1 | 2 |
| Carl | 1 | 3 |
| Ellen | 2 | 2 |
| John | 2 | 3 |

Node 1 : Partition 1
(101 – 103)

| # | Name | Bal |
|---|------|-----|
| 1 | Alice | $200 | 101 | 104 |
| 2 | Bob | $500 | 102 | 107 |
| 3 | Carl | $300 | 103 | ∞ |

| Version | Events |
|---------|--------|
| 101 | +1.1 |
| 102 | +1.2 |
| 103 | +1.3 |
| 104 | -1.1 |
| 107 | -1.2 |

Node 2 : Partition 2
(104 – 106)

| 1 | Alice | $100 | 104 | 106 |
| 2 | Ellen | $200 | 105 | ∞ |
| 3 | John | $300 | 105 | 108 |

| Version | Events |
|---------|--------|
| 104 | +2.1 |
| 105 | +2.2, +2.3 |
| 106 | -2.1 |

Node 1 : Partition 3
(107 – 109)

| Version | Events |
|---------|--------|

| # | Name | Bal | From | To |
|---|------|-----|------|-----|
| 1 | Alice | $200 | 101 | 104 |
| 2 | Bob | $500 | 102 | 107 |
| 3 | Carl | $300 | 103 | ∞ |
| 4 | Alice | $100 | 104 | 106 |
| 5 | Ellen | $200 | 105 | ∞ |
| 6 | John | $300 | 105 | 108 |

FIG. 24

Node 1 : Partition 1
(101 – 103)

| # | Alias | Bal | Version | | |
|---|---|---|---|---|---|
| 1 | Alice | $200 | 101 | | 104 |
| 2 | Bob | $500 | 102 | | 107 |
| 3 | Carl | $300 | 103 | | ∞ |

| Version | Sum | |
|---|---|---|
| 101 | $200 | +$200 |
| 102 | $700 | +$500 |
| 103 | $1000 | +$300 |
| >104 | $800 | -$200 |
| >107 | $300 | -$500 |

| # | Alias | Bal | From | To |
|---|---|---|---|---|
| 1 | Alice | $200 | 101 | 104 |
| 2 | Bob | $500 | 102 | 107 |
| 3 | Carl | $300 | 103 | ∞ |
| 4 | Alice | $100 | 104 | 106 |
| 5 | Ellen | $200 | 105 | ∞ |
| 6 | John | $300 | 105 | 108 |

Node 2 : Partition 2
(104 – 106)

| | | | | | |
|---|---|---|---|---|---|
| 1 | Alice | $100 | 104 | | 106 |
| 2 | Ellen | $200 | 105 | | ∞ |
| 3 | John | $300 | 105 | | 108 |

| Version | Sum | |
|---|---|---|
| 104 | $100 | +$100 |
| 105 | $600 | +$500 |
| 106 | $500 | -$100 |
| >108 | | -$300 |

Node 1 : Partition 3
(107 – 109)

| Version | Sum |
|---|---|
| - | - |

Join Computation per Partition

4000

Computing Global Result

Node 1 : Partition 1
(A - K)

| 1 | Alice | $200 | 101 | 104 |
| 2 | Alice | $100 | 104 | 106 |
| 3 | Ellen | $200 | 105 | ∞ |

| Version | Sum | |
|---|---|---|
| 101 | $200 | |
| 102 | $200 | +$200 |
| 103 | $200 | |
| 104 | $100 | -$200, +$100 |
| 105 | $300 | +$200 |
| 106 | $200 | -$100 |
| 107 | $200 | |
| 108 | $200 | |

Node 2 : Partition 2
(J - M)

| 1 | Mallet | $300 | 103 | ∞ |

| Version | Sum | |
|---|---|---|
| 101 | $0 | |
| 102 | $0 | |
| 103 | $300 | +$300 |
| 104 | $300 | |
| 105 | $300 | |
| 106 | $300 | |
| 107 | $300 | |
| 108 | $300 | |

Node 1 : Partition 3
(N - Z)

| 1 | Wendy | $500 | 102 | 105 |
| 2 | Trent | $300 | 105 | 107 | 108 |

| Version | Sum | |
|---|---|---|
| 101 | $0 | |
| 102 | $500 | +$500 |
| 103 | $500 | |
| 104 | $500 | |
| 105 | $800 | +$300 |
| 106 | $800 | |
| 107 | $300 | -$500 |
| 108 | $0 | -$300 |

FIG. 45

Global Result

| Version | Sum |
|---|---|
| 101 | $200 |
| 102 | $700 |
| 103 | $1000 |
| 104 | $900 |
| 105 | $1400 |
| 106 | $1300 |
| 107 | $800 |
| 108 | $500 |

=

Node 1 : Partition 3 (N - Z)

| Version | Sum |
|---|---|
| 101 | $0 |
| 102 | $500 |
| 103 | $500 |
| 104 | $500 |
| 105 | $800 |
| 106 | $800 |
| 107 | $300 |
| 108 | $0 |

+

Node 2 : Partition 2 (J - M)

| Version | Sum |
|---|---|
| 101 | $0 |
| 102 | $0 |
| 103 | $300 |
| 104 | $300 |
| 105 | $300 |
| 106 | $300 |
| 107 | $300 |
| 108 | $300 |

+

Node 1 : Partition 1 (A - K)

| Version | Sum |
|---|---|
| 101 | $200 |
| 102 | $200 |
| 103 | $200 |
| 104 | $100 |
| 105 | $300 |
| 106 | $200 |
| 107 | $200 |
| 108 | $200 |

FIG. 46

Node 1 : Partition 1 (A - K)

| | | | |
|---|---|---|---|
| 1 | Alice | $200 | 101 104 |
| 2 | Alice | $100 | 104 106 |
| 3 | Ellen | $200 | 105 ∞ |

| Version | Max | |
|---|---|---|
| 101 | $200 | $200 > ∞ |
| 102 | $200 | |
| 103 | $200 | |
| 104 | $100 | $100 > 0 |
| 105 | $200 | $200 > $100 |
| 106 | $200 | $200 > 0 |
| 107 | $200 | |
| 108 | $200 | |

Node 2 : Partition 2 (J - M)

| | | | |
|---|---|---|---|
| 1 | Mallet | $300 | 103 ∞ |

| Version | Max | |
|---|---|---|
| 101 | -∞ | |
| 102 | -∞ | |
| 103 | $300 | $300 > ∞ |
| 104 | $300 | |
| 105 | $300 | |
| 106 | $300 | |
| 107 | $300 | |
| 108 | $300 | |

Node 1 : Partition 3 (N - Z)

| | | | |
|---|---|---|---|
| 1 | Wendy | $500 | 102 107 |
| 2 | Trent | $300 | 105 108 |

| Version | Max | |
|---|---|---|
| 101 | -∞ | |
| 102 | $500 | $500 > -∞ |
| 103 | $500 | |
| 104 | $500 | |
| 105 | $500 | $500 > $300 |
| 106 | $500 | |
| 107 | $300 | $300 > 0 |
| 108 | -∞ | 0 > -∞ |

FIG. 47

Max(

Node 1 : Partition 1
(A - K)

| eID | Bal |
|---|---|
| 101 | $200 |
| 102 | $200 |
| 103 | $200 |
| 104 | $100 |
| 105 | $200 |
| 106 | $200 |
| 107 | $200 |
| 108 | $200 |

,

Node 2 : Partition 2
(J - M)

| eID | Bal |
|---|---|
| 101 | $0 |
| 102 | $0 |
| 103 | $300 |
| 104 | $300 |
| 105 | $300 |
| 106 | $300 |
| 107 | $300 |
| 108 | $300 |

,

Node 1 : Partition 3
(N - Z)

| eID | Bal |
|---|---|
| 101 | $0 |
| 102 | $500 |
| 103 | $500 |
| 104 | $500 |
| 105 | $500 |
| 106 | $500 |
| 107 | $300 |
| 108 | $0 |

)

=

Result

| eID | Bal |
|---|---|
| 101 | $200 |
| 102 | $500 |
| 103 | $500 |
| 104 | $500 |
| 105 | $500 |
| 106 | $500 |
| 107 | $300 |
| 108 | $300 |

FIG. 49

Node 1 : Partition 1 (PK: A – B)

Customers co

| # | PK | Name | Start | End |
|---|----|------|-------|-----|
| 1.1 | a | Alice | 101 | ∞ |
| 1.2 | b | Bob | 102 | ∞ | co.index

| Version | Events |
|---------|--------|
| 101 | + 1.1 |
| 102 | + 1.2 |

Orders ors

| # | PK | FK | Value | Start | End |
|---|----|----|-------|-------|-----|
| 1.1 | o | a | 400 | 101 | 105 |
| 1.2 | p | b | 200 | 102 | 106 |
| 1.3 | q | a | 300 | 104 | ∞ |
| 1.4 | u | a | 434 | 105 | ∞ |
| 1.5 | t | b | 600 | 106 | ∞ | ors.index

| Version | Events |
|---------|--------|
| 101 | + 1.1 |
| 102 | + 1.2 |
| 104 | + 1.3 |
| 105 | – 1.1, + 1.4 |
| 106 | – 1.2, + 1.5 |

Node 2 : Partition 2 (PK: C – D)

Customers co

| # | PK | Name | Start | End |
|---|----|------|-------|-----|
| 2.1 | c | Charlie | 104 | 106 |
| 2.2 | d | Dave | 106 | ∞ | co.index

| Version | Events |
|---------|--------|
| 104 | + 2.1 |
| 106 | – 2.1, + 2.2 |

Orders ors

| # | PK | FK | Value | Start | End |
|---|----|----|-------|-------|-----|
| 2.1 | r | c | 200 | 104 | 105 |
| 2.2 | s | c | 500 | 105 | 106 |
| 2.3 | t | d | 600 | 106 | ∞ | ors.index

| Version | Events |
|---------|--------|
| 104 | + 2.1 |
| 105 | – 2.1, + 2.2 |
| 106 | – 2.2, + 2.3 |

Node 2 : Partition 2

| Join Index : Partition 2 | |
|---|---|
| 104 | + (2.1, 2.1) |
| 105 | - (2.1, 2.1) |
|     | + (2.1, 2.2) |
| 106 | - (2.1, 2.2) |
|     | + (2.2, 2.3) |

| Join Index | |
|---|---|
| 101 | + (1.1, 1.1) |
| 102 | + (1.2, 1.2) |
|     | + (1.1, 1.3) |
| 104 | + (2.1, 2.1) |
| 105 | - (1.1, 1.1) |
|     | + (1.1, 1.4) |
|     | - (2.1, 2.1) |
|     | + (2.1, 2.2) |
|     | + (1.2, 1.2) |
|     | +(1.2, 1.5) |
| 106 | - (2.1, 2.2) |
|     | + (2.2, 2.3) |

Node 1 : Partition 1

| Join Index : Partition 1 | |
|---|---|
| 101 | + (1.1, 1.1) |
| 102 | + (1.2, 1.2) |
| 104 | + (1.1, 1.3) |
| 105 | - (1.1, 1.1) |
|     | + (1.1, 1.4) |
| 106 | - (1.2, 1.2) |
|     | +(1.2, 1.5) |

TIMELINE INDEX FOR PARTITIONED TEMPORAL DATABASE TABLES

BACKGROUND

Today's computing environment is often characterized by large data sets. Although impressive technologies have evolved to efficiently handle such large data sets, software developers continue to push the envelope to new limits. For example, systems already have techniques for handling database operations on large data sets, but such systems are typically lacking with advanced support for temporal operators. Therefore, developers often create their own custom approaches to dealing with temporal operators, leading to added complexity during the development process. Further, such custom approaches typically suffer from scalability and maintainability problems.

Thus, there is a need for technologies to better address processing large data sets with temporal operators.

SUMMARY

The summary is provided to introduce a selection of concepts in a simplified form that are further described below in the detailed description. The summary is not intended to identify key features or essential features of the claimed subject matter, nor is it intended to be used to limit the scope of the claimed subject matter.

An embodiment can be implemented as a method implemented at least in part by a computing system, the method comprising for a database table timeline index represented as a plurality of partial timeline indexes associated with respective partitions of a temporal database table partitioned according to a temporal partition technique, generating a plurality of partial results of a temporal operator calculation with the partial timeline indexes; and generating a global result of the temporal operator calculation, wherein the generating comprises combining the partial results.

An embodiment can be implemented as a system comprising one or more computer-readable media comprising a plurality of partial timeline indexes indexing a plurality of respective partitions of a temporal table, wherein a given partial timeline index out of the partial timeline indexes associated with a particular partition of the temporal table stores references to one or more tuples activated within the particular partition, references to one or more tuples invalidated within the particular partition, and references to one or more tuples invalidated in a subsequent partition.

An embodiment can be implemented as one or more computer-readable media comprising computer-executable instructions causing a computing system to perform a method comprising, for a temporal database table distributed into a plurality of partitions according to a system time represented by a global transaction number, calculating in parallel a plurality of partial results for a temporal operator, wherein the calculating comprises consulting a plurality of distributed partial timeline indexes with locations of tuples activating records within system time intervals associated with respective of the partitions, wherein the distributed partial timeline indexes comprise a local component and a foreign component, and wherein the calculating comprises consulting a plurality of checkpoints associated with respective of the partitions; combining the plurality of partial results into a global result for the temporal operator; and outputting the global result.

BRIEF DESCRIPTION OF THE DRAWINGS

FIG. 17 is block diagram of an example system implementing checkpoints in a partition-by-time scenario.

FIGS. 23, 24, and 25 show execution of a temporal cumulative aggregation operator in parallel in a partition-by-time scenario.

FIG. 44 is a block diagram showing calculation of a cumulative aggregation operator in parallel in a partition-by-space scenario.

FIG. 45 shows concentrating partial results of a cumulative aggregation operator in a partition-by-space scenario.

FIG. 46 is a block diagram showing calculation of a selective aggregation operator in parallel in a partition-by-space scenario.

FIG. 47 shows concentrating partial results of a selective aggregation operator in a partition-by-space scenario.

FIG. 49 is a block diagram showing calculation of a temporal join operator in parallel in a partition-by-space scenario.

DETAILED DESCRIPTION

Example 1—Overview

The technologies described herein can be used for a variety of temporal query scenarios. Both time-based and space-based temporal partition techniques can be supported.

Storage and processing of partitions can be distributed to implement parallel processing of partial results that can then be combined into a global, overall result, thereby greatly increasing overall performance in challenging temporal operator processing scenarios.

Distributed storage can result in a smaller local memory footprint, facilitating in-memory processing of partial results.

As the demand for temporal operators increases in the face of analytics, compliance, and other use cases, the technologies herein can be used to further push the processing envelope, thereby opening up more possibilities to developers and end users in big data environments.

Parallelizable temporal operators can be provided as built-in functionality, relieving developers from having to develop and maintain their own solutions or workarounds.

As described herein, the technologies can be employed by software developers to improve the performance of software that incorporates temporal operators and reduce errors during development. End users also benefit because the programs exhibit improved performance and correctness.

Various other features can be implemented and combined as described herein.

Example 2—Example System Implementing Timeline Index Technologies

Figure 1:
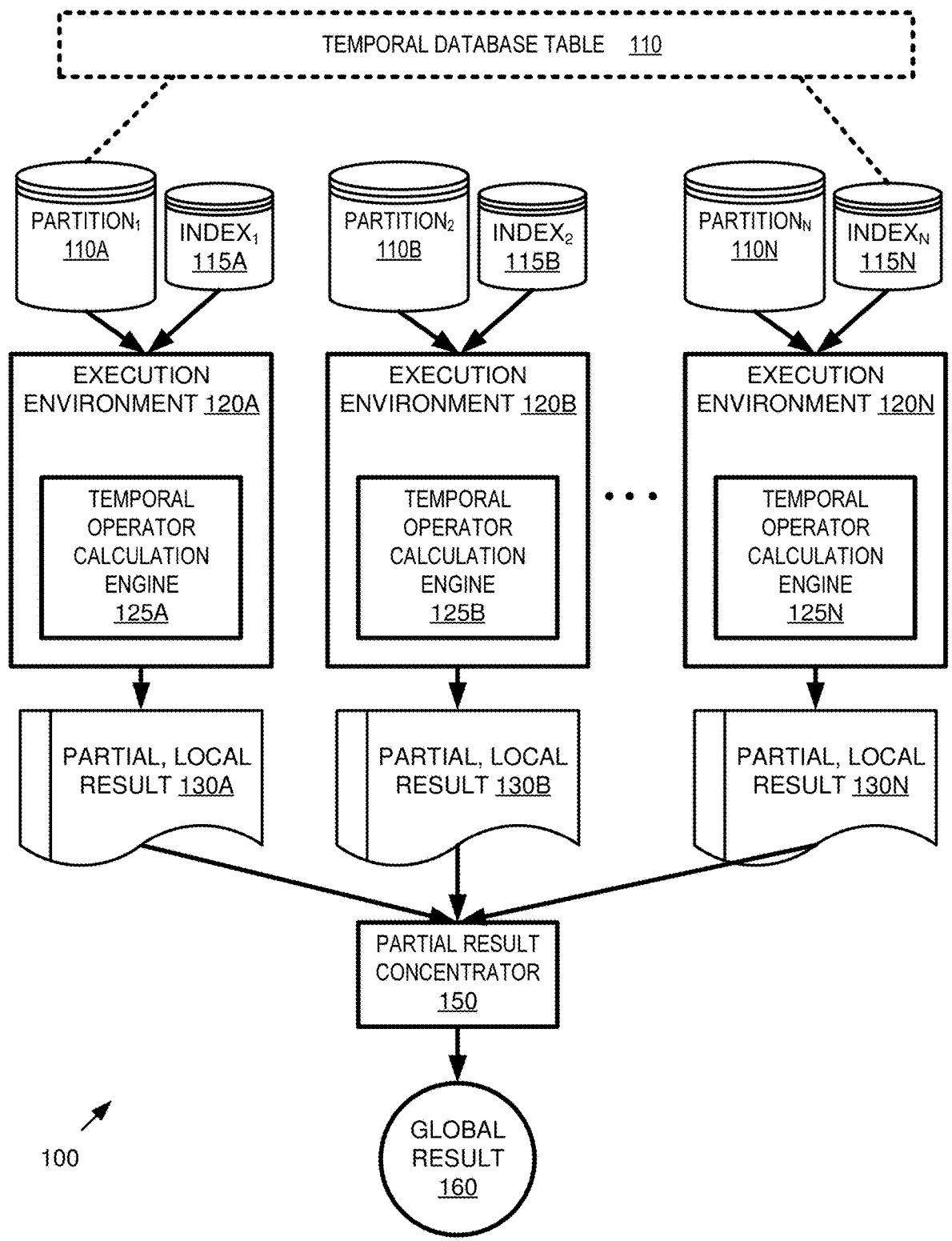
FIG. 1 is a block diagram of an example system implementing a plurality of partial timeline indexes associated with respective partitions of a temporal database table.

FIG. 1 is a block diagram of an example system 100 implementing a plurality of partial timeline indexes 115A-N associated with respective partitions 110A-N of a temporal database table 110. In the example, a temporal database table 110 is partitioned according to a temporal partition technique as described herein. The temporal database table 110 is shown for illustration purposes and can be implemented collectively by the partitions 110A-N in practice.

A particular partition (e.g., 110A) is associated with a particular partial timeline index (e.g., 115A). As described herein, some implementations comprise a checkpoint (not shown) that is also associated with the partition (e.g., 110A).

Although not required, a system can implement parallel processing as shown by implementing a plurality of execution environments 120A-N that execute respective temporal operator calculation engines 125A-N outputting partial, local results 130A-N. The partial, local results 130A-N are then accepted as input by a partial result concentrator 150 that outputs a global (e.g., overall) result 160 of the temporal operator calculation according to the temporal database table 110 (e.g., as represented by the partitions 110A-N in consultation with the indexes 115A-N).

In practice, the systems shown herein, such as system 100 can vary in complexity, with different functionality, components of differing complexity, and the like. Further, although a single table 110 is shown, a large number of tables, some with large numbers of records can be supported. Also, the execution environments 120A-N can comprise a variety of other functionality not shown to address synchronization, security, load balancing, redundancy, and the like. Locality of information can also be managed for performance.

Although various components of the systems herein are shown as a single component, in practice, the boundaries between components can be changed. For example, although the partitions 110A-N and the indexes 115A-N are shown as separate in the illustration, in practice, they can be stored together. The functionality can be implemented across one or more machines, virtual or physical.

The system 100, any of the other systems described herein, and subsets of such systems can be implemented in conjunction with any of the hardware components described herein, such as the computing systems described below (e.g., processing units, memory, and the like). In any of the examples herein, the inputs, outputs, databases, indexes, checkpoints, and the like can be stored in one or more computer-readable storage media or computer-readable storage devices. The technologies described herein can be generic to the specifics of operating systems or hardware and can be applied in any variety of environments to take advantage of the described features.

Figure 2:
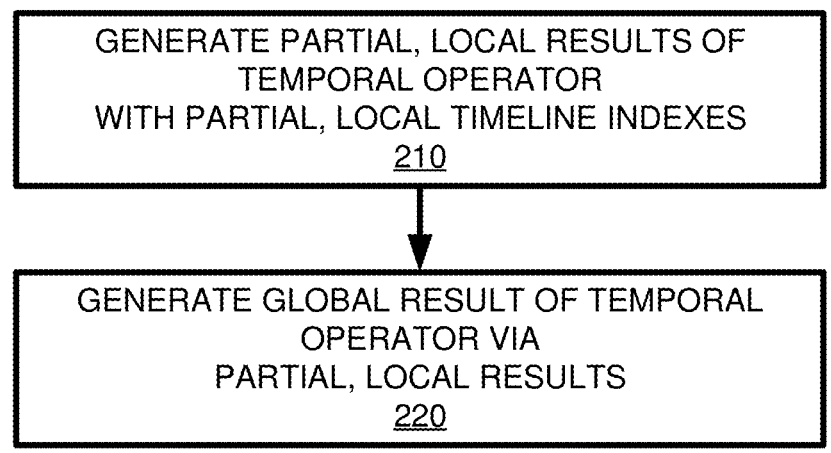
FIG. 2 is a flowchart of an example method of calculating a temporal operator via a plurality of partial timeline indexes associated with respective partitions of a temporal database table.
Figure 2:

Example 3—Example Method Calculating a Temporal Operator Via Timeline Index Technologies FIG. 2 is a flowchart of an example method 200 of calculating a temporal operator via a plurality of partial timeline indexes associated with respective partitions of a temporal database table and can be implemented, for example, in the system shown in FIG. 1. As described herein, such an approach can be used with a variety of temporal operators in conjunction with timeline indexes.

At 210, partial, local results of a temporal operator performed on a database table (e.g., stored as plural partitions as described herein) are generated with the local, partial timeline indexes. As described herein, such processing can be performed via plural partial calculations for a plurality of respective temporal database table partitions. Thus, for a database table timeline index represented as a plurality of partial timeline indexes (e.g., associated with respective partitions of a temporal database partitioned according to a temporal partition technique), a plurality of partial results of a temporal operator calculation can be generated with the partial timeline indexes.

Although not explicitly shown in FIG. 2, the method can also include consulting a checkpoint associated with a given partition of the temporal database table. The checkpoint can indicate which tuples of the temporal database are visible at a particular point in time in order to limit the amount of data that is scanned to retrieve a particular point in time.

At 220, a global result of the temporal operator is generated via the partial, local results (e.g., the results of a plurality of partial calculations). Thus, a global result of the temporal operator result calculation can be generated. Such generating includes combining the partial results. Combining is sometimes called "concentrating" herein.

The global result can then be output. Although a single result is shown, in practice, temporal operators can be strung together or otherwise combined to implement any number of queries comprising one or more temporal operators.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4—Example Temporal Database Table

In any of the examples herein, a temporal database table can be implemented to incorporate a time element into queries. Such a table is typically implemented by associating a start and end time with tuples in the table. Thus, a tuple is considered valid within the time interval. (e.g., (a,b] is the validity interval, where the tuple is valid starting at and including time a, and is invalid starting at and including time b). Although some implementations show two additional columns indicating a validation and invalidation time, in practice, such a table can be implemented in a variety of ways, depending on design considerations that can be independent of the technologies described herein. For purposes of explanation, a start and end time is shown for a tuple to illustrate the time interval during which the tuple was valid. So, a temporal database table can have the following two entries:

TABLE 1

Example Rows in Temporal Database Table

| Row | Key | Start | End |
|---|---|---|---|
| 1 | Alice | 101 | 104 |
| 2 | Alice | 104 | 106 |

In which case, row 1 is valid between time 101 and 104 (e.g., becomes invalid at time 104), and row 2 is valid between time 104 and 106. In other words, the first tuple was invalidated by the second tuple. However, in a temporal table, data for deleted entries is essentially not discarded. As a result, the size of a temporal table can grow to be quite large over time.

Under some circumstances, the temporal aspect of a table may not be of interest. In such a case, a current table can be presented without including temporal information (horizontal partitioning of the data). For example, a simple query of the above table at time 108 will simply show that neither row is present. Such a non-temporal table can be implemented as a separate table or provided as a function of the temporal table.

The time element of a temporal database table can represent an application or a system time. In the examples herein, emphasis is placed on system time (e.g., when a tuple was visible in the database), but the technologies can also be applied to other time scenarios. Application time can be implemented as a user-defined time dimension (e.g., indicating when a tuple or fact was valid in the real world).

Example 5—Example Temporal Database Table Partitions

In any of the examples herein, a temporal database table can be divided into a plurality of partitions. Both time-based (e.g., partition by time) and space-based (e.g., partition by space) temporal partition techniques can be implemented. In a time-based partition technique, the partitions are associated with respective time intervals. Tuples that are activated within the time interval are stored within the appropriate partition (e.g., the partition covering the time interval within which the tuple was activated). Thus, tuples of the temporal database table within different time intervals are grouped into different partitions.

Invalidations for such a tuple may occur outside of the time interval. To avoid duplication of the tuple in another partition, the tuple can be stored only once. Some implementations can store the invalidation twice in the index (e.g., once in the index associated with the time interval within which the tuple was activated and once in the index associated with the time interval within which the tuple was invalidated). As described herein, a foreign component of the partial timeline index can be employed to accommodate such situations. Various examples of time-based partition techniques and associated temporal operators are described herein.

In a space-based partition technique, the partitions are associated with respective sets of attribute values (e.g., of a primary key, foreign key, or other attribute(s) deemed important for temporal operations) of the database table. Thus, tuples of the temporal database table having different attribute values are grouped into different partitions. Various examples of space-based partition techniques and associated temporal operators are described herein.

In practice, a partition is associated with a particular partition identifier. In a time-based technique, given a time (e.g., version), a particular partition identifier can be determined. In a space-based technique, given a primary key, a particular partition identifier can be determined. Via the partition identifier, the partition, associated timeline index, and associated checkpoint can be referenced.

Example 6—Example Timeline Index

In any of the examples herein, a timeline index can be implemented to facilitate processing of temporal operators on temporal tables. The timeline index can indicate which tuples in the temporal table were activated and invalidated for different versions of the table. For example, for each version with a change, added tuples or removed tuples are indicated.

As described herein, a timeline index can be divided into a plurality of partial indexes, each index being associated with a particular partition of the temporal database, and thus the time interval associated with the particular partition. Such partial indexes are sometimes called the "timeline index." In other cases, "timeline index" refers to a local, partial timeline index, even though it is only a partial index.

As described herein, a partial timeline index can have both a local and foreign component to accommodate situations involving a tuple that is activated in one partition and invalidated in another.

Activations and invalidations can be represented as events in the timeline index. Temporal operator calculations can then be based on such events in the partial timeline index associated with a given partition.

Example 7—Example Distributed Data

In any of the examples herein, data for different partitions can be stored at different nodes or locations. For example, the plurality of partial timeline indexes can be stored at a plurality of different, distributed nodes or locations. So, a partial timeline index can be stored at the same node as the partition with which it is associated, and at a different node than another partition (e.g., that has its own partial timeline index stored with it). Such an arrangement can facilitate parallel processing and reduced local memory footprint to process the index in memory.

A given partition, associated timeline index, and associated checkpoint can be stored as a combined data collection, instances of which are distributed and implemented for parallel execution of temporal operators as described herein.

Because the data is divided into smaller parts, a local partition can be designed as small enough to benefit from in-memory database processing within the memory capabilities of the local node.

Example 8—Example Versions

In any of the examples herein, time (e.g., system time) for a temporal database table can be represented by a version (e.g., a number). Such a version can be implemented as a globally-unique number. Such a number can be a time indicator integrating both a transaction number (e.g., a number that conclusively identifies a particular transaction for the database that is performed according to the ACID properties of transactions) and a commit identifier, an identifier representing the time of a begin or end of a transaction, or the like. Thus, a timeline index can indicate which tuples are activated and invalidated for respective versions of the table.

Example 9—Example Temporal Operators

In any of the examples herein, temporal operators (or "operations") can take the form of any of a variety of temporal operators performed on one or more database tables.

Examples of supported temporal operators include temporal aggregations (e.g., cumulative aggregation, selective aggregation, and the like), time travel, and temporal join.

Examples of aggregations include SUM, COUNT, MINIMUM, MAXIMUM, AVERAGE, VARIANCE, STANDARD DEVIATION, and the like. A temporal aggregation computes an aggregation over time. The aggregated value is grouped by time (e.g., the maximum value is shown evolving over time for a plurality of versions of the database).

A time travel operator retrieves information from the database as it was at a given point of time. It logically gives a consistent snapshot of the data "AS OF" a particular point in time.

A temporal join shows how two temporal tables can be joined. As a result, it returns tuples from two tables that have been visible at the same time. Although examples show joins with two tables, in practice, joins can involve more than two tables.

Temporal operators can be invoked via queries on the database, via program code, via scripts, APIs, or the like.

In practice, temporal operators can be applied to address a wide variety of use cases, including analytics, compliance, and others. For example, a query can determine the value of unshipped orders at each point in time. Such a result can then be analyzed to optimize a supplier chain. Another example is to determine the values of products when they were ordered, However, the actual applications of temporal operators are virtually limitless.

Example 10—Example Parallel Execution

In any of the examples herein, a temporal operator can be executed using parallel execution techniques. For example, nodes executing in parallel can include plural, different cores in a single machine, plural, different machines, or the like. Machines can be physical or virtual (e.g., that ultimately execute on physical hardware). The nodes can be at different physical locations. The techniques described herein can be applied across a variety of parallel execution arrangements, such as independent execution for different partial results. When calculating partial results, the plurality of different partial results can be computed in parallel at a plurality of different, distributed nodes.

The distributed data techniques can facilitate such parallel execution by reducing communication overhead.

Example 11—Example System with Partial Timeline Indexes

Figure 3:
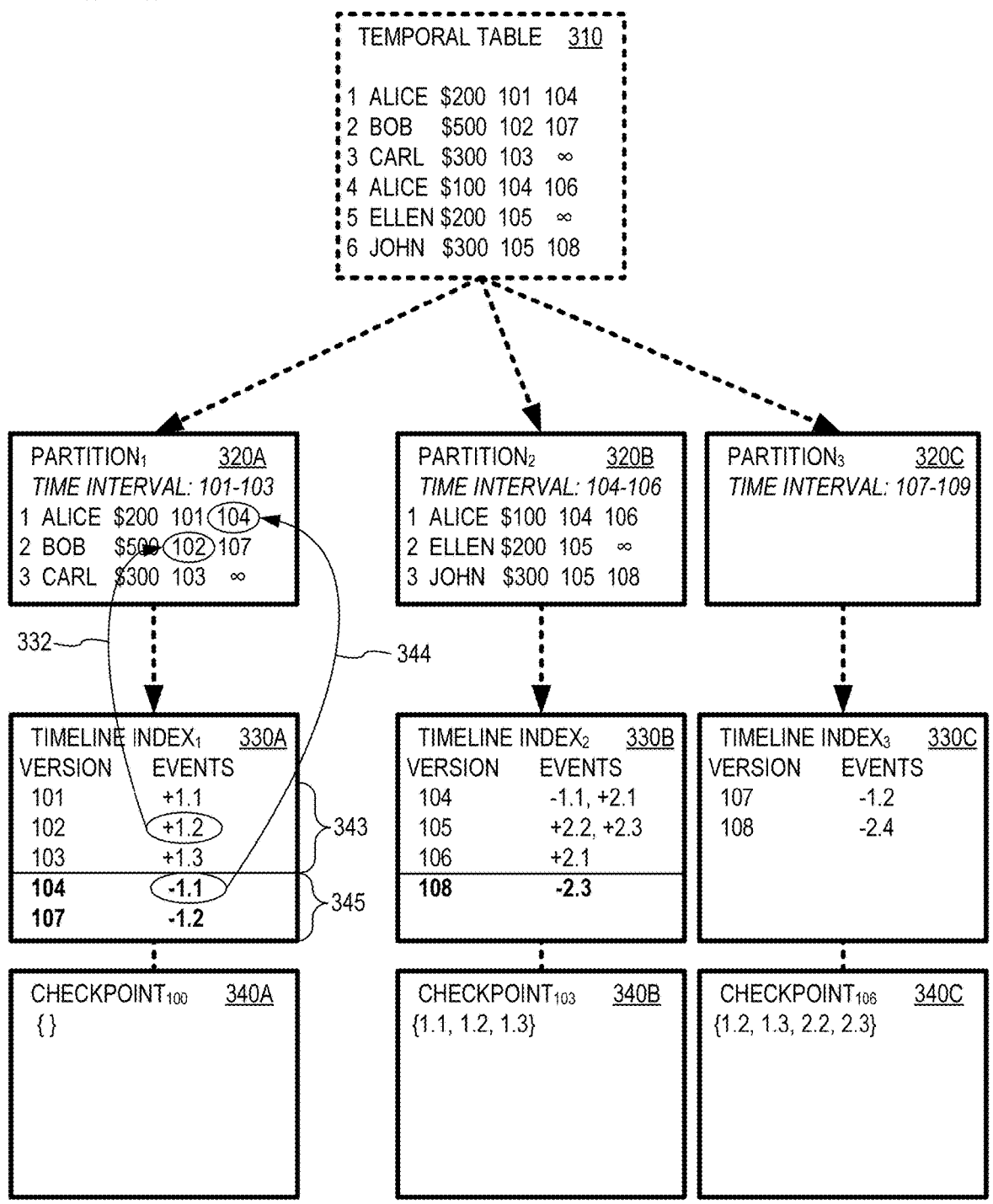
FIG. 3 is a block diagram of an example system implementing a plurality of partial timeline indexes and checkpoints as described herein.

FIG. 3 is a block diagram of an example system 300 implementing a plurality of partial timeline indexes 330A-C and checkpoints 340A-C as described herein. In the example, the temporal table 310 is stored in three partitions 320A-C. As shown, a time-based temporal partition technique is used. Partition 320A is associated with time interval (101-103], partition 320B is associated with time interval (104-106], and partition 320C is associated with time interval (107-109]. As a result, tuples are stored in the partition associated with the time interval in which the tuple was activated. Invalidation times may be in or outside of the partition. In the example, data is not duplicated by storing the tuple twice (e.g., once for the activation and again for the invalidation). Such an approach avoids data duplication. For a particular tuple, a partition 320A-C indicates the tuple (e.g., row) number (e.g., position within the respective partition), primary key, start time, and end time.

The partitions 320A-C have respective associated partial timeline indexes 330A-C that are also associated with the time intervals. As shown, a given partial timeline index 330A comprises references to tuples of a partition 320A of the temporal database table that are activated (e.g., +1.1) within a time interval associated with the given partial timeline index. In the example, the reference is in a "partition.tuple" format (e.g., a reference to the particular partition and a reference to the particular tuple within the particular partition). In practice, any number of arrangements are possible. For example, indirect references (e.g., a direct or indirect reference to an invalidation table that ultimately indicates which tuple was invalidated) can be used.

As shown, a partial timeline index 330A can comprise a local component 343 and a foreign component 345. The local component 343 comprises references to tuples in the partition 320A of the temporal database table that are activated within the time interval of the partition and references to tuples in the partition 320A that are invalidated within the time interval. For example, the index 330A indicates a reference 332 for activation of a tuple that was activated at version 102.

The foreign component 345 comprises references to invalidations of tuples in the partition of the temporal database table that are activated by a tuple in the partition of the temporal database (e.g., within a time interval associated with the given partial timeline index), but invalidated outside (e.g., after) the time interval associated with the partition. For example, the index 330A indicates a reference 344 for invalidation of a tuple that was invalidated at version 104 (e.g., outside the time interval 101-103).

A reference to a validation or invalidation of a tuple can be represented as a reference to the relevant tuple. Validation or invalidation can be represented by a data structure (e.g., a flag or code) or by virtue of where within the data structure the reference appears (e.g., the foreign component of an index comprises only invalidations).

Thus, the system comprises a plurality of partial timeline indexes indexing a plurality of respective partitions of a temporal table, wherein a given partial timeline index out of the partial timeline indexes associated with a particular partition of the temporal table stores references to one or more tuples activated within the particular partition, references to one or more tuples invalidated within the particular partition, and references to one or more tuples invalidated in a subsequent partition, The system 300 can also include checkpoints 340A-C for respective of the partitions 320A-C. Such checkpoints can indicate the tuples that were valid (e.g., visible) at a particular point in time (e.g., version). As shown, the checkpoint 340A can show the state of tuples in the partition 320A at a particular version. The version is typically the version immediately preceding the local time interval (e.g., version 100 for a time interval 101-103). In this way, the system 300 can avoid having to reconstruct the state of the partition and can instead start with a particular version, applying deltas (e.g., activations and invalidations indicated by the index 330A) to determine the state at any given version of the partition. In the example, the checkpoint 340A indicates the set of tuples that were valid at the time of the checkpoint. In practice, a bit vector can be employed that stores an indication of whether a particular tuple is valid at the time of the checkpoint (e.g., one bit per tuple). Thus, the bit vector comprises single bits for respective tuples in preceding partitions. Compression, sparse matrix techniques, and the like can be used on such bit vectors if desired. A given checkpoint is said to be associated with a particular partition (and thus the timeline index associated with the partition) and can be stored locally with the partition and the timeline index to reduce communication overhead.

Such checkpoints 340A-C can greatly improve performance by avoiding reconstruction of database state via consideration of numerous tuples before the time interval associated with the checkpoint.

As shown in FIG. 1, the system can employ a plurality of local temporal operator engines (e.g., executable in parallel) configured to accept a particular partial timeline index as input and output a partial temporal operator result as output. Thus, a plurality of partial temporal operator results are generated for respective of the partial timeline indexes. A partial temporal operator result concentrator can be configured to accept the partial temporal operator results from the local temporal operator engines as input and output a global result for the temporal operator for the temporal table.

Example 12—Example Versatility of Timeline Index

Figure 4:
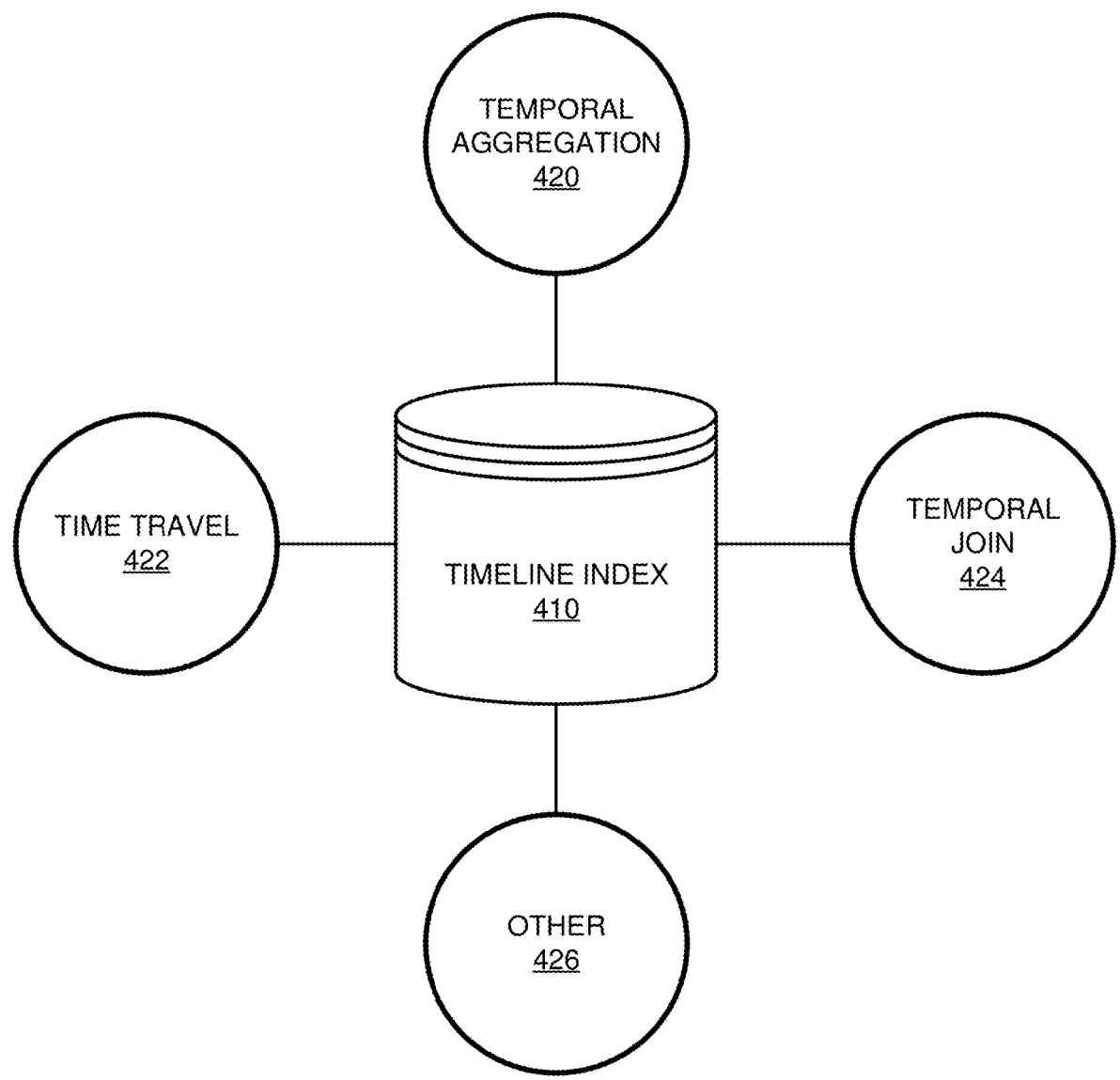
FIG. 4 is a block diagram showing versatility of the timeline indexes described herein.

FIG. 4 is a block diagram 400 showing versatility of the timeline indexes described herein. As shown, a single timeline index 410 can be used for a variety of temporal operators 420, 422, 424, and 426. Some portions of the timeline index 410 may be particular to certain operators, while others are shared among them. Checkpoints can also be used across one or more operators.

Each of the temporal operators can be implemented in a time-based or space-based partition arrangement. Thus the technologies can include different calculation techniques for permutations across two dimensions: the temporal operators and the partitioning criterion (e.g., partition by time and partition by space).

Based on the given temporal operator, the technologies can switch among techniques for calculating results for the given temporal operator calculation (e.g., generating partial results and then combining the partial results). Some calculations (e.g., a time-based time travel operation) need not combine partial results.

Example 13—Example Heterogeneous Timeline Indexes

In any of the examples herein, both time-based and space-based partitions can be maintained for a database table. As a result, two timeline indexes can also be maintained (e.g., one for the time-based partitions and one for the space-based partitions). In some scenarios, one or the other may be more efficient, depending on a variety of factors including nature of the workload.

Example 14—Example Temporal Aggregation System (Time-Based)

Figure 5:
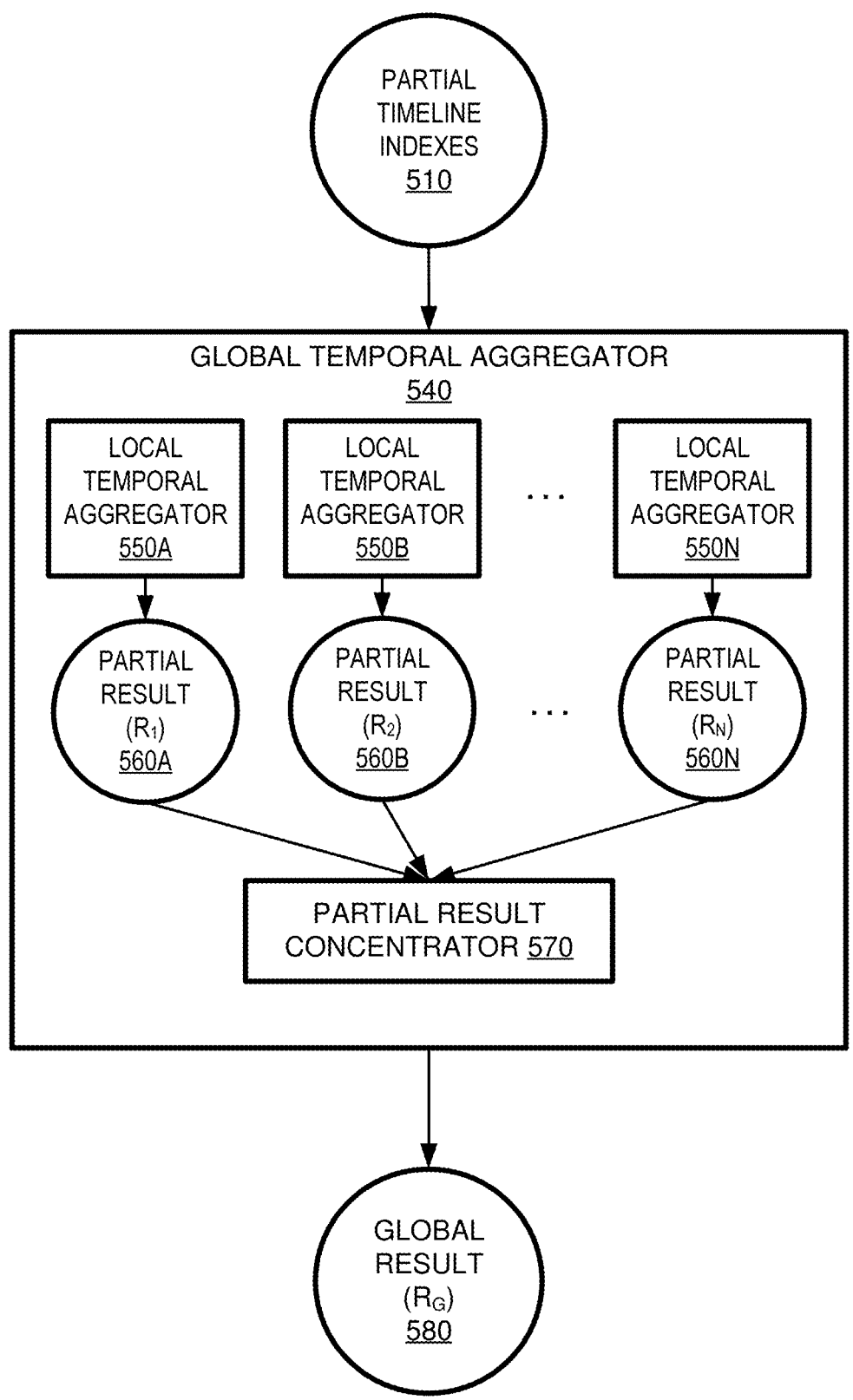
FIG. 5 is a block diagram of an example system implementing calculation of a temporal aggregation operator using a time-based temporal partition technique.

FIG. 5 is a block diagram of an example system 500 implementing calculation of a temporal aggregation operator using a time-based temporal partition technique. The system 500 can be used for cumulative temporal aggregations, selective temporal aggregations, and the like. In the example, partial timeline indexes 510 as described herein are stored for respective time-based partitions of the temporal database. Depending on the way the temporal aggregator is calculated, invalidations of tuples need not be stored twice in the indexes (e.g., the invalidation for the local partition is sufficient).

In the example, a global temporal aggregator 540 takes the form of a plurality of local temporal aggregators 550A-N that can be executed in parallel at different execution environments (e.g., as shown in FIG. 1). The local temporal aggregators 550A-N can generate respective partial results 560A-N that are combined via a partial result concentrator 570 that is output as a global result 580. Although not shown, checkpoints can also be used as input in some implementations as described herein.

Although the database partitions themselves are not shown as input, they can be consulted (e.g., to determine the partial results 560A-N) by virtue of the fact that they are referenced by the indexes 510.

Example 15—Example Temporal Aggregation Method (Time-Based)

Figure 6:
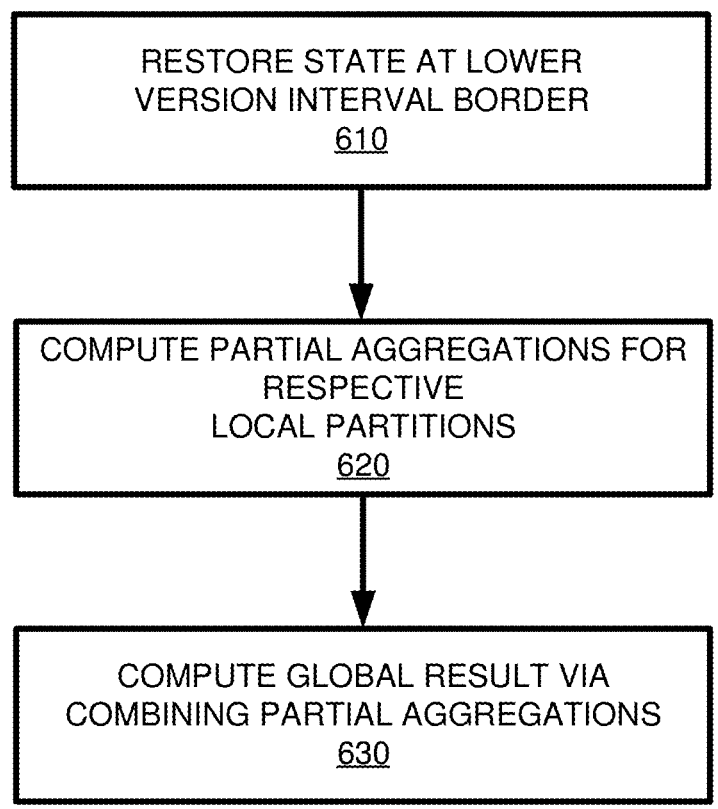
FIG. 6 is a flowchart of an example method of calculating a temporal aggregation operator using a time-based temporal partition technique.

FIG. 6 is a flowchart of an example method 600 of calculating a temporal aggregation operator using a time-based temporal partition technique and can be implemented, for example, in a system 500 such as that shown in FIG. 5. As with FIG. 5, the method can be applied to cumulative temporal aggregations, selective temporal aggregations, and the like.

In practice, the aggregation is typically performed over a time interval (e.g., represented as a lower version border and an upper version interval border). At 610, the state of the database at the lower version interval border is restored (e.g., via a checkpoint as described herein).

At 620, partial aggregations are computed for respective local partitions (e.g., in parallel as described herein). The aggregations are partial in that they do not represent a global result throughout the time interval. In practice, results for a plurality of time intervals are calculated, some of which may be outside of the time interval associated with the local partition. Depending on circumstances, some of the results may be complete for some time intervals. However, as described herein, some partial results may indeed be partial for some time intervals. Calculation can stop at the upper version interval border.

At 630, a global result is computed by combining the partial, local results as described herein.

Example 16—Example Local Temporal Aggregation System (Time-Based)

Figure 7:
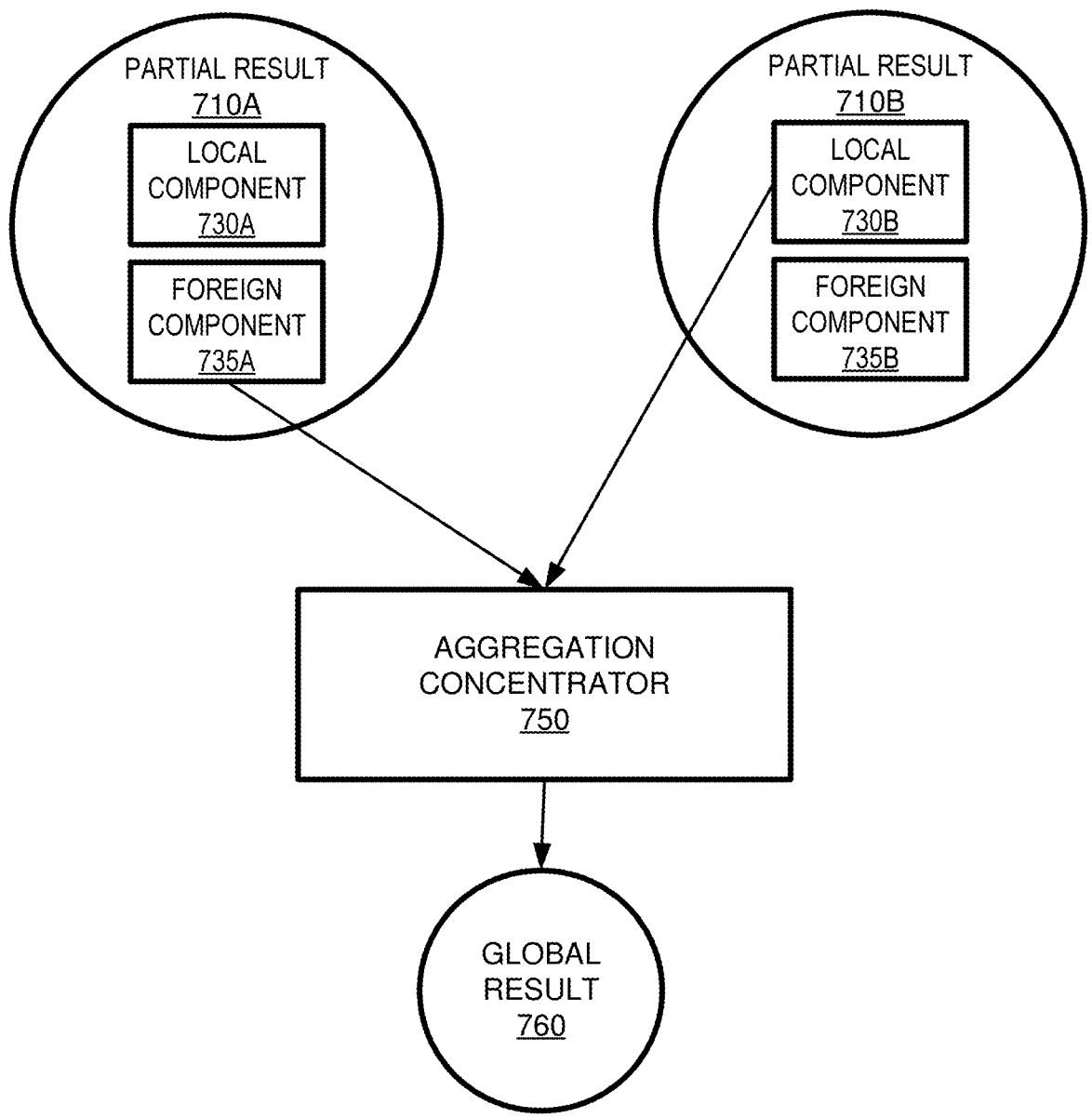
FIG. 7 is a block diagram of an example system implementing calculation of a local result for a temporal aggregation operator using a time-based temporal partition technique.

FIG. 7 is a block diagram of an example system 700 implementing calculation of a local result for a temporal aggregation operator using a time-based temporal partition technique. The system 700 and any of the systems herein can be implemented in hardware (e.g., one or more processors coupled to memory).

In the example, partial results 710A-B from two different local calculations are combined. A given partial result 710B includes a local component 730B showing the aggregation calculation for the partition associated with the local timeline index. A partial result 710A can also include a foreign component 735A that includes calculations for data outside of the time interval of the local partition that affect the aggregation result. It is possible to consult more than one prior partial result.

The foreign component 735A-B effectively serves as carry over results for the local calculation and can be empty in some cases. As shown herein, the foreign component 735A-B can be calculated based on changes as indicated in the timeline index.

The aggregation concentrator 750 can combine the partial results to calculate a global result.

Example 17—Example Local Temporal Aggregation Method (Time-Based)

Figure 8:
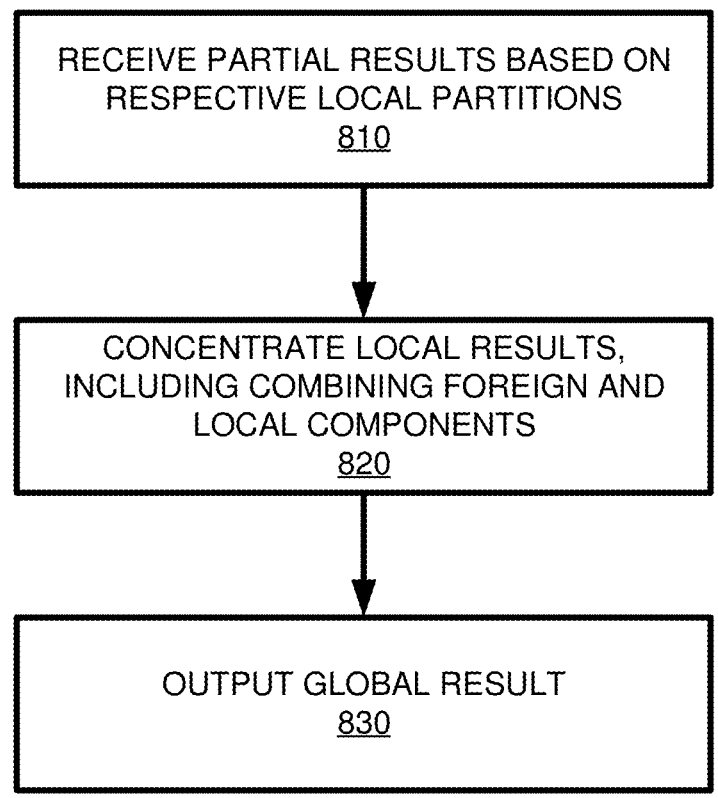
FIG. 8 is a flowchart of an example method of concentrating local results for a temporal aggregation operator using a time-based temporal partition technique.

FIG. 8 is a flowchart of an example method 800 of concentrating partial results for a temporal aggregation operator using a time-based temporal partition technique and can be implemented, for example, in a system such as that shown in FIG. 7. Such a technique can be used for a cumulative or selective join as described herein.

At 810, partial results based on respective local partitions are received. As described herein, the local aggregation calculation is performed based on the local partition. Such an arrangement can be performed multiple times for multiple, different partitions in parallel.

At 820, the local results from the plural calculations are concentrated into a global result. Such concentration can include combining foreign and local components. Thus, the global result calculation can include combining partial results for a particular version from a plurality of different partitions.

At 830, the global results are output. The carry over effect of tuples that are invalidated outside of a local partition can be applied early on or later in the process while still falling within the technologies.

Example 18—Example Time Travel System (Time-Based)

Figure 9:
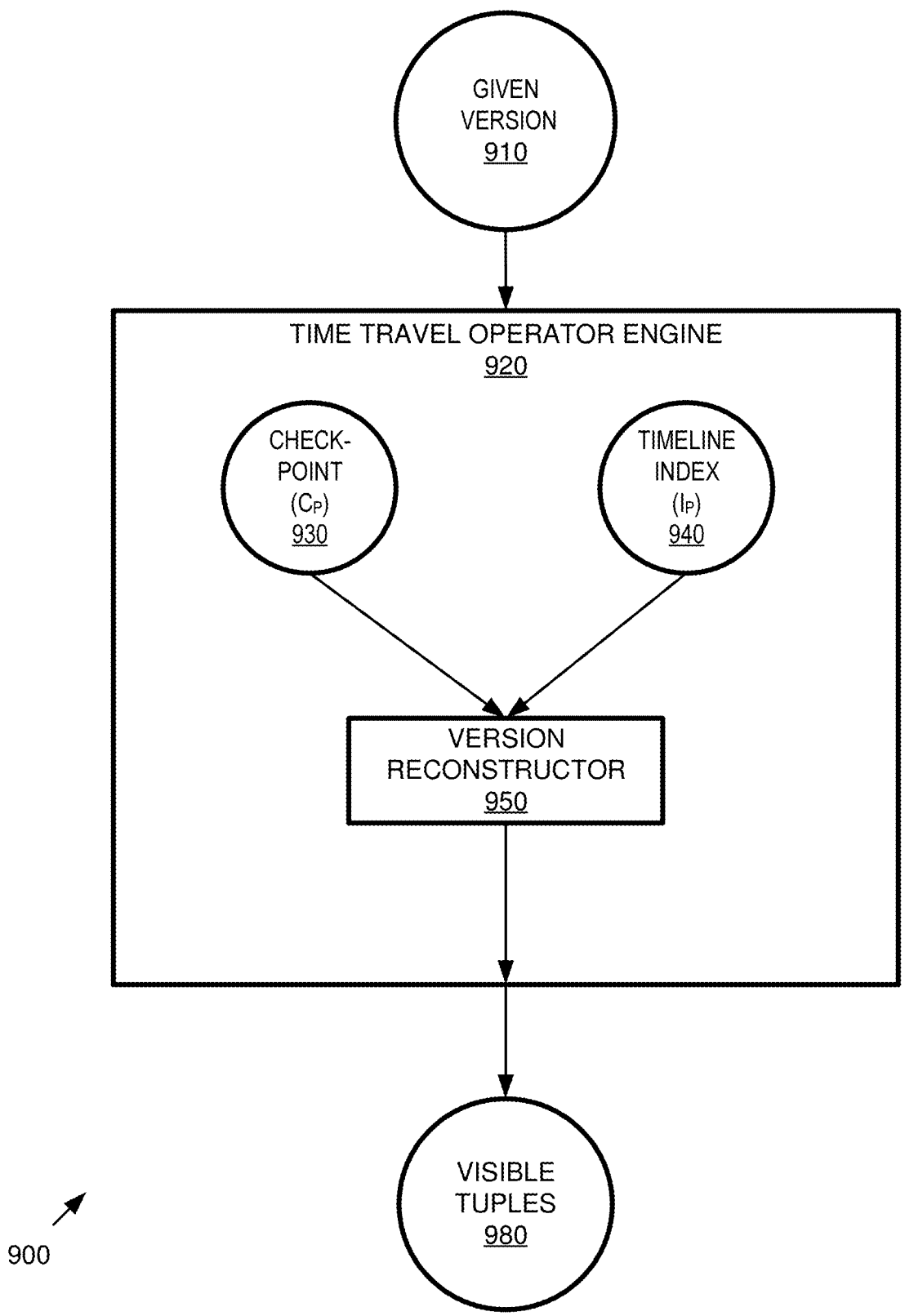
FIG. 9 is a block diagram of an example system implementing calculation of a time travel operator using a time-based temporal partition technique.

FIG. 9 is a block diagram of an example system 900 implementing calculation of a time travel operator using a time-based temporal partition technique. In the example, a time travel operator engine 920 accepts a given version 910 as input.

In consultation with a checkpoint 930 and timeline index 940 associated with the appropriate partition, a version reconstructor 950 can apply the changes shown in the timeline index 940 to output the tuples 980 that were valid (e.g., visible) at the given version 910.

Example 19—Example Time Travel Method (Time-Based)

Figure 10:
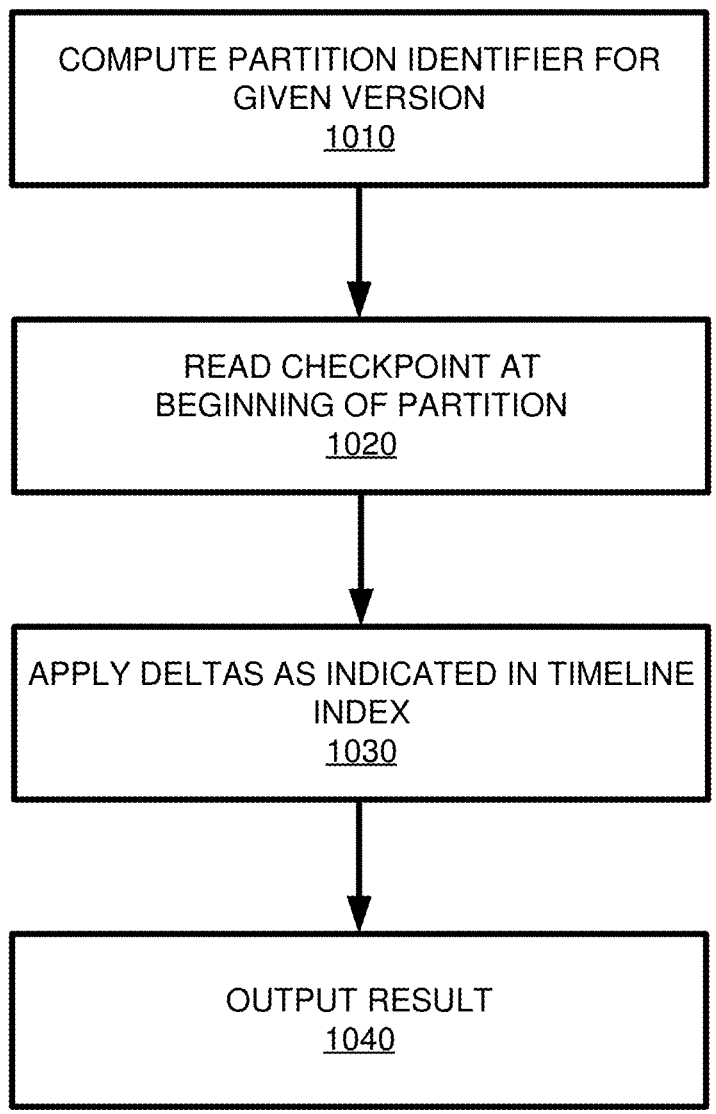
FIG. 10 is a flowchart of an example method of calculating a time travel operator using a time-based temporal partition technique.

FIG. 10 is a flowchart of an example method 1000 of calculating a time travel operator using a time-based temporal partition technique and can be implemented, for example, via a system such as that shown in FIG. 9.

A version for which time travel is desired is received. At 1010, the partition identifier associated with the given version is computed.

At 1020, the checkpoint for the partition (e.g., version just before the time interval associated with the partition) is read.

At 1030, the changes to the tuples as indicated in the timeline index are applied to the tuples from the checkpoint. After the changes are applied, the result has been calculated.

At 1040, the result is output, showing which tuples were visible at the given version.

Example 20—Example Temporal Join System (Time-Based)

Figure 11:
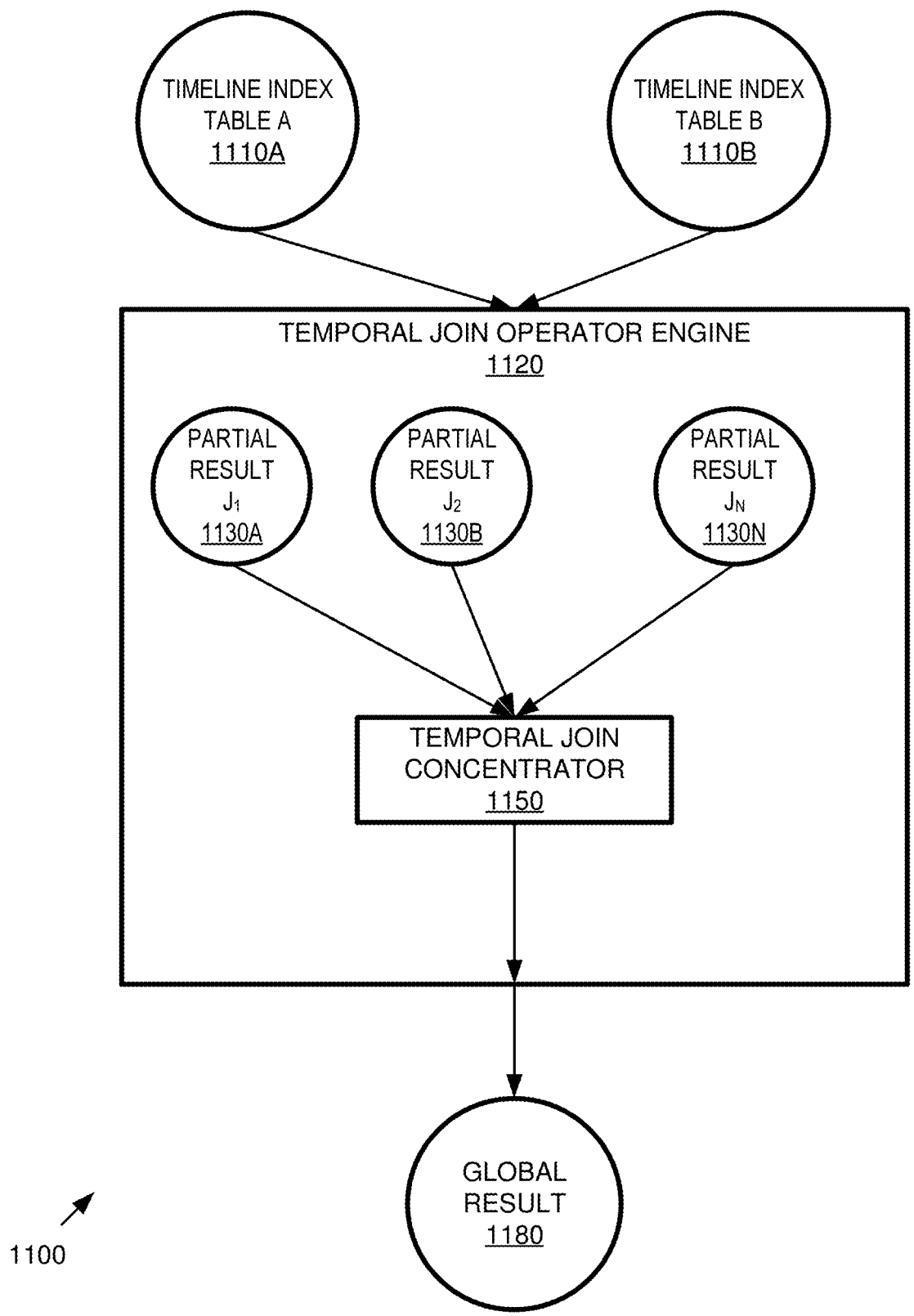
FIG. 11 is a block diagram of an example system implementing calculation of a temporal join operator using a time-based temporal partition technique.

FIG. 11 is a block diagram of an example system 1100 implementing calculation of a temporal join operator using a time-based temporal partition technique. In the example, the input includes the partial timeline index 1110A for a first table "Table A" and the partial timeline index 1110B for a second table "Table B" on which the join is performed. A time interval can also be provided to specify over what time interval (e.g., versions) the calculation is to be performed. Checkpoints for the involved partitions that store the primary key can also be accepted as input.

The temporal join operator engine 1120 can be implemented in plural execution environments to take advantage of parallel processing as described herein. A plurality of partial results 1130A-N can be calculated (e.g., one per partition). As described herein, a partial result 1130A of the temporal join can itself be expressed as a timeline index.

The temporal join concentrator 1150 can combine the plural partial results 1130A-N into a global result 1180, which itself can also be expressed as a timeline index (e.g., events show additions and deletions of joined tuples between indicated tuples in the two join tables). Tuples in the source join tables can be indicated by a partition and row. Such an index 1180 can be helpful when stringing together multiple temporal join operators. The timeline index can be converted into an equivalent temporal table (e.g., for display or other operation) by sequencing through the events therein and performing joins on tuples in the respective indicated partitions.

Example 21—Example Temporal Join Method (Time-Based)

Figure 12:
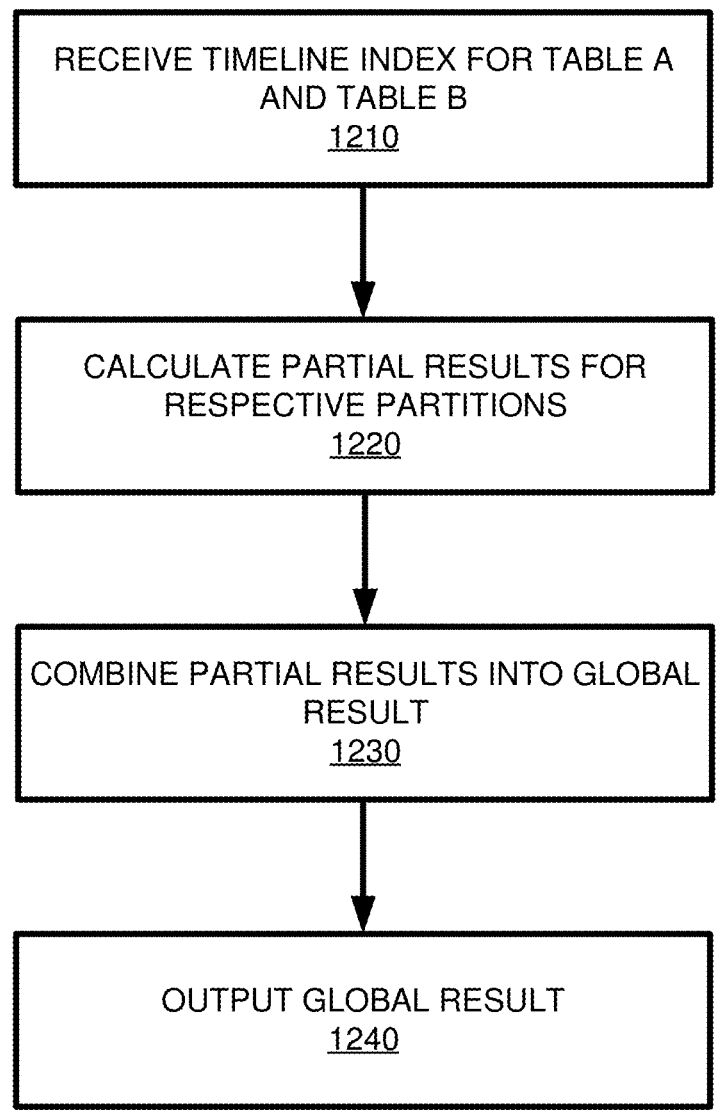
FIG. 12 is a flowchart of an example method of calculating a temporal join operator using a time-based temporal partition technique.

FIG. 12 is a flowchart of an example method 1200 of calculating a temporal join operator using a time-based temporal partition technique and can be implemented, for example, via an arrangement such as that shown in FIG. 11.

At 1210, the partial timeline indexes for a first table and a second table are received.

At 1220, partial results for respective partitions of the first table are calculated. Corresponding partitions for the second table can be consulted during the process. As described herein, for a given partition of the temporal database table, an intersection map can be evolved based on events indicated in a partial timeline index associated with the given partition. An example execution of a temporal join in a time-based temporal partition scenario is shown in FIGS. 29-42.

At 1230, partial results for respective of the partitions are combined into a global result.

At 1240, the global result is output.

Example 22—Example Local Temporal Join System (Time-Based)

Figure 13:
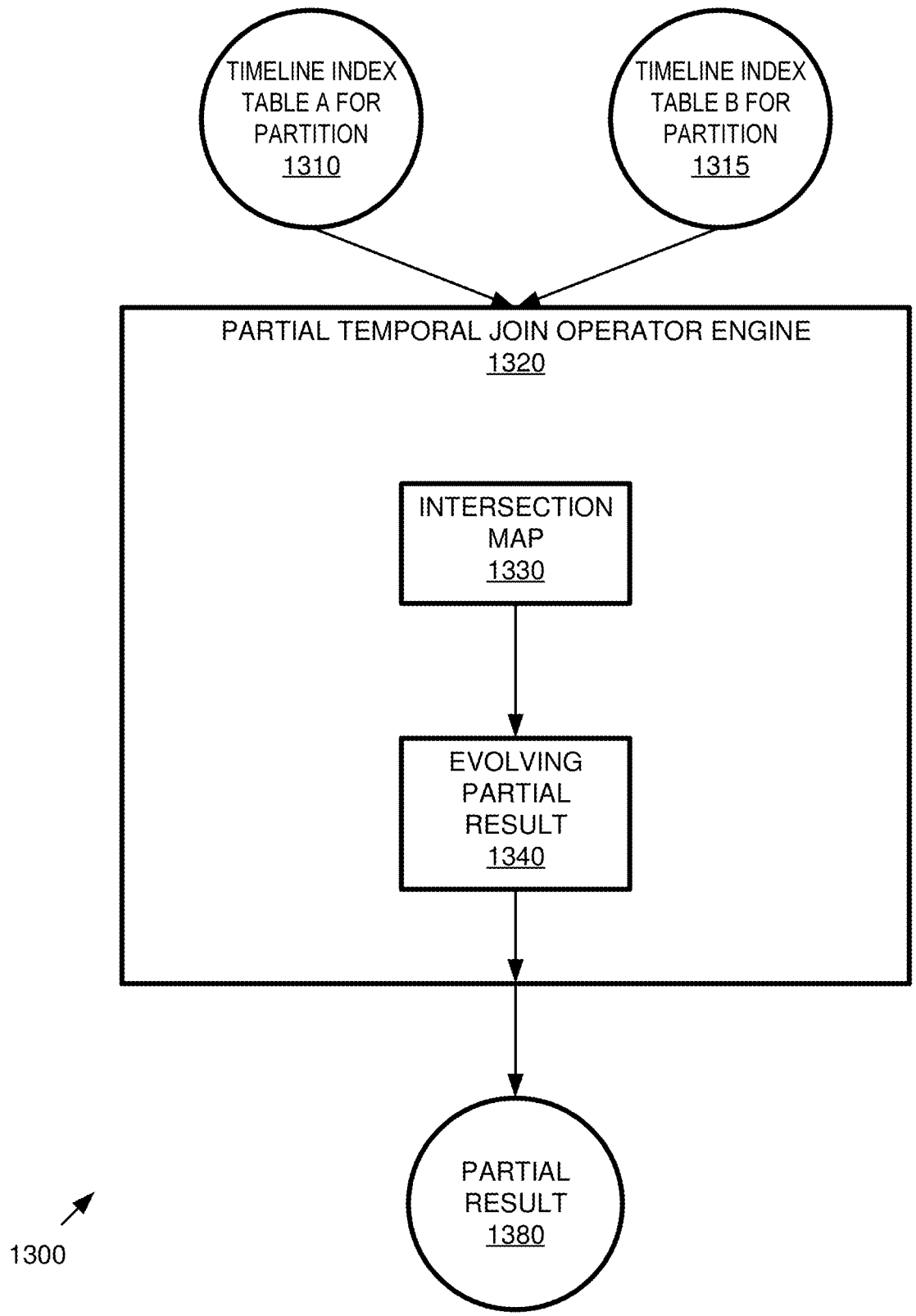
FIG. 13 is a block diagram of an example system implementing calculation of a local result for a temporal join operator using a time-based temporal partition technique.

FIG. 13 is a block diagram of an example system 1300 implementing calculation of a partial, local result for a temporal join operator using a time-based temporal partition technique. In the example, a temporal join sub-operator engine 1320 accepts a partial timeline index 1310 for a local partition of a first table and a corresponding (e.g., same time interval) partial timeline index 1315 for a corresponding partition of a second table. Associated checkpoints can also be included.

A partial temporal join operator engine 1320 stores an intersection map 1330 that tracks contemporaneous intersections between the tables and evolves during the calculation. Results from the intersection map 1330 are stored to the evolving partial result 1340. At the end of the calculations, the evolving partial result 1340 can be output as a partial result 1380 for the local partition. The partial result 1380 can be expressed as a timeline index and can have a foreign component (e.g., that affects results outside the time interval associated with the local partition).

Example 23—Example Local Temporal Join Method (Time-Based)

Figure 14:
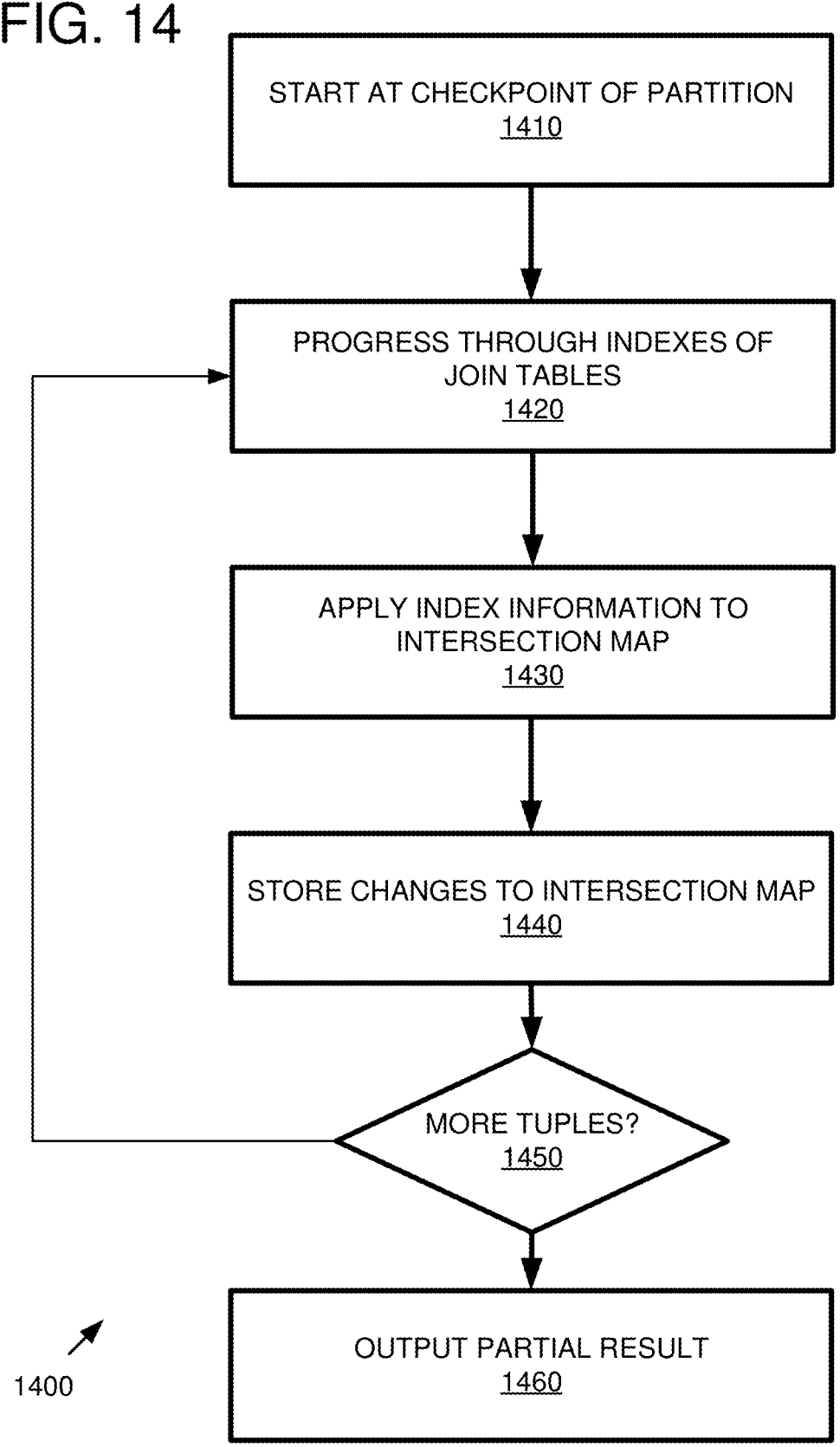
FIG. 14 is a flowchart of an example method of calculating a local result for a temporal join operator using a time-based temporal partition technique.

FIG. 14 is a flowchart of an example method 1400 of calculating a local result for a temporal join operator using a time-based temporal partition technique and can be implemented, for example, via a system such as that shown in FIG. 13.

Initial processing can include storing an empty intersection map.

At 1410, processing can then begin at the checkpoint of the partition for both tables involved.

At 1420, processing can progress through the partial timeline index of the first join table and the partial timeline index of the second join table.

At 1430, the index information can be applied to the intersection map, which evolves to indicate current intersections between the tables (e.g., at a current version as the process steps through versions). For example, if the index indicates that a tuple is activated, new intersections can be determined and added to the intersection map. If the index indicates that a tuple is invalidated, current intersections can be removed from the intersection map.

At 1440, changes to the intersection map are stored as part of the evolving partial results.

If there are more tuples 1450, processing continues. For example, the timeline index may end, or an end of a desired interval can be reached to indicate there are no more tuples.

Otherwise, the partial result is output at 1460.

Example 24—Example Large Datasets

In any of the examples herein, tables with large data sets can be accommodated. For example, tables having hundreds of thousands, millions, tens or millions, hundreds of millions, or more rows can be accommodated, whether in base tables, relational results between tables, internal tables, or the like.

Example 25—Example Alternatives

Although the technologies can be implemented in an in-memory, columnar database scenario, the technologies are not limited to any specific database architecture or storage layout. Any system supporting relational database functions can implement the technologies described herein.

Example 26—Example Implementations

The technologies described herein can be implemented in a variety of additional ways. The following illustrates various time-based and space-based temporal partition techniques as applied to various temporal operators.

Example 27—Example Partition by Time with Index and Checkpoints

Figure 15:
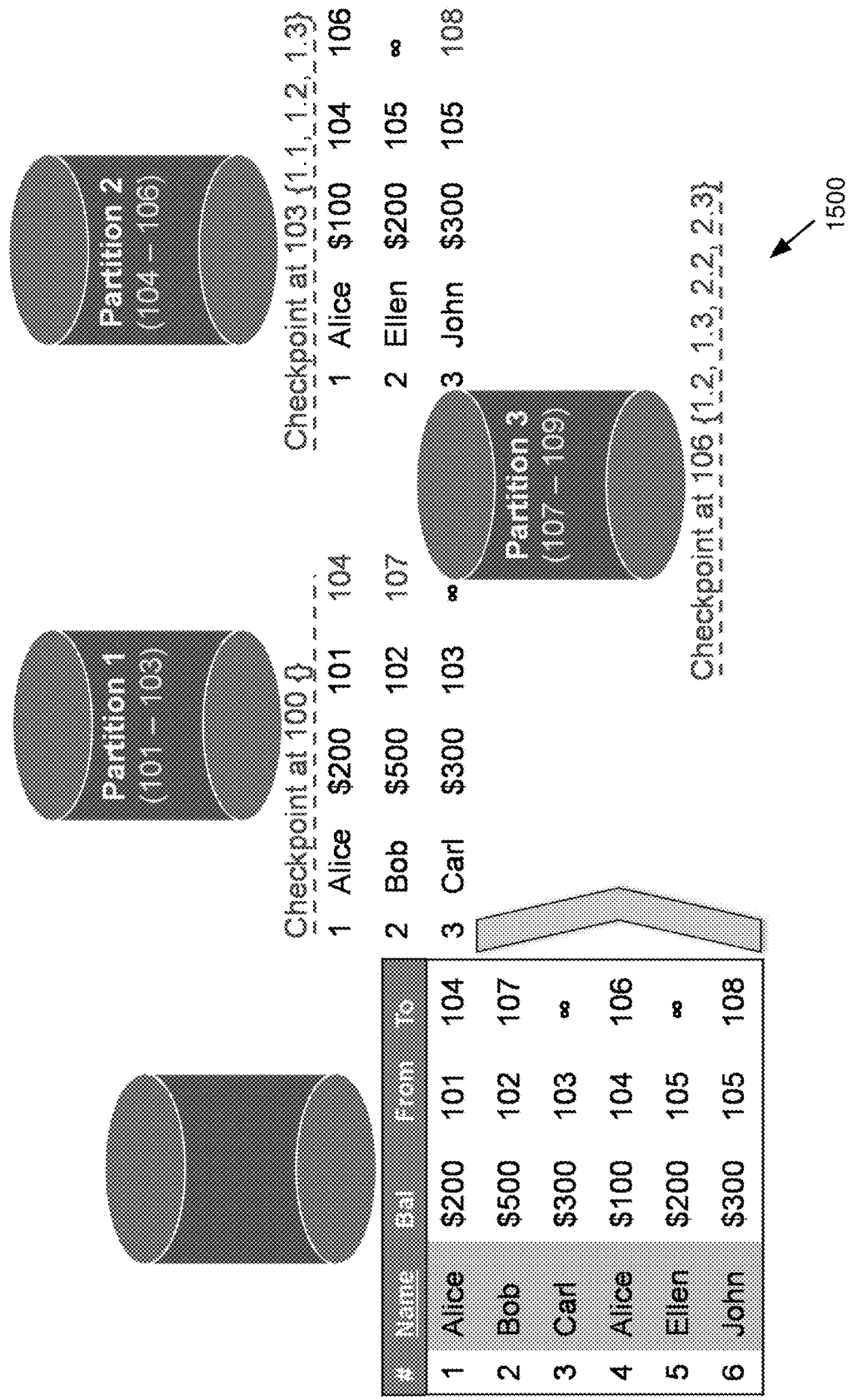
FIG. 15 is block diagram of an example system implementing partition by time, resulting in distribution of temporal data.

FIG. 15 is block diagram of an example system 1500 implementing partition by time, resulting in distribution of temporal data. In the example, a partition stores information for a defined time interval. Time is determined by version. One or more partitions can be stored on a physical node (e.g., server). The version can be a global transaction number.

Checkpoints for respective partitions are also shown. The data can be clustered based on the "from" field. The "to" value for each tuple can be updated whenever it is invalidated.

Figure 16:
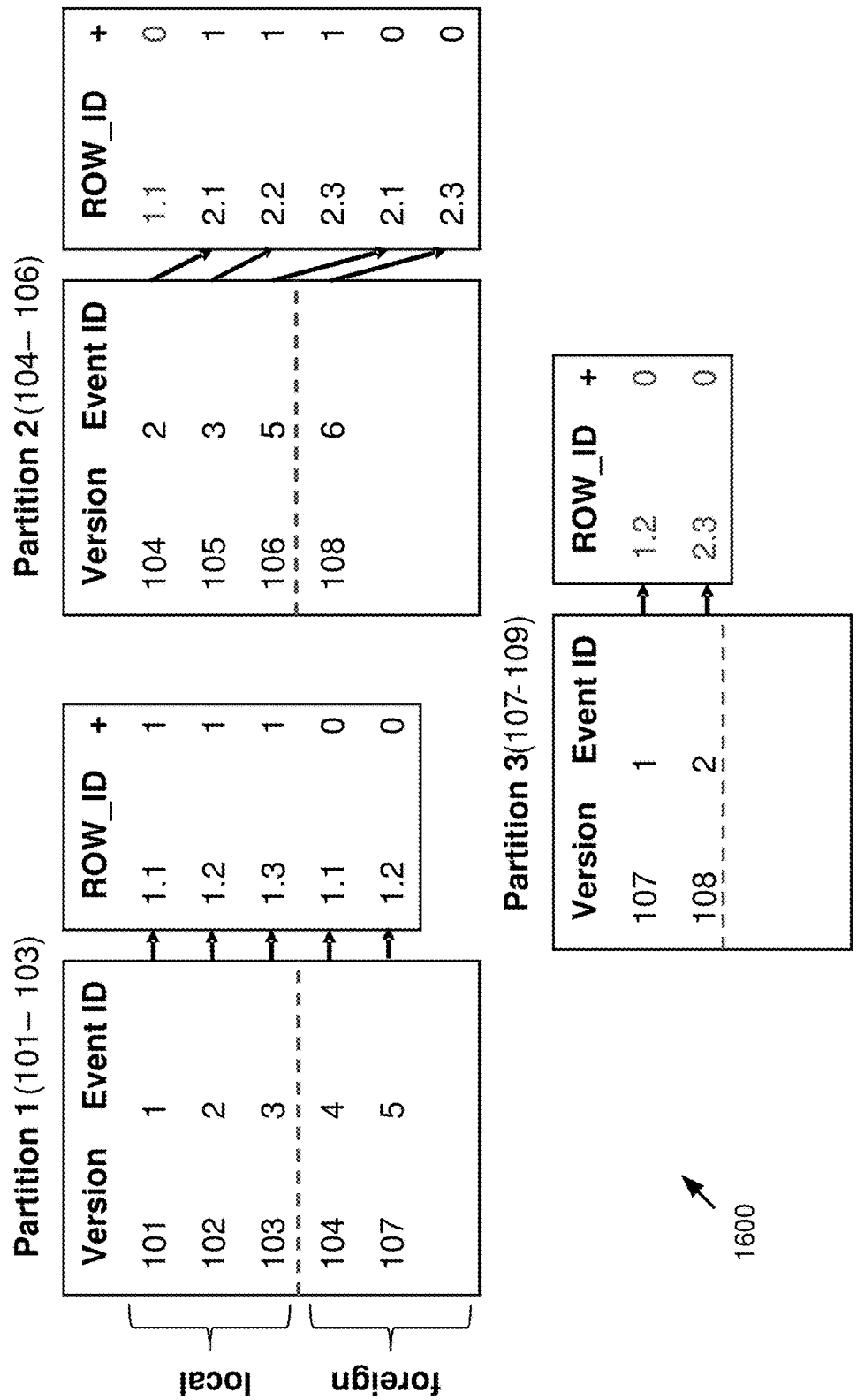
FIG. 16 is block diagram of an example system implementing a timeline index in a partition-by-time scenario.

FIG. 16 is block diagram of an example system 1600 implementing a timeline index in a partition-by-time scenario. The index reflects the example data shown in FIG. 15. As shown, the timeline index in each partition contains two segments:

Local: Tuples that are either activated or invalidated within this partition Foreign: Tuples that are activated in the local partition but invalidated in a later partition (e.g., the time interval of a later partition).

Thus, if tuples are activated and invalidated in different partitions, the invalidation events are stored in the index twice: once in the foreign area of the activation partition and once in the local area of the invalidation partition.

Event IDs are not explicitly shown for some of the tables, but can be inferred based on the position within the list (e.g., the first entry is event ID 1, etc.).

FIG. 17 is block diagram of an example system 1700 implementing checkpoints in a partition-by-time scenario. The checkpoints reflect the example data shown in FIG. 15. A checkpoint is stored at the beginning of the time interval of each partition. Each checkpoint stores the set of all tuples visible for a given version.

Example 28—Example Distribution of Temporal Data (Partition by Time)

Figure 18:
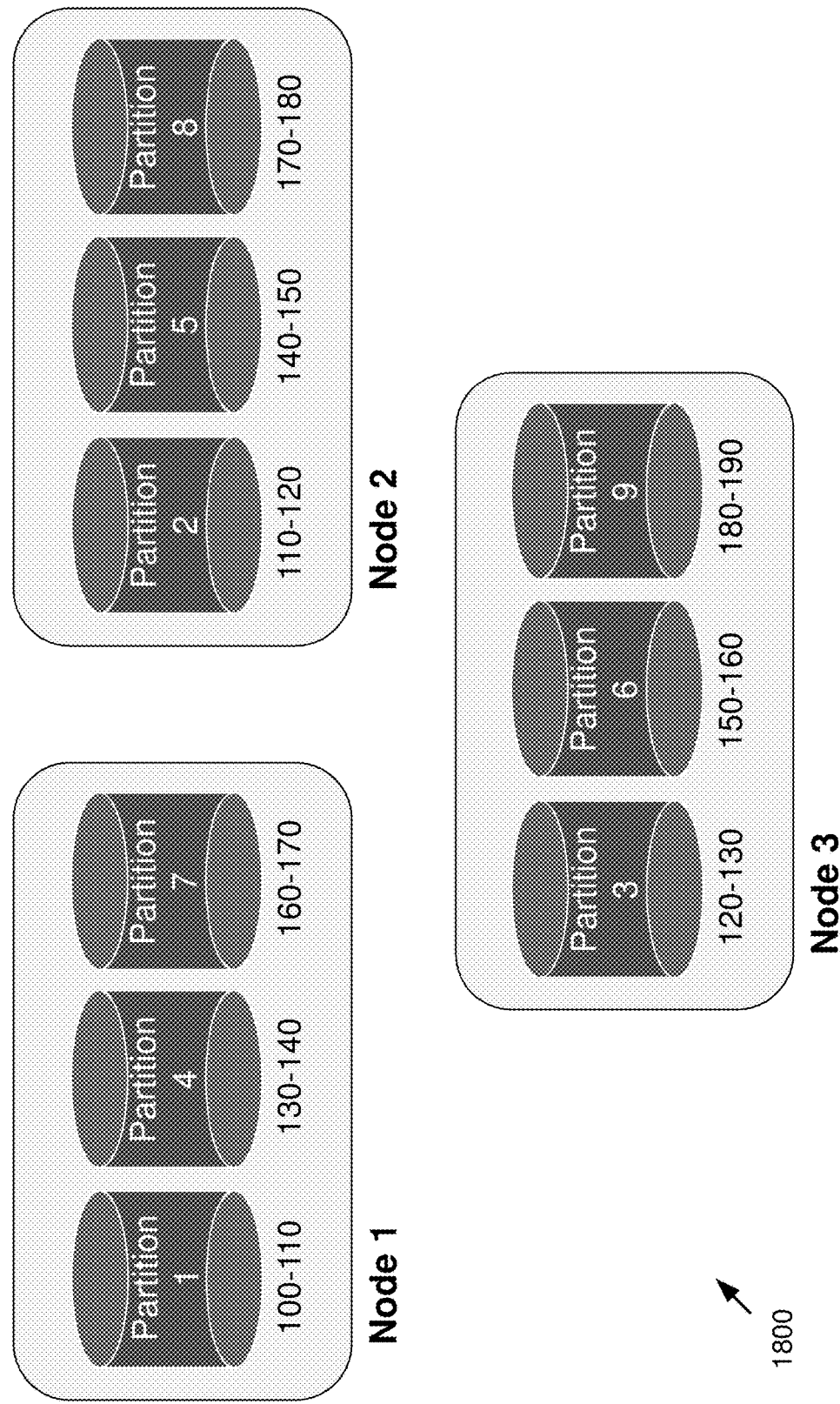
FIG. 18 is block diagram of an example system implementing distribution of temporal data in a partition-by-time scenario.

FIG. 18 is block diagram of an example system 1800 implementing distribution of temporal data in a partition-by-time scenario. As shown, nodes can store one or more partitions.

Example 29—Example Partition by Time Configuration

In any of the examples herein, partitioning functions can be provided.

If maxSize is the maximum number of versions per partition, then the ID of a given version can be computed by (in an example with round-robin assignment to a limited number of nodes):

```
partition_id = getPartition(version_id) := version_id div maxSize modulo numberOfNodes
    nodeMap(partition_id) can be a function that maps each partition_id to the ID of the
node where it is stored.
    keyMap(key) can be a function that maps each primary key to the position of the latest
updated value, i.e., its version_id and row_id
    getCurrent( ) can retrieve the current version_id, i.e., the number of the current
transaction
    An INSERT update operation can be implemented as follows:
    INSERT(key, new_values)
        Retrieve current version: current_version := getCurrent( )
        Calculate position of partition: node_id and segment_id:
            partition_id := getPartition(current_version)
            node_id := nodeMap(partiton_id)
        Append tuple(key, new_values, from, to) to partition with partition_id on node_id
at next ROW_ID next_row with
            From = current_version, To = ∞
        Set keyMap(key) := (current_version, next_row)
        Update Timeline Index
    An UPDATE operation can be implemented as follows:
    UPDATE(key, new_values)
        Get previous data
            Retrieve previous version: (prev_version, prev_row) := keyMap(key)
            Calculate position of previous partition:
                prev_partition_id := getPartition(prev_version)
                prev_node_id := nodeMap(prev_partiton_id)
            Get prev_values by (prev_node_id, prev_partition_id, prev_row)
        Get new data
            Retrieve current version: current_version := getCurrent( )
            Calculate position of new partition:
                partition_id := getPartition(current_version)
                node_id := nodeMap(partiton_id)
        Invalidate previous value: Set tuple(key, prev_values, prev_version,
current_version) in partition(seg_id, node_id)
        Add new value: Append tuple(key, new_values, current_version,∞) to
partition(seg_id, node_id) at next ROW_ID next_row
        Set keyMap(key, current_version, next_row)
        Update Timeline Index
    A DELETE operation can be implemented as follows:
    DELETE(key)
        Get previous data
            Retrieve previous version: (prev_version, prev_row) := keyMap(key)
            Calculate position of previous partition:
                prev_partition_id := getPartition(prev_version)
                prev_node_id := nodeMap(prev_partiton_id)
        Get prev_values by (key, prev_node_id, prev_partition_id, prev_row)
        Get position of deleted value
            Retrieve current version: current_version := getCurrent( )
            Calculate position of new partition:
                partition_id := getPartition(current_version)
                node_id := nodeMap(partiton_id)
        Invalidate previous value: Set tuple(key, prev_values, prev_version,
current_version) in partition(seg_id, node_id)
        Set keyMap(key) := (current_version, next_row)
        Update Timeline Index
```

Example 30—Example Data Distribution (Partition by Time)

Figure 19:
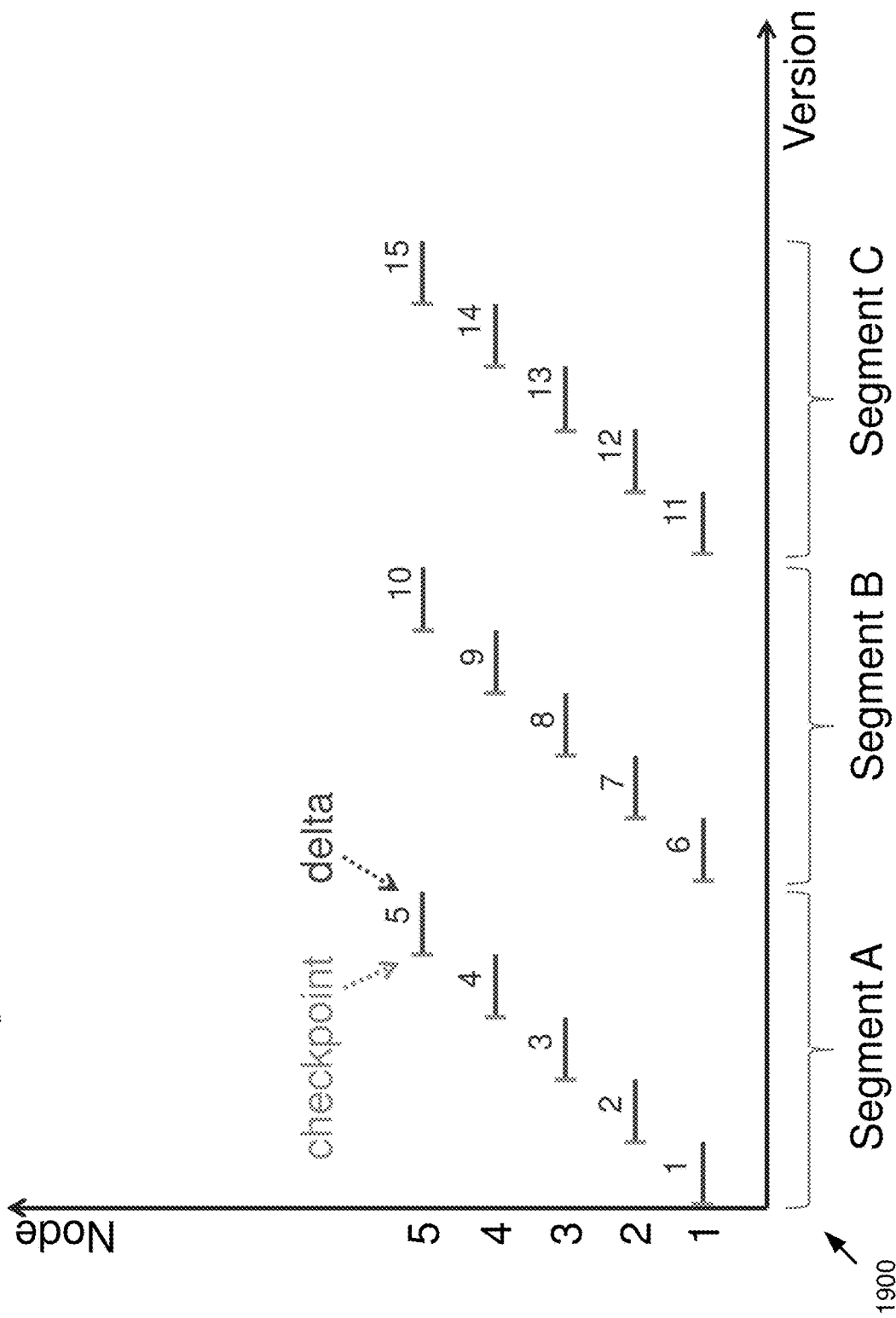
FIG. 19 is a diagram visualizing data distribution in a partition-by-time scenario.

FIG. 19 is a diagram visualizing data distribution in a partition-by-time scenario. In the example, partitions are assigned in a round-robin fashion. If the period for each partition is of equal size, the node where a partition resides can be computed based only on the partition identifier. However, in practice, partitions do not need to be of equal size (e.g., an explicit mapping between partition to node can be used).

Round-robin assignment is shown as an example only. Any number of other partitioning schemes can be supported. For example, partitions can be structured so that data that is accessed mostly together is located in a same partition. In addition, a partition with important or hot data can be stored on a faster machine or the like.

Example 31—Example Architecture (Partition by Time)

In any of the examples herein, a time-based temporal partition technique can be implemented such that each partition contains information of a time interval only. Data is not replicated, but invalidations can be stored in a timeline index twice in the case of activations and invalidations in different partitions. One checkpoint can be stored per partition. ROW_IDs are local for each partition. The position of a tuple is uniquely defined by its ROW_ID and partition number.

The assignment of partitions to nodes (e.g., physical or virtual nodes) can be flexible. The partition_id for a given version_id can be computed.

Example 32—Example Partition-by-Space Scenario

Figure 20:
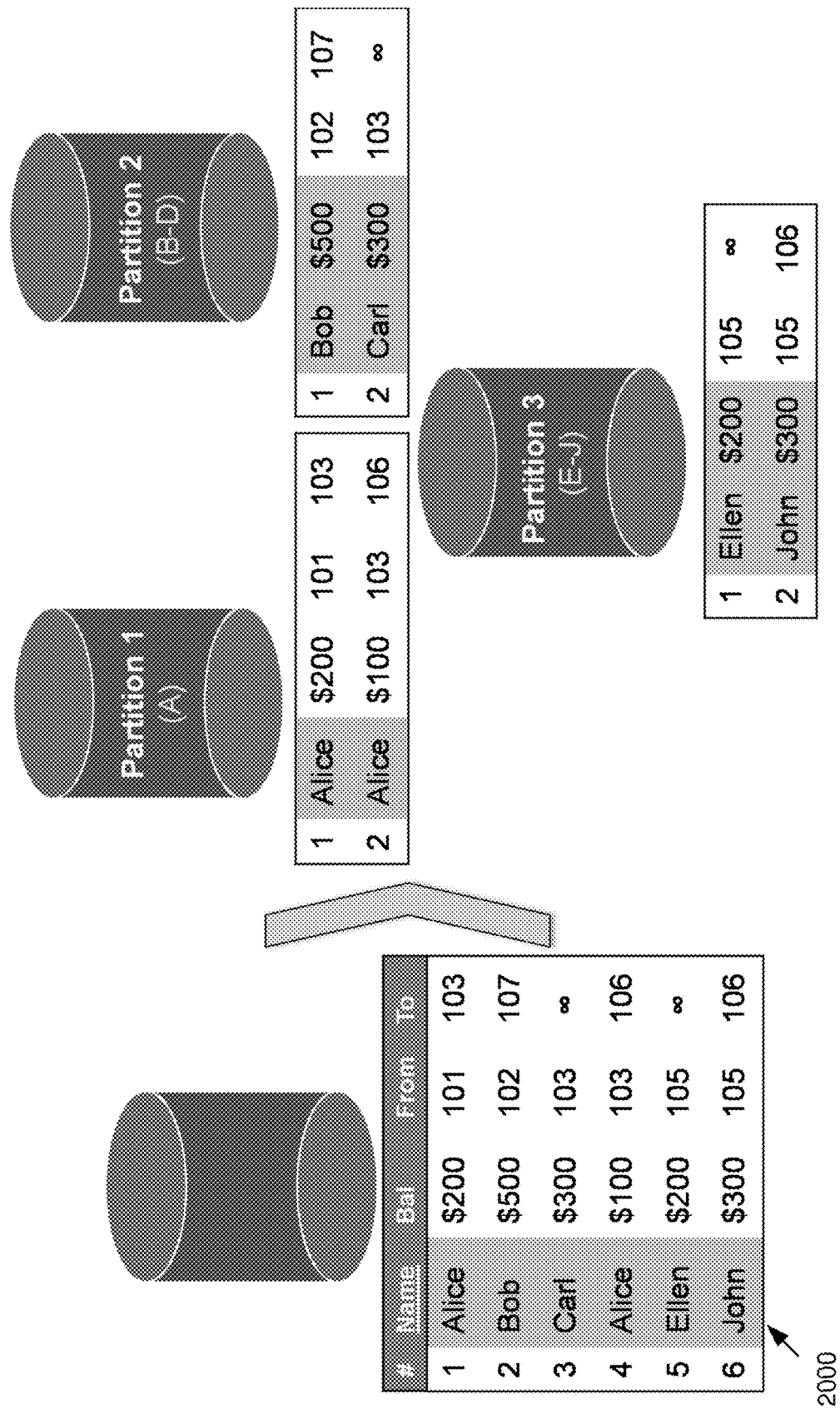
FIG. 20 is a block diagram of an example system implementing partition by space, resulting in distribution of temporal data.

FIG. 20 is a block diagram of an example system 2000 implementing partition by space, resulting in distribution of temporal data. A node stores the versions (e.g., all versions) of defined subset of the primary keys.

Figure 21:
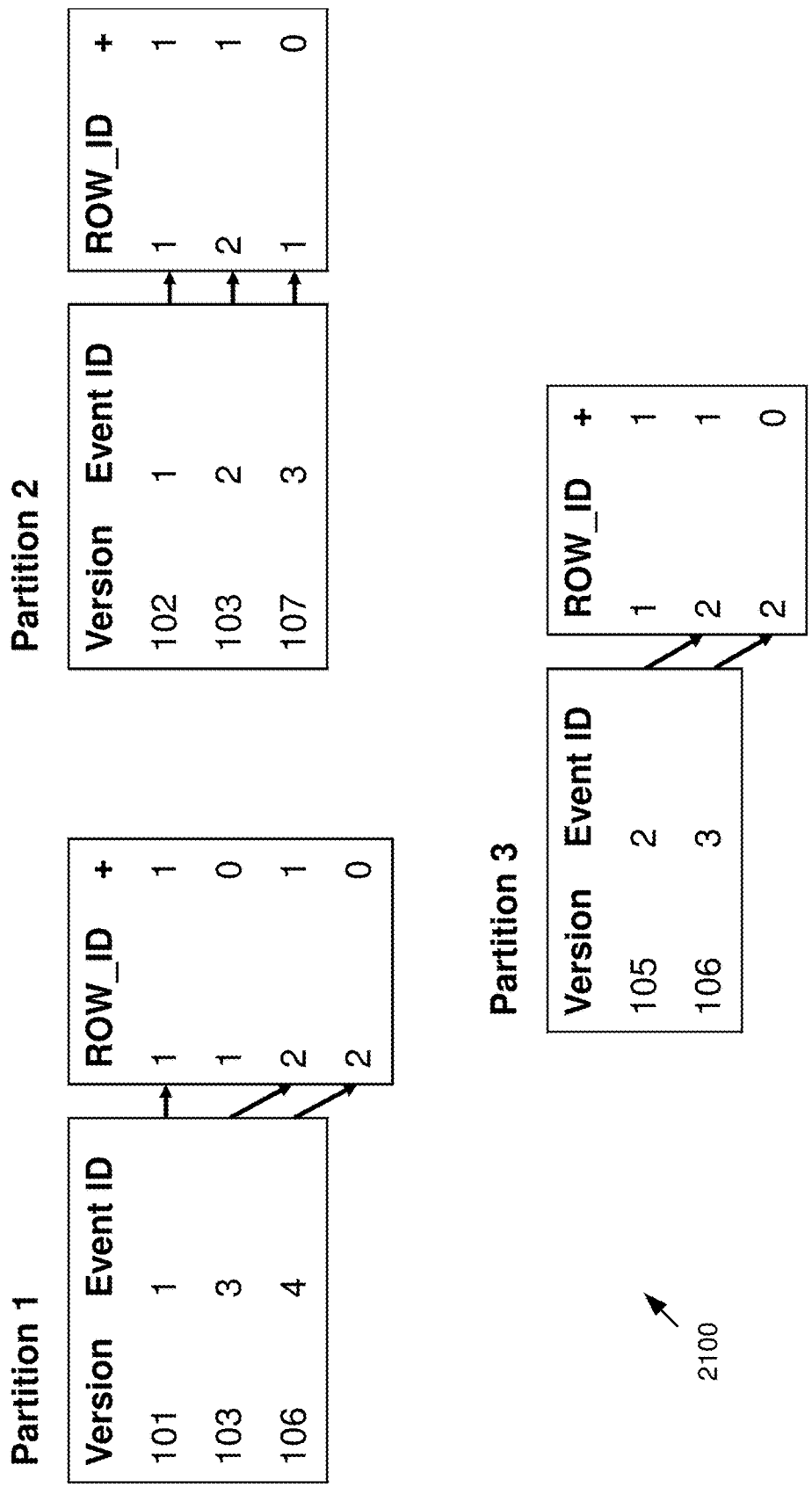
FIG. 21 is block diagram of an example system implementing a timeline index in a partition-by-space scenario.

FIG. 21 is block diagram of an example system 2100 implementing a timeline index in a partition-by-space scenario.

In a partition-by-space partitioning technique, checkpoints are not required because information about the keys stored in one partition is contained in the local partition. However, checkpoints can be implemented locally for a partition for a given version to allow faster access of a certain version within a partition.

In such an arrangement, each partition can contain the information for a given set of attribute values (e.g., for a key, other attribute, or combination of attributes). Thus attribute values (e.g., tuples for the attribute values) for a particular attribute can be stored within a given partition. ROW_IDs can be local to a partition.

Example 33—Example Data in Partition-by-time Scenario

Figure 22:
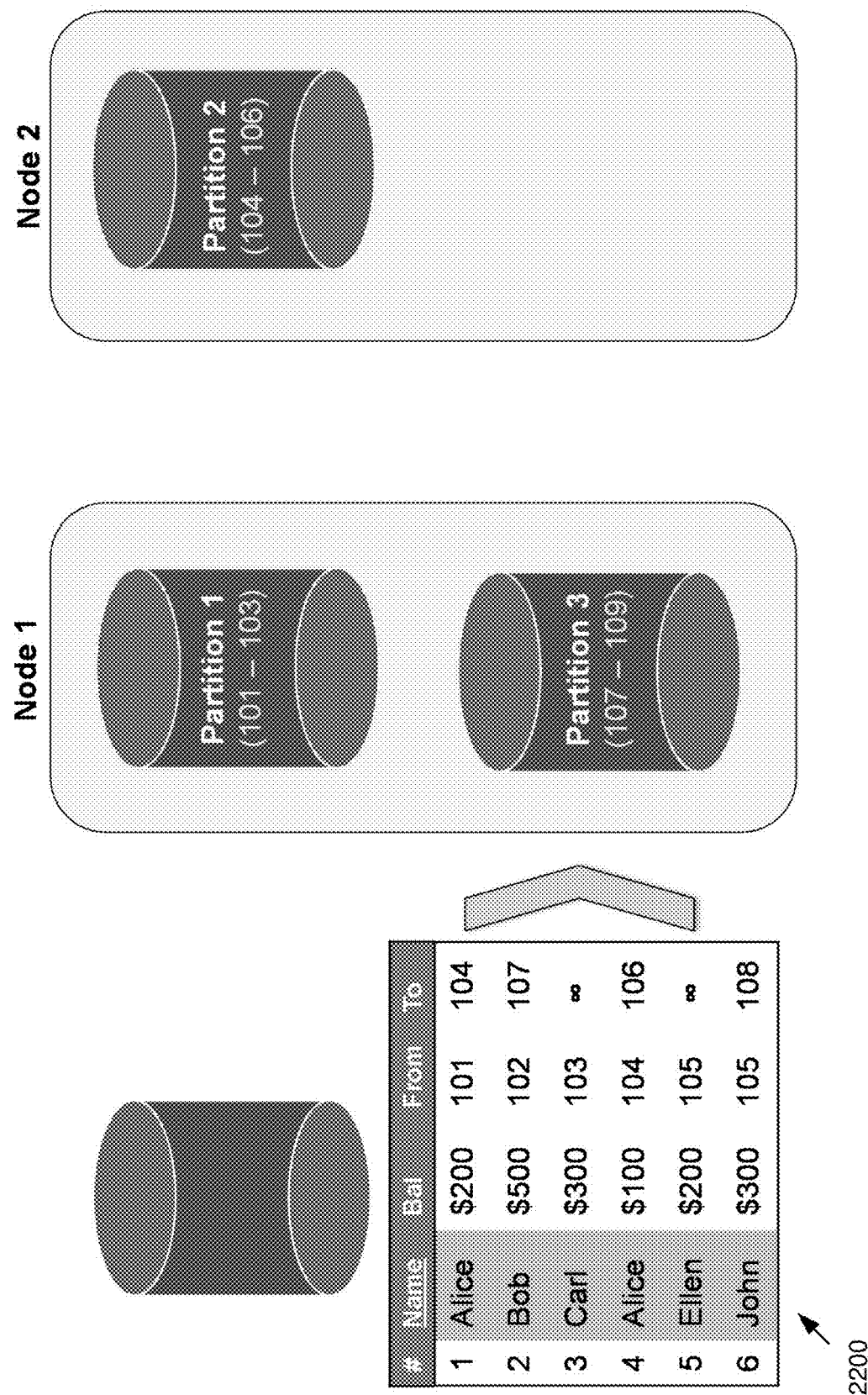
FIG. 22 is block diagram of an example system having example data in a partition-by-time scenario.

FIG. 22 is block diagram of an example system 2200 having example data in a partition-by-time scenario. The data can be distributed over multiple nodes as shown. Data is routed to the proper partition.

To generate the timeline index, the index can be stored together with the distributed temporal data. The index and data can be kept together to reduce communication overhead.

Although single temporal operators are shown in some examples, multiple temporal operators can be combined into a more complex query.

The result can then be output.

Example 34—Example Temporal Aggregation Operator (Partition-by-Time)

A temporal aggregation can be computed in a time interval (v_begin, v_end) as follows:

Compute ID of partition for the lower interval border:
partition_id=getPartition(v_begin)
Read the checkpoint at the beginning of the partition
Use the Timeline Index of this partition
Do a linear scan of the Timeline Index and apply the deltas until current_version=v_begin (restore state at lower interval border)

Conceptually compute a new aggregated value and report the result for each version until current_version=v_end, However, results need not be reported on a step-by-step basis. Instead, partial results can be merged into a meaningful global result and then are reported to the issuer of the query.

Conceptually, the scan continues in the next following partition, if the end is not within the same partition. However, the temporal aggregation query can be processed via different partitions in parallel. The partial results are then merged into one global result and the reported to the issuer of the query.

Moreover, only partitions that contain versions within the requested interval need be considered. Such a selection can be done a priori (i.e., first determine which partitions contain versionIds within the requested interval). Therefore, it is not necessary to actually continue the scan in the following partition if the end is not within the same partition.

Example 35—Example Temporal Cumulative Aggregation Operator (Partition-by-Time)

Figure 25:
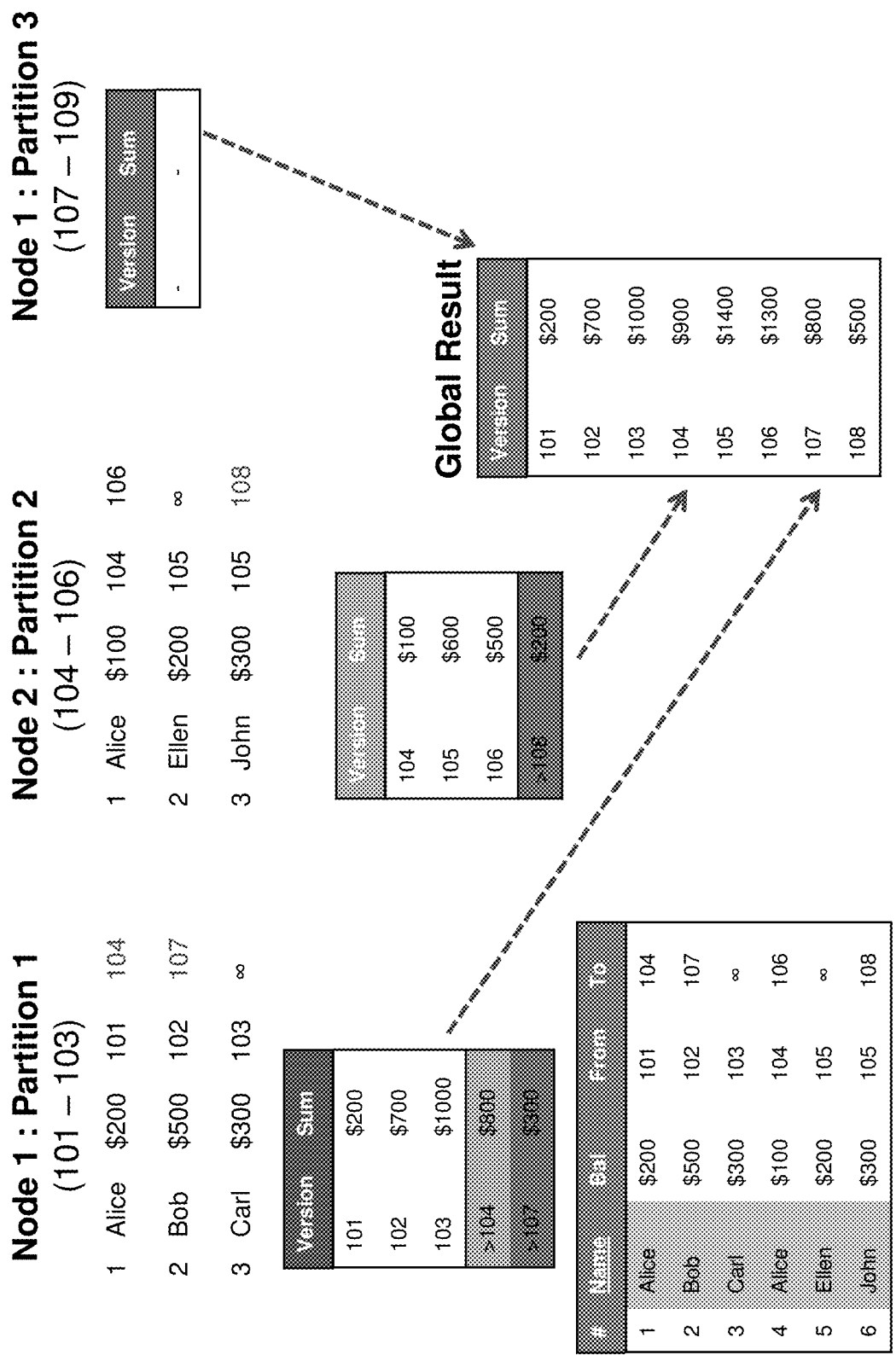

FIGS. 23, 24, and 25 show execution of a temporal selective aggregation operator in parallel in a partition-by-time scenario. The example cumulative aggregation operator effectively answers "What is the total sum of the account balances at each point in time?"

SELECT SUM(bal) AS sum
FROM Customer co
GROUP BY co.VERSION_ID( )

As shown, carry over results (e.g., results affecting versions outside the current partition) can be represented in the partial results (e.g., as a foreign component of the partial results). Such results can then be concentrated as shown in FIG. 25 to arrive at a global result.

Example 36—Example Temporal Selective Aggregation Operator (Partition-by-Time)

Figure 26:
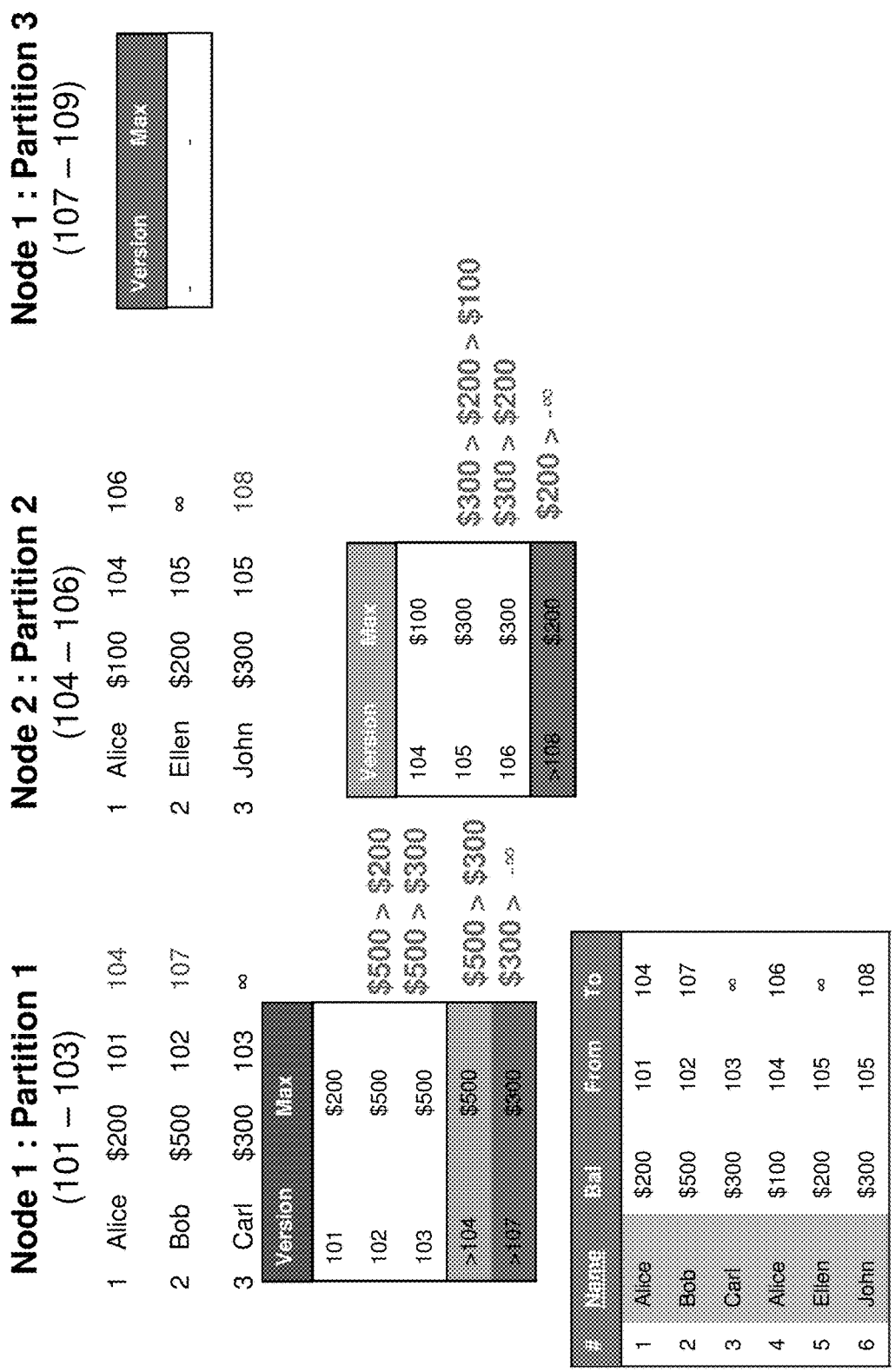
FIGS. 26 and 27 show execution of a temporal selective aggregation operator in parallel in a partition-by-time scenario.
Figure 27:
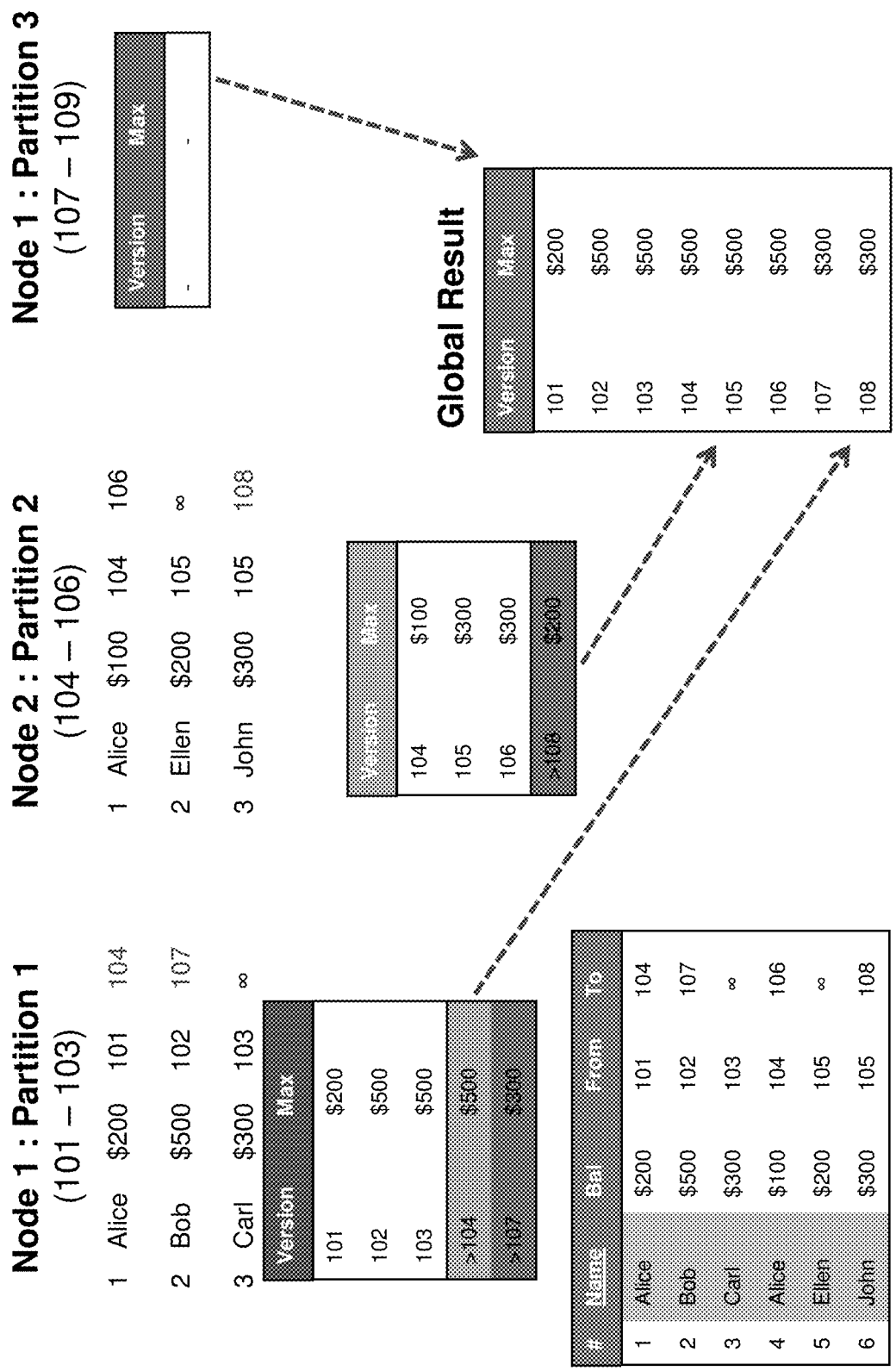

FIGS. 26 and 27 show execution of a temporal selective aggregation operator in parallel in a partition-by-time scenario. The example selective aggregation operator effectively answers "What is the highest balance at each point in time?"

SELECT MAX(co.bal) AS max_balance
FROM Customer co
GROUP BY co.VERSION_ID( )

Again, carry over results can be implemented.

Example 37—Example Time Travel Operator (Partition by Time)

Figure 28:
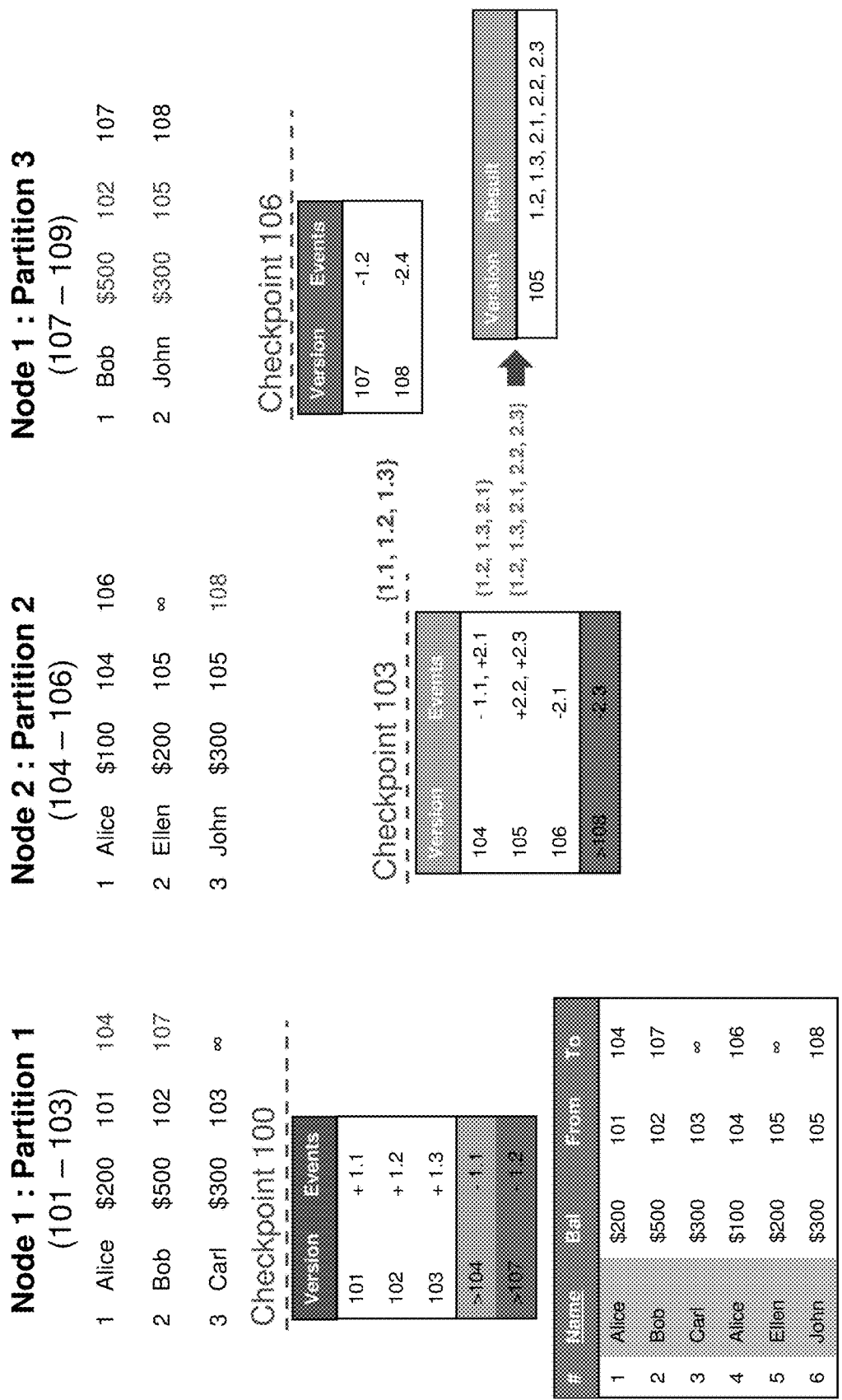
FIG. 28, shows execution of a time travel operator in a partition-by-time scenario.

FIG. 28 shows execution of a time travel operator in a partition-by-time scenario. The operator selects the tuples that are visible at a given version_id (e.g., "105" in the example) as follows:

Compute ID of partition for a given version:
partition_id=getPartition(version_id)
    Read the checkpoint at the beginning of the partition
    Use the Timeline Index of this partition
    Apply deltas of the Timeline Index until current_version=version_id The example time travel operator effectively answers "At a given time in history, what balances were visible?"
SELECT *
FROM Customer co
AS OF TIMESTAMP eid_to_timestamp(105)

Example 38—Example Temporal Join Operator (Partition by Time)

Figure 29:
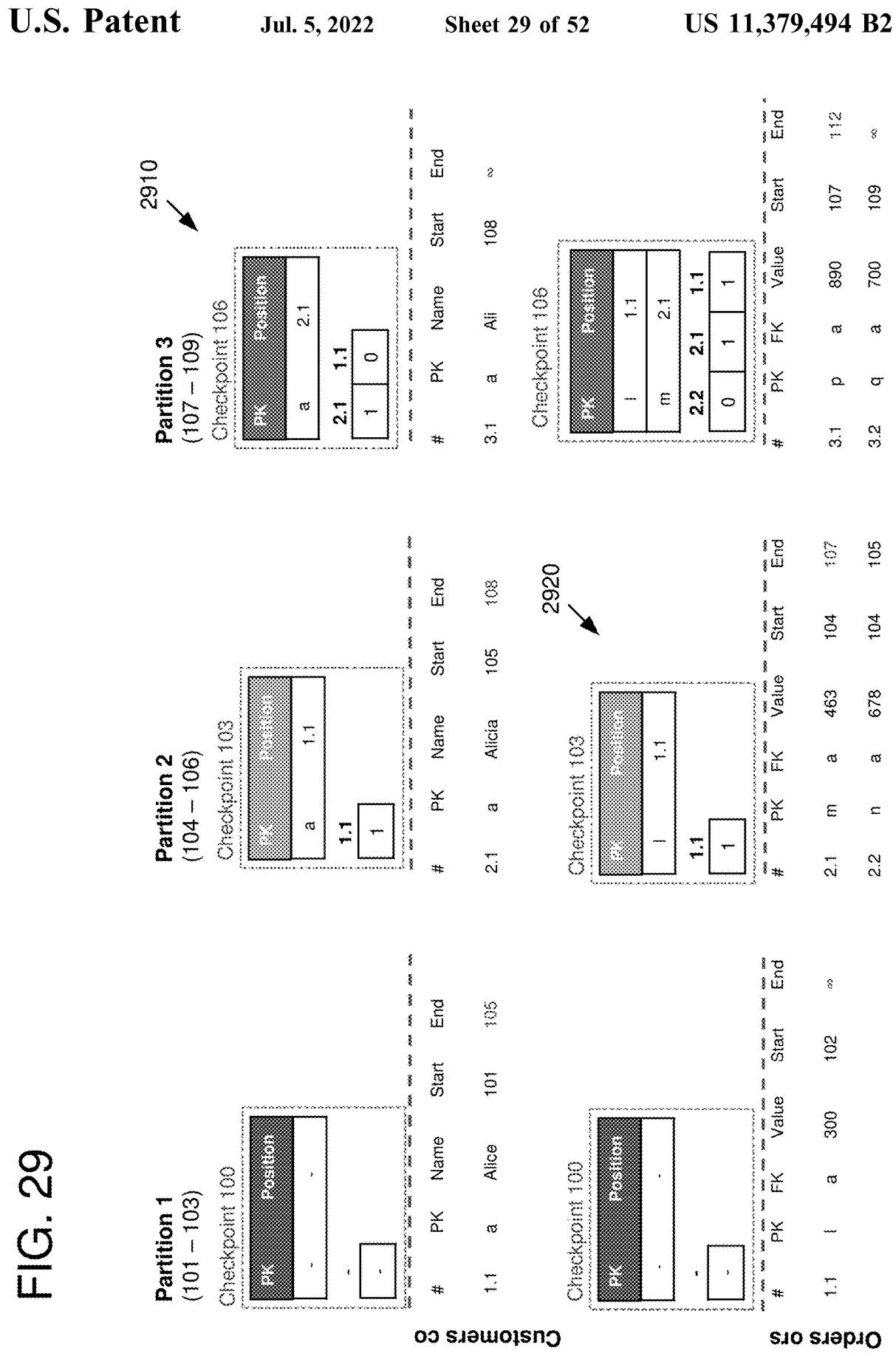
FIG. 29 shows an example system for performing a temporal join operator in a partition-by-time scenario.
Figure 30:
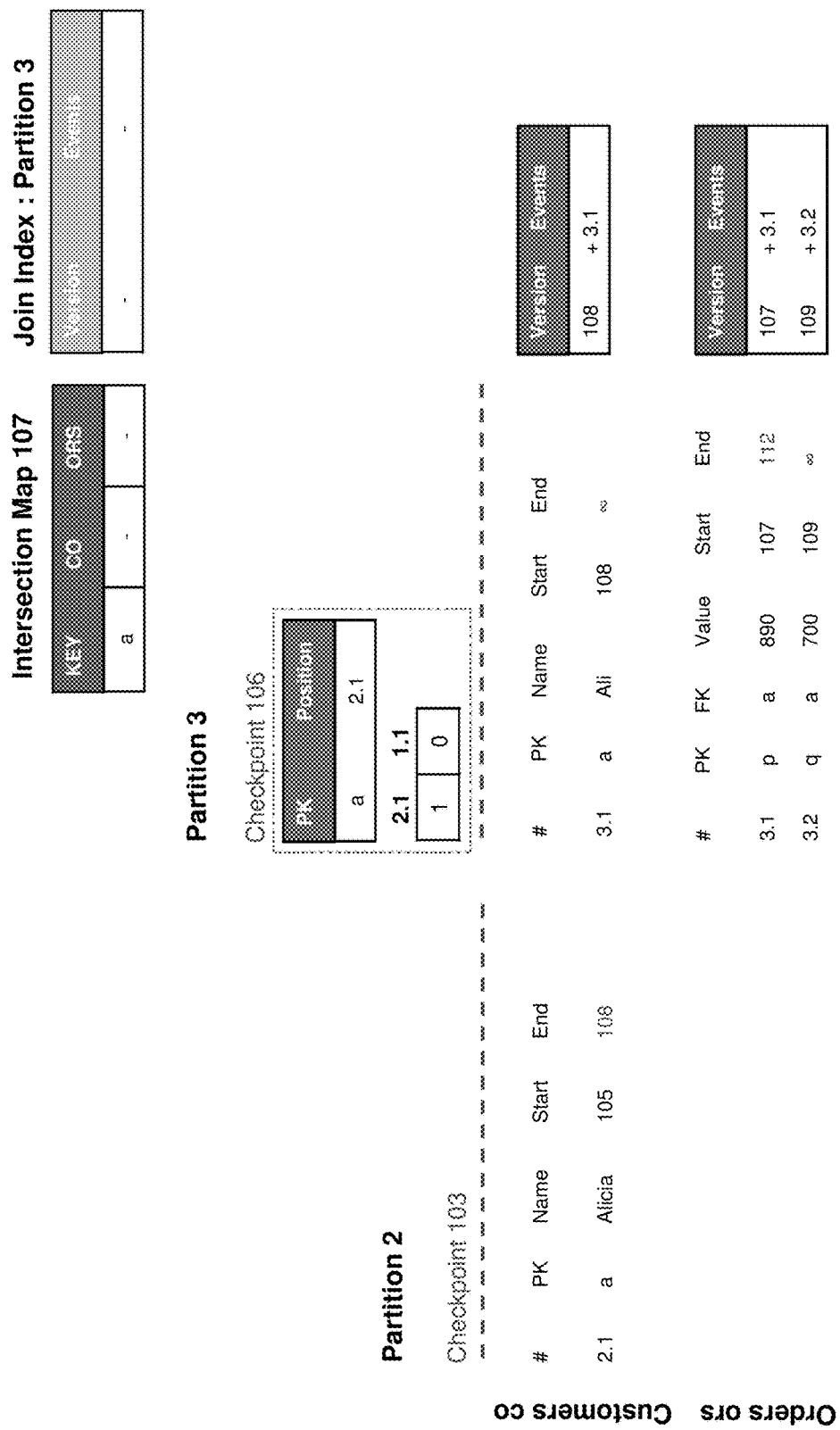
FIGS. 30, 31, 32, 33, 34, 35, 36, 37, 38, and 39 show execution of a temporal join operator in parallel in a partition-by-time scenario.

FIG. 29 shows an example system for performing a temporal join operator in a partition-by-time scenario and includes example data.

The temporal join operator selects the tuples of two tables that are visible at the same time within a time interval [v_begin, v_end] as follows:

Compute ID of partition for the lower interval border:
partition_id=getPartition(v_begin)
    Perform a temporal join as in the single threaded case on every partition that is in the interval [v_begin, v_end]
    Whenever the referenced primary key (PK) is not in the same partition, use the primary key map to look up the respective tuple with the matching primary key in a different partition.

Figure 34:
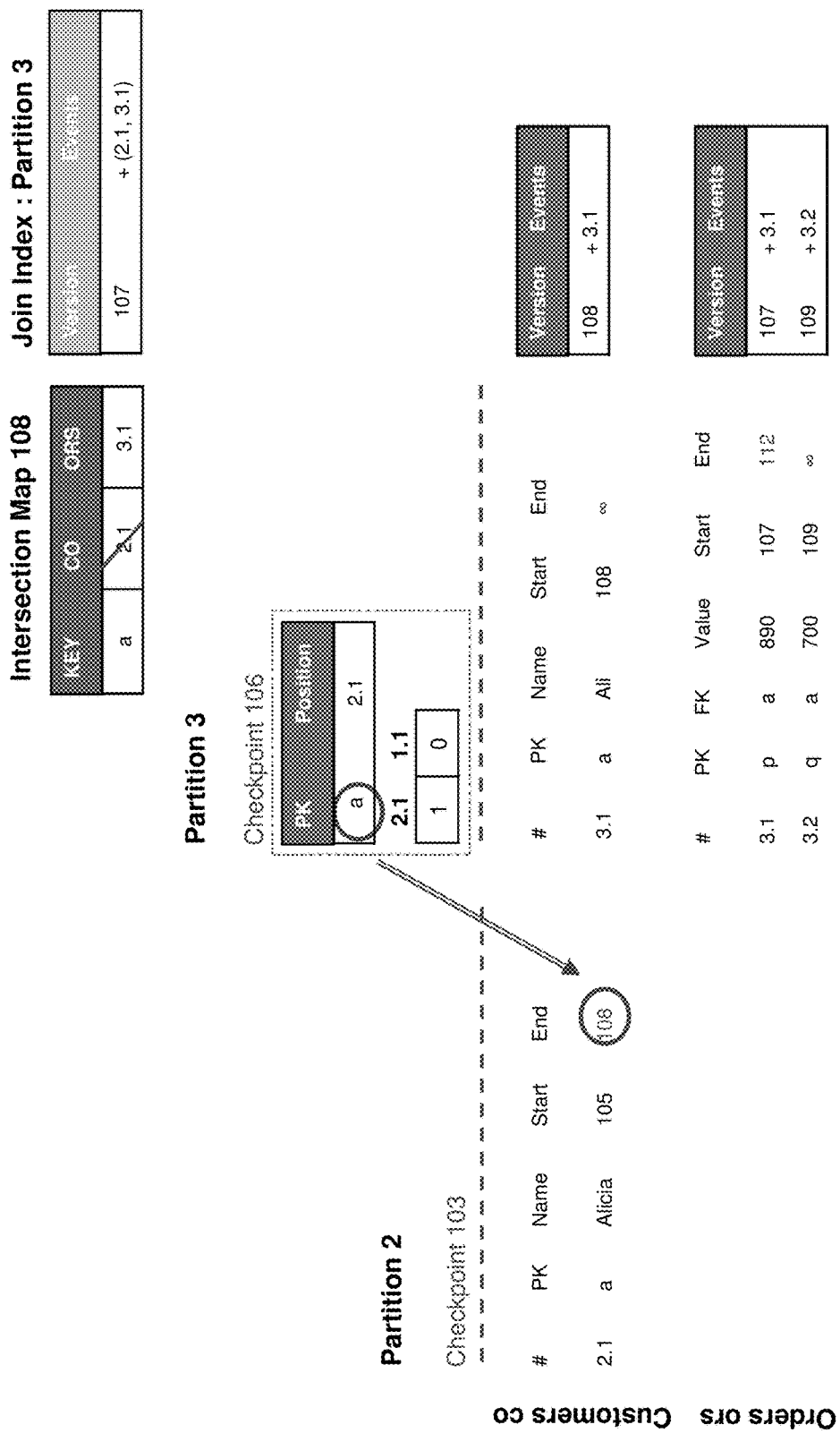

The example temporal join operator effectively answers "What are the orders of the customers at each point in time?"
SELECT *
FROM Customer co TEMPORAL JOIN Orders ors
ON co.pk=ors.fk As shown in FIG. 29, a checkpoint 2910 including the primary key map for the table Customers and a checkpoint 2920 including the primary key map for the table Orders can be included. Partitions can complement the information contained in their primary key maps with (start time, end time) pairs by doing a lookup. The end time can be taken into account in order to determine invalidations of (foreign row index, local row index) pairs in the intersection map because the local timeline indexes do not contain information on tuples of other partitions. An expel is shown in FIG. 34, below.

FIGS. 30, 31, 32, 33, 34, 35, 36, 37, 38, and 39 show execution of a temporal join operator in parallel in a partition-by-time scenario. For purposes of illustration, the following are omitted, but can still be implemented in practice: partition 1 and its checkpoints, orders table in partition 2, checkpoint 103 for customers, checkpoint 103 for orders, checkpoint 106 for orders. The computation of the temporal join operation is shown by the example of partition 3 (covering versions 107 through 109). The Customers table as of partition is also depicted because it contains that that is used for the join index as computed by partition 3. Partitions 2 and 3 can be determined similarly and in parallel with partition 3 (which is a partial, local result). As shown, both a primary key (PK) and foreign key (FK) can be involved. The process can involve going back to access the actual partition in order to retrieve a value of a foreign key.

Figure 31:
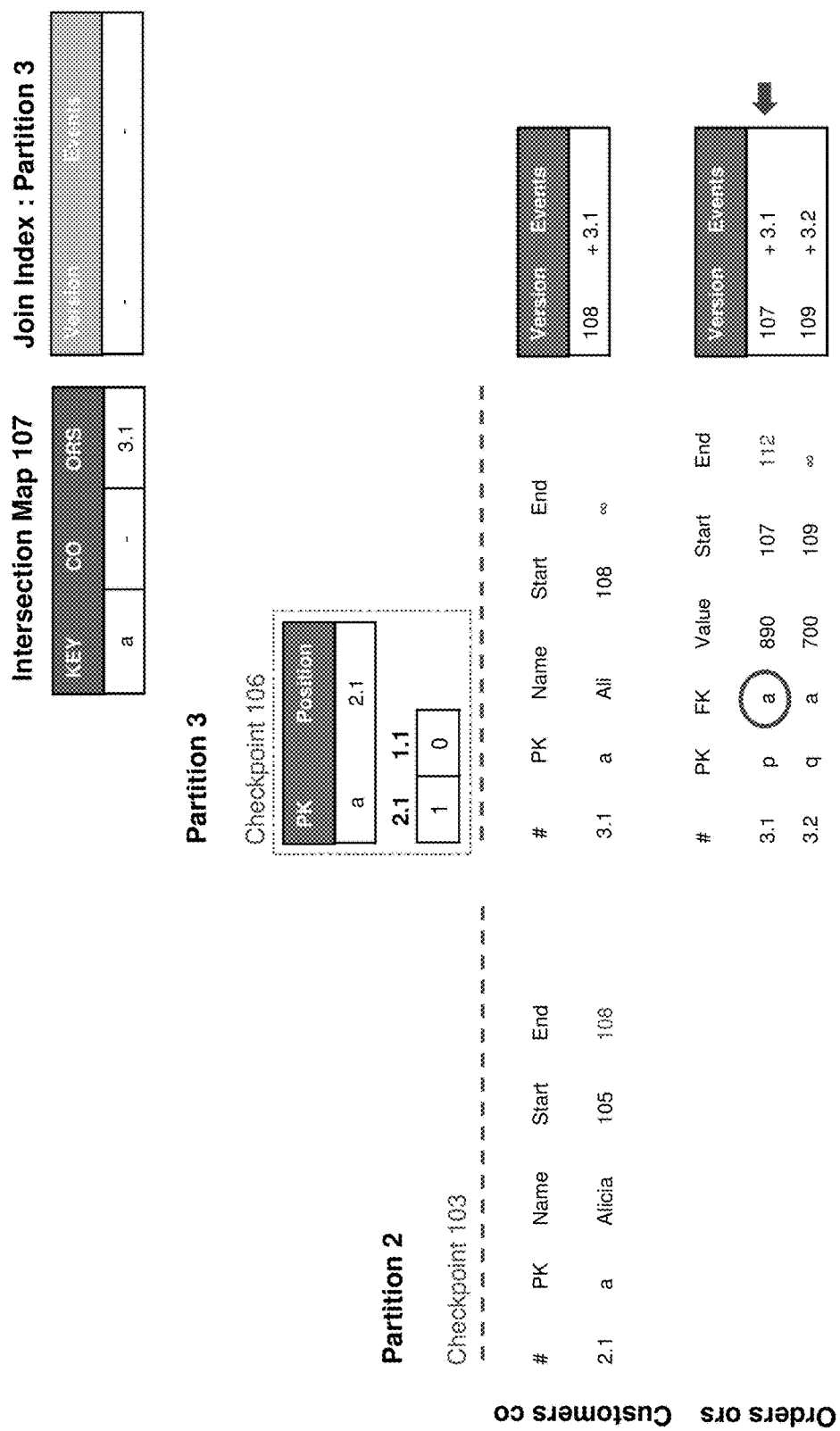

FIG. 31 shows the computation starting at version 107. Only the orders table/timeline index contains a tuple/an entry for version 107. Row 3.1 of the Orders to which the index entry at 107 is pointing contains "a" as a foreign key.

Figure 32:
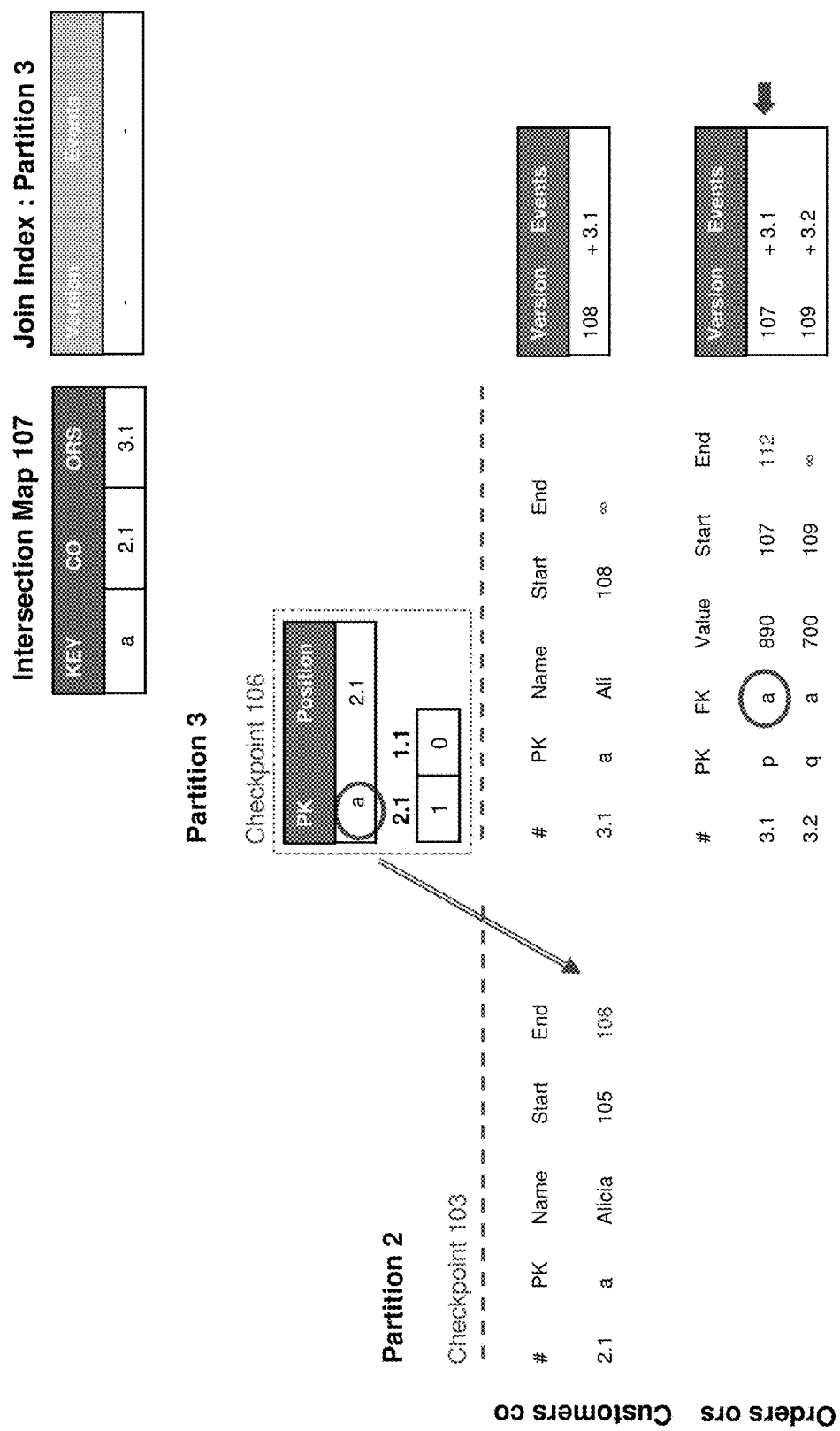

FIG. 32 shows that at 107, it is known that there must be a customer with a matching primary key "a" due to referential integrity. But, there is no matching customer in the Customers table of partition 3. Therefore, the matching customer must have been activated at a time prior to 107, and, thus, is in a different partition.

So, the primary key map described above that comes with checkpoint 106 can be used to look up the respective Customers tuple (i.e., the customer with the matching primary key "a"). The long red arrow illustrates the lookup.

In the example, the result of the look up is a tuple (a, 2.1, 105, 108), that is, a tuple that contains the primary key, the tuple's position (partition and row), the "start" and "end" times The lookup result is cached for further computation. With the information, one the intersection map can be completed at 107.

Figure 33:
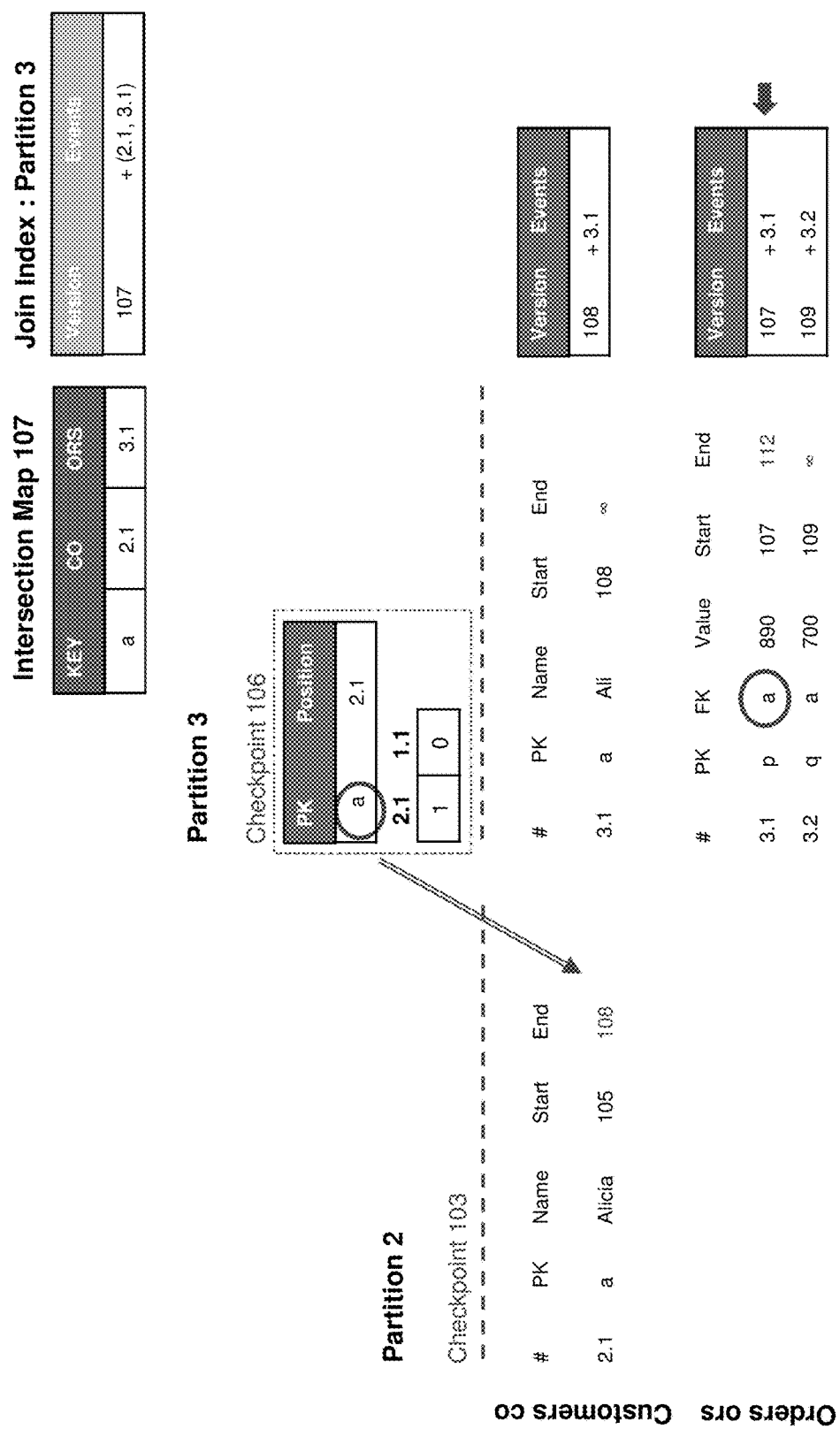

FIG. 33 shows that the intersection map contains a change that involves a pair of rows. In this case, there has been a join of the rows 2.1 and 3.1. Thus, an activation entry is written into the join index of partition 3 as shown.

FIG. 34 proceeds to version 108. The timeline index for the Orders table in partition 3 does not contain an entry for 108. The timeline index for Customers, on the other hand, does contain an entry for 108 (in this case, the addition of Customer row 3.1).

But, it is noted that there is a third piece of information that can be incorporated into the analysis for version 108. The intersection map may contain pairs of row ids that belong to other partitions (e.g., the id of a row with the matching primary key in a different partition and the id of a row with the matching foreign key in this partition). Thus, there can be both (local, local) and (foreign, foreign) pairs.

In the example, the intersection indeed contains such a pair, namely (2.1, 3.1). The pair could be invalidated at 108 if either 2.1 is invalidated at 108 or if 3.1 is invalidated at 108 (or both). By inspecting at the timeline indexes of partition 3, it can be determined that the pair is not being invalidated at 108 because the timeline index for the Orders tables does not contain a respective entry (i.e., the timeline index for the Orders table does not contain "108 –3.1"). But, what about an invalidation of the pair due to an invalidation of the Customers row 2.1?

The timeline indexes of partition 3 do not contain information (start and end times) on the rows of other partitions (with the exception of duplicated index entries for invalidation events), so it cannot be determined whether the pair in the intersection map should or should not be invalidated at 108 by solely looking at the timeline indexes of partition 3.

The information on 2.1 comes from the cached result of the previous look up (e.g., a, 2.1, 105, 108). In the example, it can be determined that the row 2.1 is invalidated at 108.

So, in FIG. 34 the cached lookup results for invalidation are first checked at 108. The red arrow illustrates the source of the piece of information). 2.1 is then removed from the intersection map as it is invalidated at 108.

Figure 35:
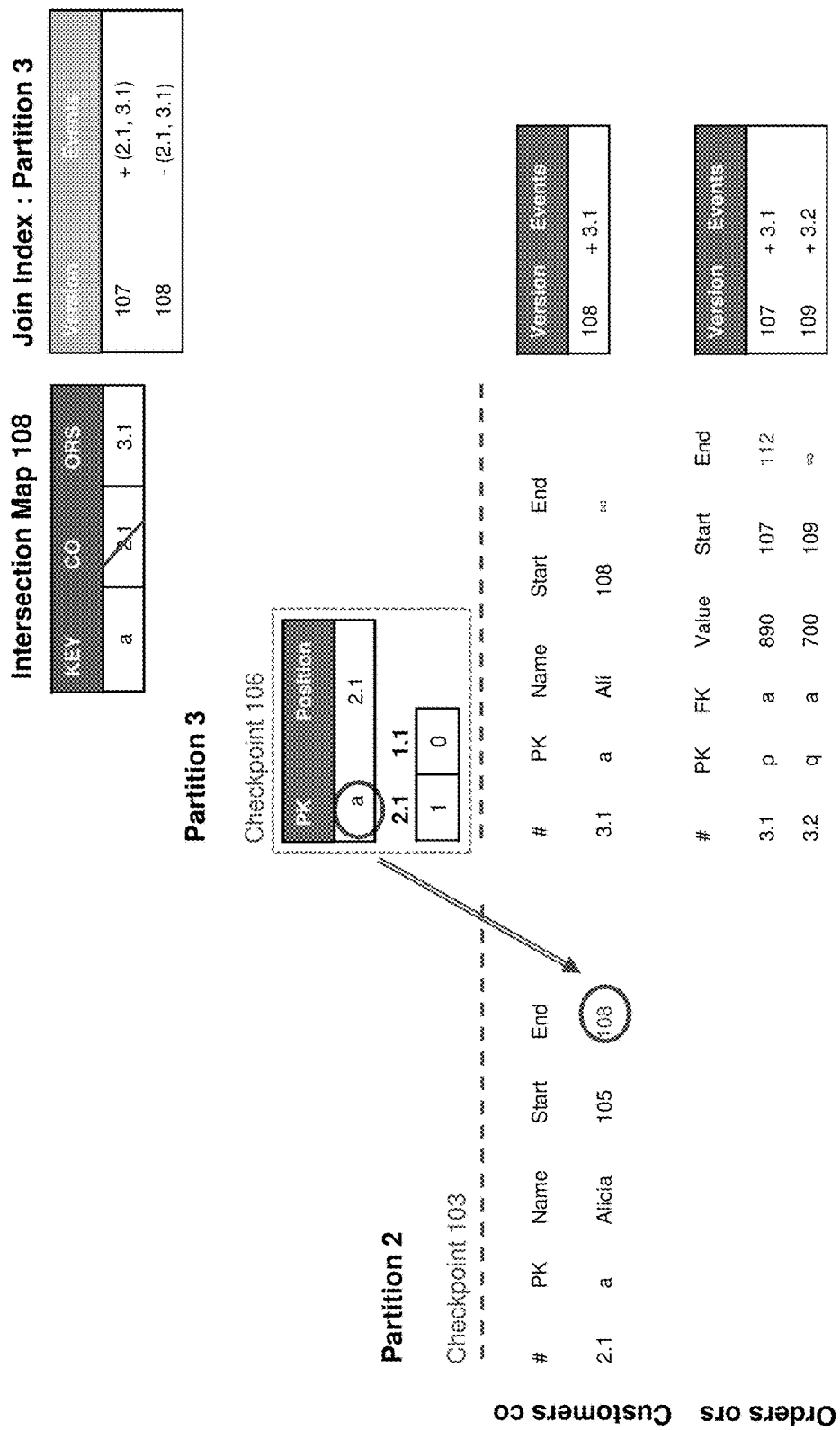
Figure 36:
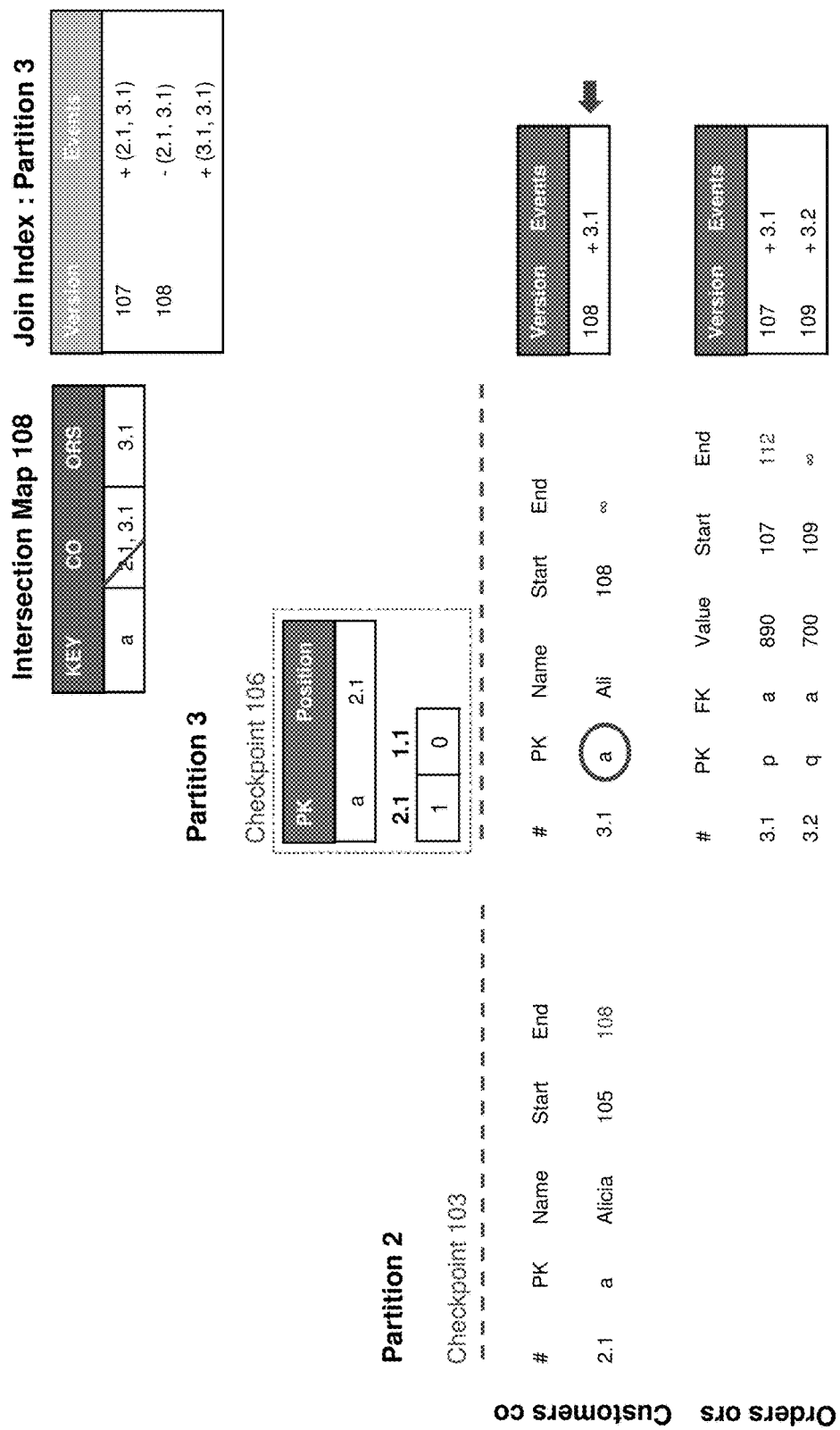
Figure 37:
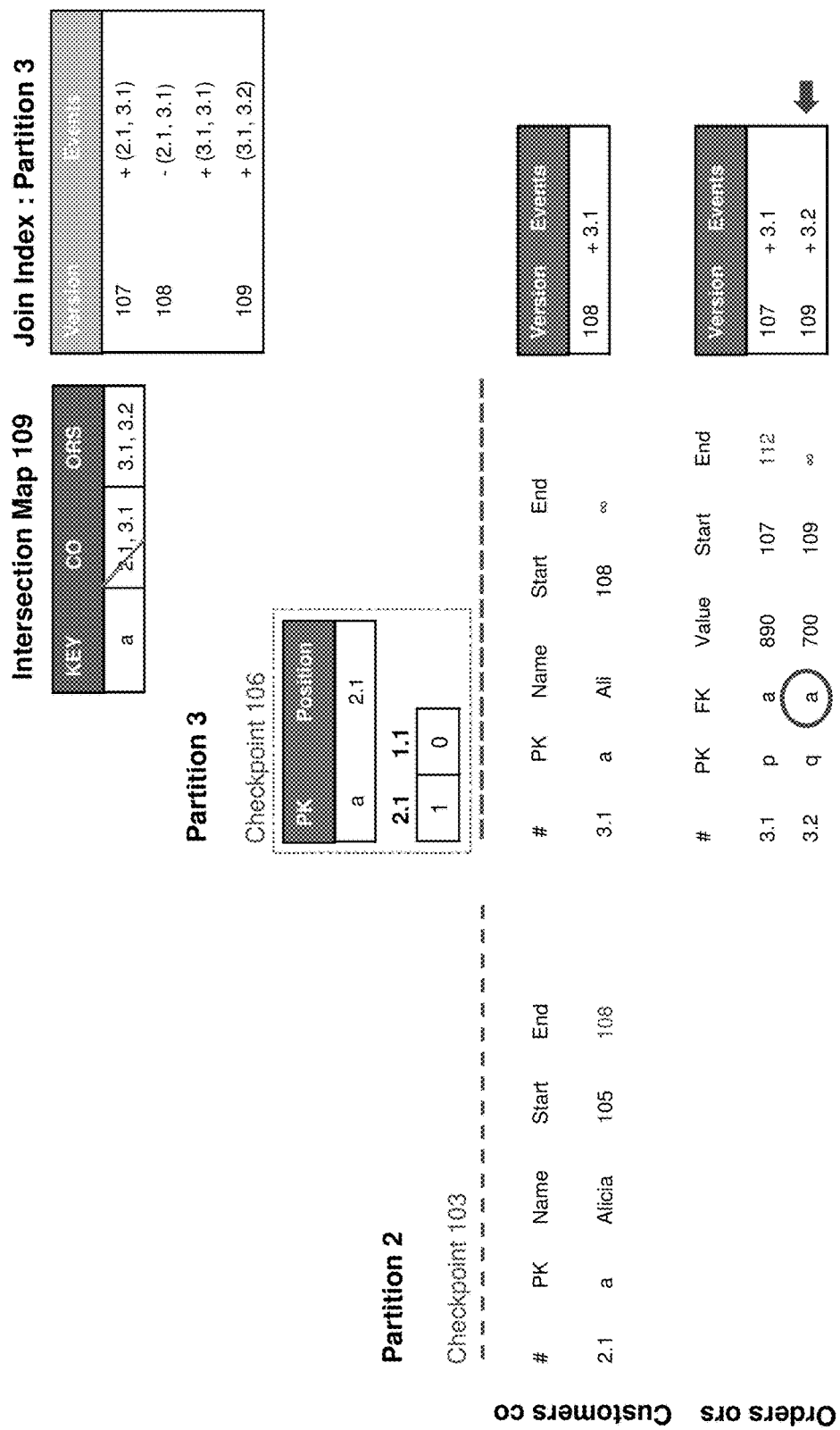
Figure 38:
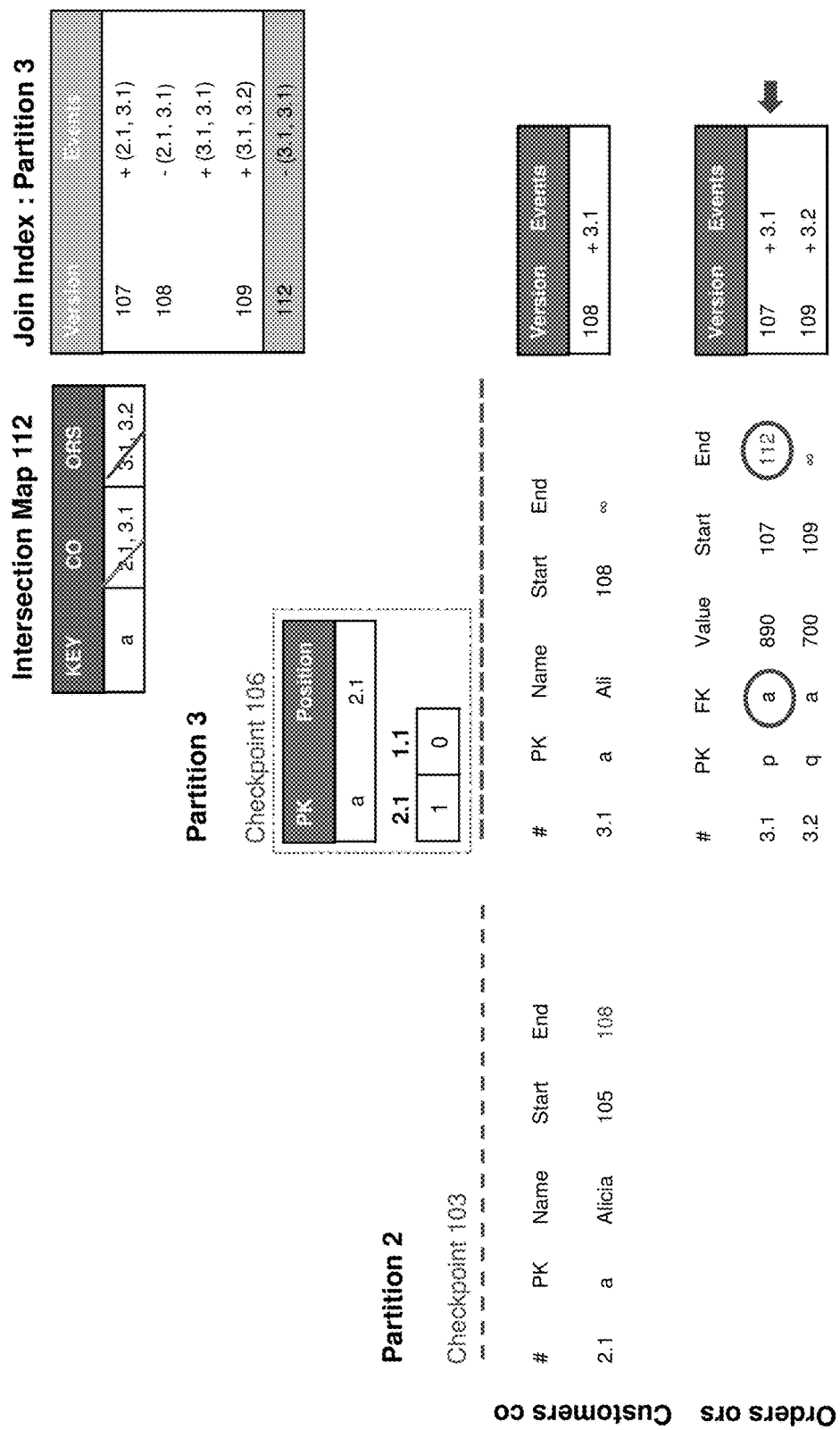
Figure 39:
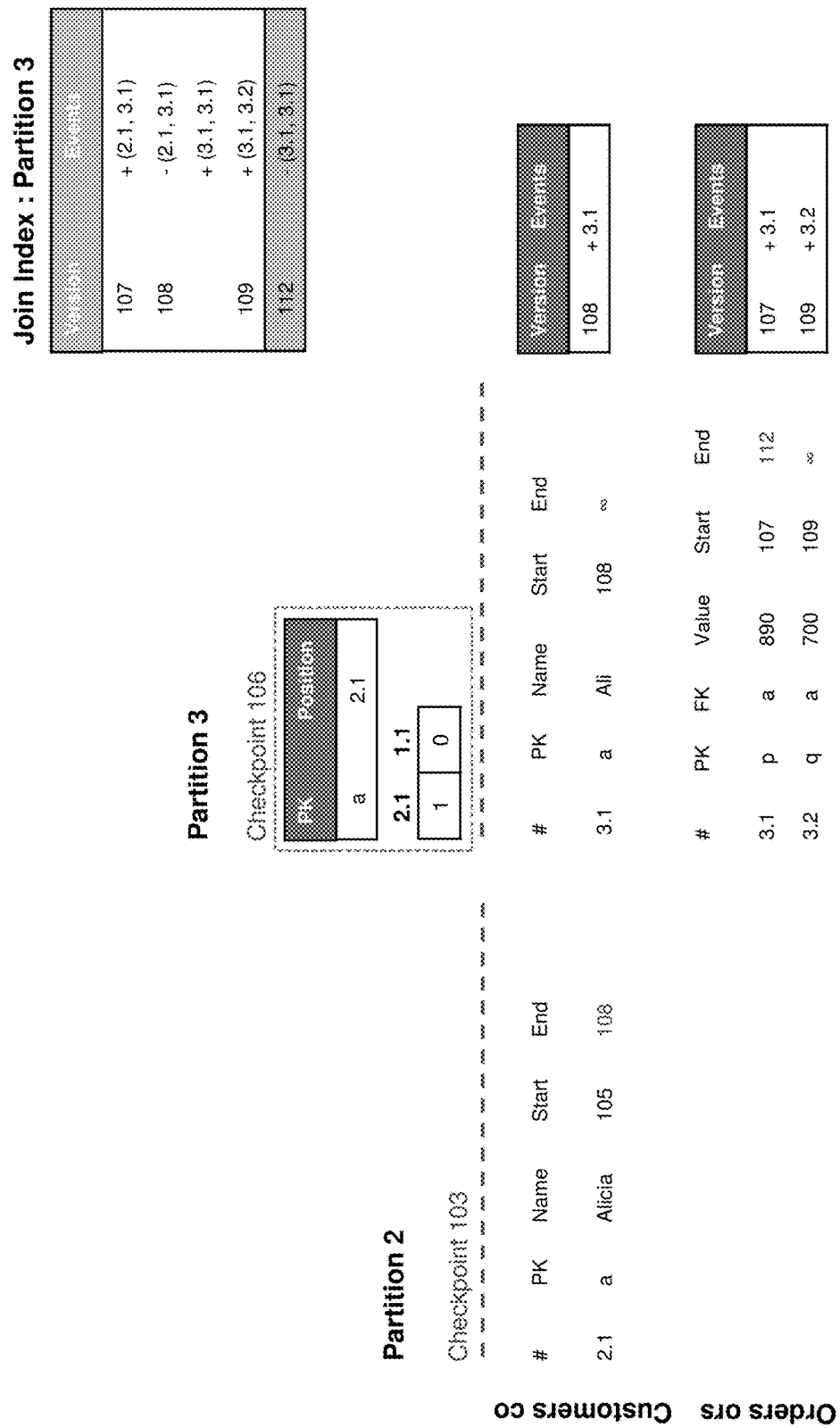

At FIG. 35, it is determined that the intersection map contains a change that involves a pair of rows. In the example, 2.1 in the pair (2.1, 3.1) was invalidated. Thus, an invalidation entry is written into the join index of partition 2 for the invalidated pair.

When joining tables for a partition n, it is possible to only consult the timeline index for partition n for both tables. This can happen if there are two matching customer and order pairs in the same partition that also meet in time. For example, a join of the tables co and ors can be achieved by only consulting the timeline index for partition 1 of both tables:

Partition 1: 100-103
Customers cu
1.1, a, 100, 102
1.2, b, 101, infinity
1.3, a, 102, 205
Orders ors
1.1, q, a, 101, 103
1.2, r, b, 102, 103

In the example, orders can be joined with customers by only consulting the timeline indexes of partition 1 (for both tables). Joining the two tables results in the following join index:

Join Index of Partition 1
101 +(1.1, 1.1)//1.1 of cu finds a join partner in ors at 101
102 −(1.1, 1.1)//1.1 of cu is invalidated
102 +(1.3, 1.1)//1.1 or ors finds a new join partner cu at 102
102 +(1.2, 1.2)//1.2 of cu finds a new join partner in ors at 102
103 −(1.3, 1.1)//1.1 of ors is invalidated
103 −(1.2, 1.2)//1.2 of ors is invalidated However, in an other example, consulting on a single partition (2) for both tables does not work:

Partition 1: 100-103
Customers cu
1.1, a, 100, 107
Orders ors
1.1m q, a, 101, 103
Partition 2: 104-106
Customers cu
1.1, a, 105, infinity
Orders ors
1.2, r, a, 104, 106

In the example, it is not sufficient to only consult the timeline indexes of partition 2 for both tables. Partition 2 has matching customer-order pairs; however, the pairs do not meet in time: Tuple 2.1 of Orders references a customer tuple with a primary key "a" that is active at 104. The matching customer tuple that is active at 104, however, can be found in partition 1. Therefore, partition 2's primary keymap can be used to do a lookup in order to perform the join correctly.

Figure 40:
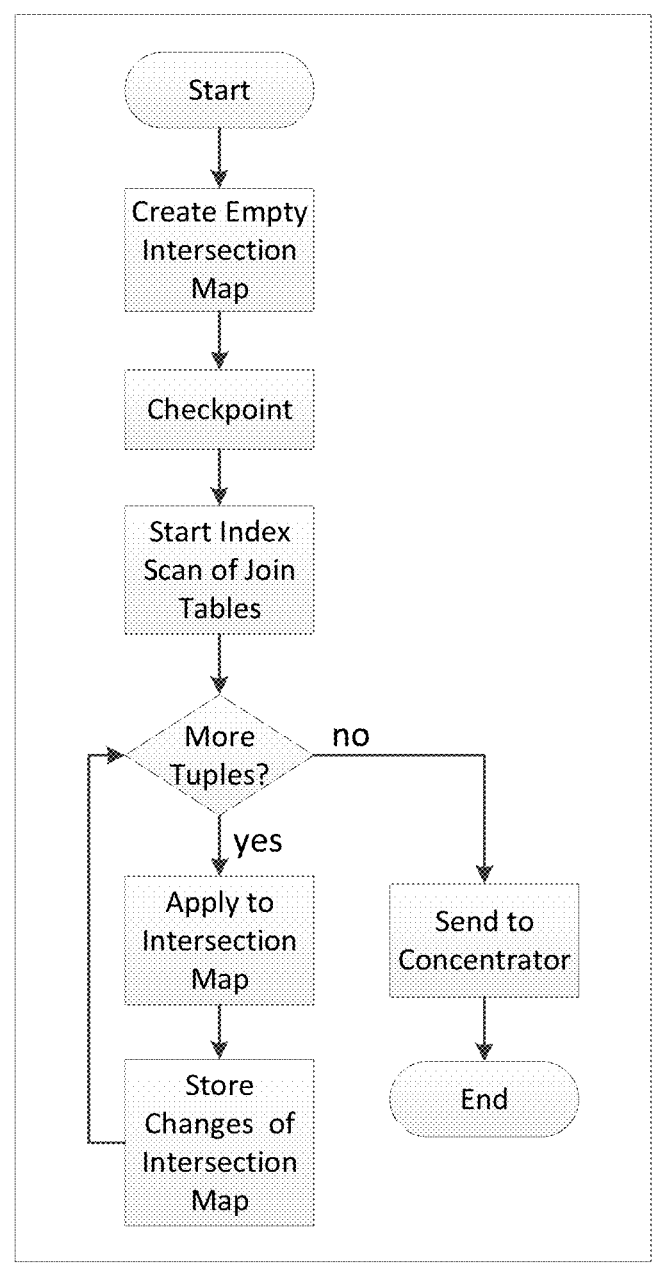
FIG. 40 is a flowchart of an example method of generating partial results of a temporal join for a given partition.

FIG. 40 is a flowchart of an example method 4000 of generating partial results of a temporal join for a given partition.

The result of the partitions can be merged into a global result.

Figure 41:
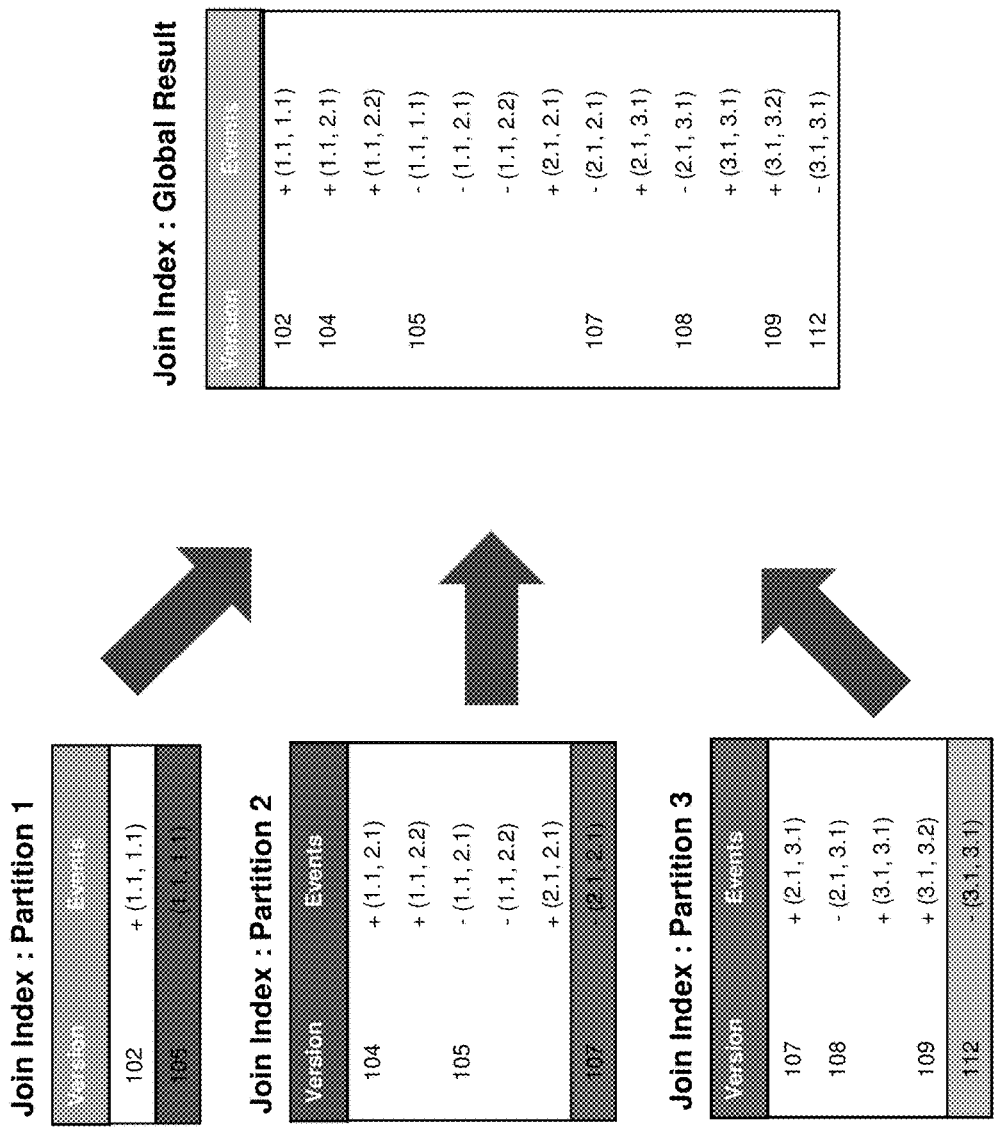
FIG. 41 shows an example combination of partial results for a temporal join operator in a partition-by-time scenario.
Figure 42:
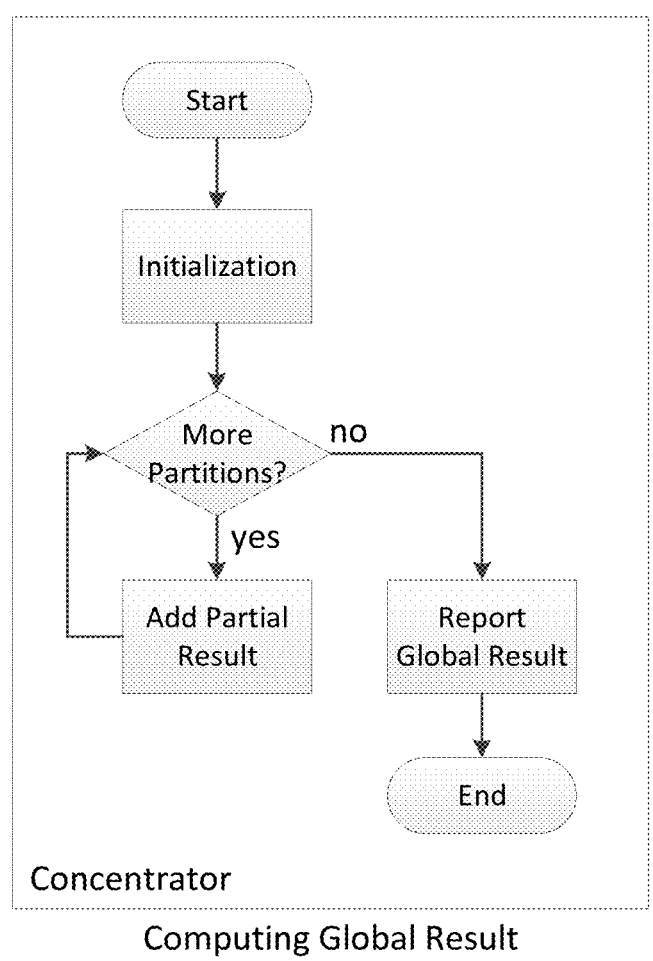
FIG. 42 is a flowchart of an example method of concentrating partial results of a temporal join for plural partitions to compute a global result.

FIG. 41 shows an example combination of partial results for a temporal join operator in a partition-by-time scenario. FIG. 42 is a flowchart of an example method 4200 of concentrating partial results of a temporal join for plural partitions to compute a global result.

Example 39—Example Data for Partition by Space

Figure 43:
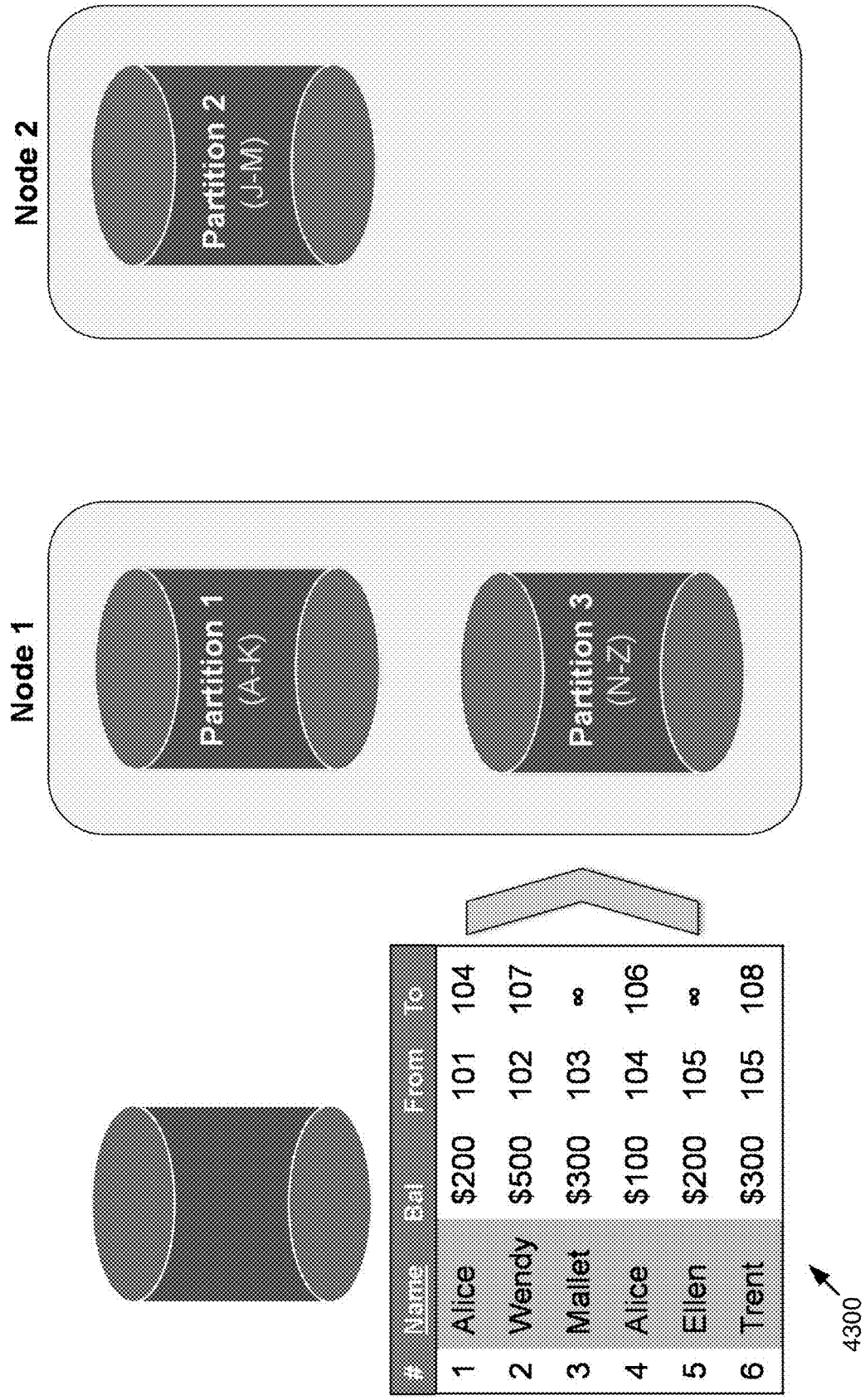
FIG. 43 is a block diagram of an example system having example data in a partition-by-space scenario.

FIG. 43 is a block diagram of an example system 4300 having example data in a partition-by-space scenario that is used below.

Example 40—Example Temporal Cumulative Aggregation (Partition by Space)

FIG. 44 is a block diagram showing calculation of a temporal cumulative aggregation operator (e.g., SUM or the like) in parallel in a partition-by-space scenario.

FIG. 45 shows concentrating partial results of a temporal cumulative aggregation operator in a partition-by-space scenario.

In the example, a cumulative temporal aggregation in a time interval (v_begin, v_end) is computed as follows:

Compute the temporal aggregation locally for each partition. In the example, generating the plurality of partial results comprises computing the aggregation locally for respective of the partitions.

Transfer the result to one node and combine the partial results from the different partitions. In the example, combining the partial results comprises performing the aggregation across the partial results (e.g., calculating the aggregation using the partial results for a same version across different partitions as input).

Example 41—Example Temporal Selective Aggregation (Partition by Space)

FIG. 46 is a block diagram showing calculation of a temporal selective aggregation operator (e.g., MAX or the like) in parallel in a partition-by-space scenario.

FIG. 47 shows concentrating partial results of a temporal selective aggregation operator in a partition-by-space scenario.

An approach similar to that for cumulative aggregations can be used as shown.

Example 42—Example Time Travel (Partition by Space)

Figure 48:
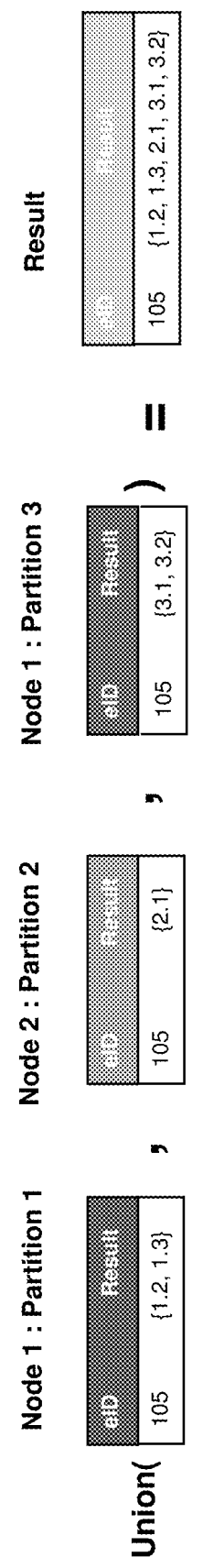
FIG. 48 is a block diagram showing calculation of a time travel operator in parallel in a partition-by-space scenario.

FIG. 48 is a block diagram showing calculation of a time travel operator in parallel in a partition-by-space scenario. The operator can select all tuples that are visible at a given version id as follows:

Compute the time travel locally for each partition. Thus, generating the plurality of partial results for the temporal operator calculation comprises computing time travel locally for respective of the partitions (e.g., finding the tuples for the partition that are visible at the indicated time/version).

Transfer the result to one node and combine the results. Thus, combining the partial results comprises forming a union of the tuples indicated in the partial results.

Example 43—Example Temporal Join (Partition by Space)

FIG. 49 is a block diagram showing calculation of a temporal join operator in parallel in a partition-by-space scenario In the example, Customers (co) are partitioned by primary key, but Orders (ors) are partitioned by foreign key. Other partition arrangements are possible (e.g., placing customers from particular regions or other geographic areas into respective partitions).

In the example, generating the plurality of partial results of the temporal operator calculation comprises generating join indexes for respective of the partitions. The join index shows the activations and invalidations of tuples per version for the partition.

Figure 50:
FIG. 50 shows concentrating partial results of a temporal join operator in a partition-by-space scenario.
Figure 50:
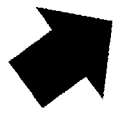

FIG. 50 shows concentrating partial results of a temporal join operator in a partition-by-space scenario. In the example, combining the partial results comprises forming a union of the tuples indicated in the join indexes. The ultimate result can then be computed based on the union of activations and invalidations (e.g., by evolving the set of visible joined tuples over time).

The operator can select all tuples of two tables which are visible at the same time within a time interval (v_begin, v_end) as follows:

In a first case: Compute a temporal join in combination with a spatial join for which all join partners are on the same partition:
  Evaluate spatial join condition first and exploit that the data is partitioned by space in order to reduce the size of the intermediate join result
  Run a post-filter to evaluate the tuples whose time interval overlaps In a second case: Temporal Join only or tables stored on different partitions
  Transfer position and time intervals of the smaller table to all nodes which store parts of the temporal table
  Run a filter to determine tuples whose time interval overlaps and an additional spatial condition holds (if any has been defined)

Figure 51:
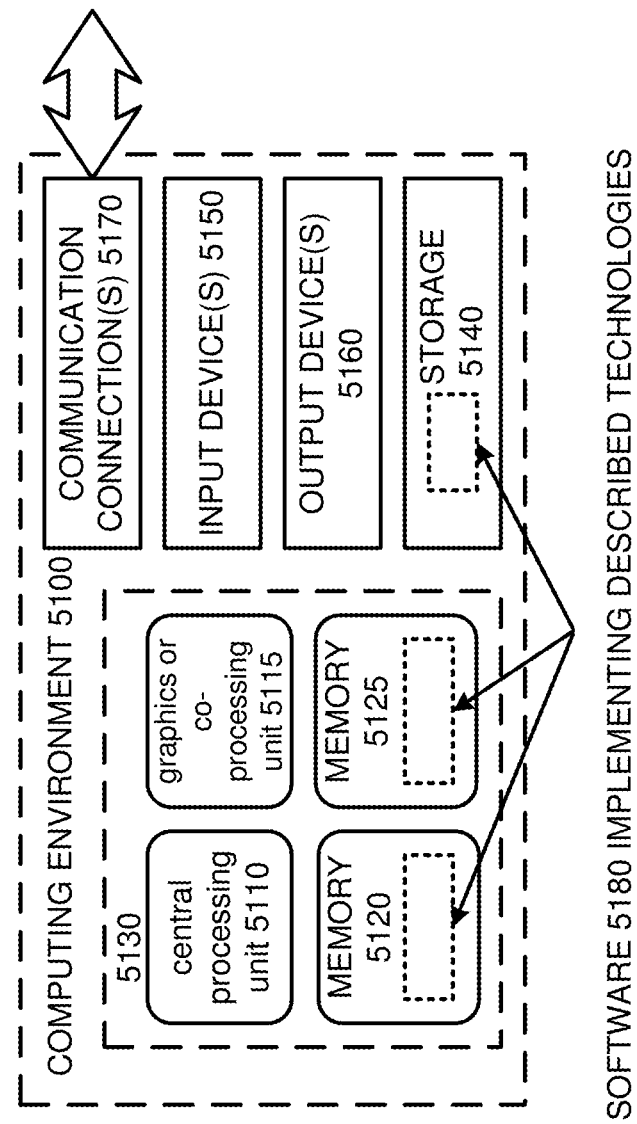
FIG. 51 depicts a generalized example of a suitable computing environment in which the described innovations may be implemented.
Figure 52:
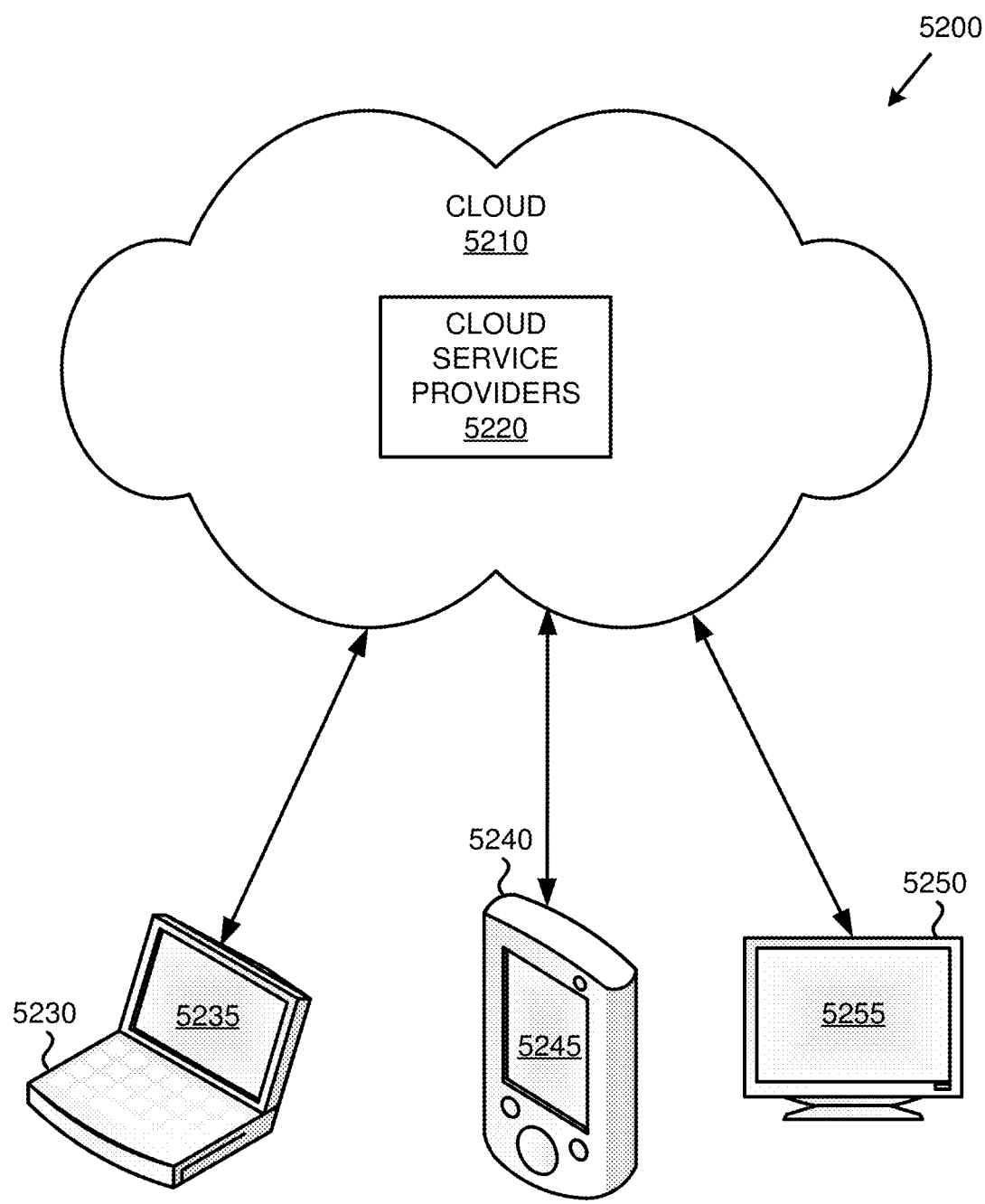
FIG. 52 is an example cloud-support environment that can be used in conjunction with the technologies described herein.

In a third case: Manual placement of partitions using domain knowledge
  For example, group customers and their respective orders together
  Supports only limited range of possible queries
  Example: PK and matching FK in the same partition Example 44—Example Computing Environment FIG. 51 depicts a generalized example of a suitable computing environment (e.g., computing system) 5100 in which the described innovations may be implemented. The computing environment 5100 is not intended to suggest any limitation as to scope of use or functionality, as the innovations may be implemented in diverse general-purpose or special-purpose computing systems. For example, the computing environment 5100 can be any of a variety of computing devices (e.g., desktop computer, laptop computer, server computer, tablet computer, etc.).

With reference to FIG. 51, the computing environment 5100 includes one or more processing units 5110, 5115 and memory 5120, 5125. In FIG. 51, this basic configuration 5130 is included within a dashed line. The processing units 5110, 5115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 51 shows a central processing unit 5110 as well as a graphics processing unit or co-processing unit 5115. The tangible memory 5120, 5125 may be volatile memory (e.g., registers, cache, RAM), non-volatile memory (e.g., ROM, EEPROM, flash memory, etc.), or some combination of the two, accessible by the processing unit(s). The memory 5120, 5125 stores software 5180 implementing one or more innovations described herein, in the form of computer-executable instructions suitable for execution by the processing unit(s).

A computing system may have additional features. For example, the computing environment 5100 includes storage 5140, one or more input devices 5150, one or more output devices 5160, and one or more communication connections 5170. An interconnection mechanism (not shown) such as a bus, controller, or network interconnects the components of the computing environment 5100. Typically, operating system software (not shown) provides an operating environment for other software executing in the computing environment 5100, and coordinates activities of the components of the computing environment 5100.

The tangible storage 5140 may be removable or non-removable, and includes magnetic disks, magnetic tapes or cassettes, CD-ROMs, DVDs, or any other medium which can be used to store information in a non-transitory way and which can be accessed within the computing environment 5100. The storage 5140 stores instructions for the software 5180 implementing one or more innovations described herein. For example, the rules engine and others described herein can be the software 5180 executed from the memory 5120.

The input device(s) 5150 may be a touch input device such as a keyboard, mouse, pen, or trackball, a voice input device, a scanning device, or another device that provides input to the computing environment 5100. The output device(s) 5160 may be a display, printer, speaker, CD-writer, or another device that provides output from the computing environment 5100.

The communication connection(s) 5170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although direct connection between computer systems is shown in some examples, in practice, components can be arbitrarily coupled via a network that coordinates communication.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Example 45—Example Cloud-Supported Environment

In example environment 5200, the cloud 5210 provides services for connected devices 5230, 5240, 5250 with a variety of screen capabilities. Connected device 5230 represents a device with a computer screen 5235 (e.g., a mid-size screen). For example, connected device 5230 could be a personal computer such as desktop computer, laptop, notebook, netbook, or the like. Connected device 5240 represents a device with a mobile device screen 5245 (e.g., a small size screen). For example, connected device 5240 could be a mobile phone, smart phone, personal digital assistant, tablet computer, and the like. Connected device 5250 represents a device with a large screen 5255. For example, connected device 5250 could be a television screen (e.g., a smart television) or another device connected to a television (e.g., a set-top box or gaming console) or the like. One or more of the connected devices 5230, 5240, 5250 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 5200. For example, the cloud 5210 can provide services for one or more computers (e.g., server computers) without displays.

Services can be provided by the cloud 5210 through cloud service providers 5220, or through other providers of online services (not depicted). For example, cloud services can be customized to the screen size, display capability, and/or touch screen capability of a particular connected device (e.g., connected devices 5230, 5240, 5250).

In example environment 5200, the cloud 5210 provides the technologies and solutions described herein to the various connected devices 5230, 5240, 5250 using, at least in part, the service providers 5220. For example, the service providers 5220 can provide a centralized solution for various cloud-based services. The service providers 5220 can manage service subscriptions for users and/or devices (e.g., for the connected devices 5230, 5240, 5250 and/or their respective users).

Non-Transitory Computer-Readable Media

Any of the computer-readable media herein can be non-transitory (e.g., memory, magnetic storage, optical storage, solid-state drives, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, solid-state drives, or the like). Such instructions can cause a computer to perform the method.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a computing system, the method comprising:

storing a plurality of tuples, respectively having a start time, in a plurality of partitions of a temporal database table partitioned according to a temporal partition technique and having respective time intervals comprising respective time interval begin times and time interval end times, wherein a given tuple is stored in a given partition for which the given tuple's start time is inside the given partition's time interval's begin time and time interval end time;

storing a plurality of tuple events for the plurality of tuples in a plurality of partial timeline indexes respectively associated with the plurality of partitions, wherein a given partial timeline index is associated with the given partition and stores tuple events for tuples in the given partition, wherein tuple events in the given partial timeline index that occur inside the time interval of the associated given partition are stored within a local component of the given partial timeline index and tuple events in the given partial timeline index that occur outside the time interval of the associated given partition are stored within a foreign component of the given partial timeline index, wherein the tuple events comprise at least one activation event and at least one invalidation event, the activation event occurs within a time interval of a first partition, the invalidation event occurs within a time interval of a second partition different from the first partition, and the invalidation event is stored twice: in a partial timeline index of the first partition and in a partial timeline index of the second partition;

generating, in parallel, a plurality of partial results of a temporal operator calculation based in part on one or more of the plurality of tuple events stored in the plurality of partial timeline indexes, wherein the generating comprises generating one partial result per partition, wherein the partial results are themselves expressed as timeline indexes; and generating a global result of the temporal operator calculation, wherein the generating comprises combining the plurality of partial results that are expressed as timeline indexes.

2. One or more non-transitory computer-readable media comprising computer-executable instructions causing a computing system to perform a method comprising:

storing a plurality of tuples, respectively having a start time, in a plurality of partitions of a temporal database table partitioned according to a temporal partition technique and having respective time intervals comprising respective time interval begin times and time interval end times, wherein a given tuple is stored in a given partition for which the given tuple's start time is inside the given partition's time interval's begin time and time interval end time;

storing a plurality of tuple events for the plurality of tuples in a plurality of partial timeline indexes respectively associated with the plurality of partitions, wherein a given partial timeline index is associated with the given partition and stores tuple events for tuples in the given partition, wherein tuple events in the given partial timeline index that occur inside the time interval of the associated given partition are stored within a local component of the given partial timeline index and tuple events in the given partial timeline index that occur outside the time interval of the associated given partition are stored within a foreign component of the given partial timeline index, wherein the tuple events comprise at least one activation event and at least one invalidation event, the activation event occurs within a time interval of a first partition, the invalidation event occurs within a time interval of a second partition different from the first partition, and the invalidation event is stored twice: in a partial timeline index of the first partition and in a partial timeline index of the second partition;

generating, in parallel, a plurality of partial results of a temporal operator calculation based in part on one or more of the plurality of tuple events stored in the plurality of partial timeline indexes, wherein the generating comprises generating one partial result per partition, wherein the partial results are themselves expressed as timeline indexes; and generating a global result of the temporal operator calculation, wherein the generating comprises combining the plurality of partial results that are expressed as timeline indexes.

3. The method of claim 1 wherein:
the plurality of partial timeline indexes are stored at a plurality of different, distributed nodes.

4. The method of claim 1 wherein:
the plurality of partial results are computed in parallel at a plurality of different, distributed nodes.

5. The method of claim 1 wherein:
the temporal partition technique comprises a time-based technique grouping tuples of the temporal database table within different time intervals into different partitions.

6. The method of claim 1 wherein:
the temporal partition technique comprises a space-based technique grouping tuples of the temporal database table having different keys into different partitions.

7. The method of claim 6 further comprising:
based on the temporal operator calculation, switching among:
for temporal aggregation, generating the plurality of partial results of the temporal operator calculation with the partial timeline indexes comprises computing aggregation locally for respective of the partitions, and combining the partial results comprises performing the aggregation across the partial results;
for time travel, generating the plurality of partial results of the temporal operator calculation with the partial timeline indexes comprises computing time travel locally for respective of the partitions, and combining the partial results comprises forming a union of tuples indicated in the partial results; and
for temporal join, generating the plurality of partial results of the temporal operator calculation with the partial timeline indexes comprises generating join indexes for respective of the partitions, and combining the partial results comprises forming a union of tuples indicated in the join indexes.

8. The method of claim 1 wherein:
a given partial timeline index of the partial timeline indexes comprises references to activations of tuples of a partition of the temporal database table that are activated within a time interval associated with the given partial timeline index.

9. The method of claim 1 wherein:
at least one partial timeline index out of the partial timeline indexes is associated with a partition of the temporal database table representing a time interval for the temporal database table;
the partial timeline index comprises a foreign component; and
the foreign component comprises references to invalidations of tuples in the partition of the temporal database table that are activated by a tuple in the partition of the temporal database table but invalided after the time interval.

10. The method of claim 9 wherein:
the partial timeline index further comprises a local component; and
the local component comprises references to tuples in the partition of the temporal database table that are activated within the time interval and references to tuples in the partition of the temporal database table that are invalidated within the time interval.

11. The method of claim 1 further comprising:
consulting a checkpoint associated with a given partition of the temporal database table, wherein the checkpoint indicates which tuples of the temporal database table are visible at a particular point in time.

12. The method of claim 1 wherein:
the temporal operator calculation comprises a temporal join between the temporal database table and a second temporal database table; and
the method further comprises:
for a given partition of the temporal database table, evolving an intersection map based on events indicated in a partial timeline index associated with the given partition.

13. The method of claim 1 wherein:
the temporal operator calculation comprises a temporal cumulative aggregation; and
combining the plurality of partial results comprises:
calculating a global result for a given version, wherein the calculation comprises combining the plurality of partial results for a particular version from a plurality of different partitions.

14. A system comprising one or more non-transitory computer-readable media comprising:
a plurality of temporal partitions representing respective time intervals of a temporal database, wherein the time intervals comprise respective time interval begin times and time interval end times, wherein the respective time intervals are subsets of a timeline for the temporal database, and wherein the respective partitions of the plurality of temporal partitions respectively store tuples activated in their respective time intervals;
a plurality of partial timeline indexes respectively indexing the plurality of temporal partitions, wherein a given partial timeline index is associated with a particular temporal partition having a particular time interval of the respective time intervals and the given partial timeline index comprises a local component and a foreign component, the local component comprising references to tuples that are activated or invalidated inside the particular time interval of the associated particular partition and the foreign component comprising references to invalidations of tuples activated in the particular time interval of the associated particular partition but invalidated outside the particular time interval of the associated partition, wherein tuple activations and invalidations are represented by tuple events, the tuple events comprise at least one activation event and at least one invalidation event, the activation event occurs within a time interval of a first partition, the invalidation event occurs within a time interval of a second partition different from the first partition, and the invalidation event is stored twice: in a partial timeline index of the first partition and in a partial timeline index of the second partition;
a plurality of checkpoints, wherein a given checkpoint is associated with the given partial timeline index and comprises references to one or more tuples valid at a time interval preceding the particular time interval of the associated particular partition of the given partial timeline index;
a plurality of partial results calculated in parallel, one per partition, wherein the partial results are themselves expressed as timeline indexes; and
a global result, wherein the global result is combined from the plurality of partial results and is itself expressed as a timeline index.

15. The system of claim 14 wherein:
the references comprise a reference to the particular partition and a reference to a particular tuple within the particular partition.

16. The system of claim 14 wherein:
the partitions are associated with a respective plurality of system time intervals; and
the references to one or more tuples invalidated in a subsequent partition indicate one or more tuples invalidated outside of the system time interval associated with the particular partition.

17. The system of claim 14 further comprising:
a plurality of executable local temporal operator engines configured to accept a particular partial timeline index as input and output a partial temporal operator result as output, whereby a plurality of partial temporal operator results are generated for respective of the partial timeline indexes; and
a partial temporal operator result concentrator configured to accept the partial temporal operator results from the local temporal operator engines as input and output a global result for a temporal operator.

18. The system of claim 17 wherein the plurality of executable local temporal operator engines are executable in parallel.

19. The system of claim 17 wherein:
the temporal operator comprises a temporal join between the temporal table and an other temporal table; and
the partial temporal operator results comprise respective timeline indexes representing partial results of the temporal join.

20. One or more non-transitory computer-readable media comprising computer-executable instructions causing a computing system to perform a method comprising:
for a temporal database table distributed into a plurality of partitions representing respective time intervals according to a system time represented by a global transaction number, storing a plurality of tuple events in a plurality of distributed partial timeline indexes respectively associated with the plurality of partitions, wherein the plurality of tuple events comprise activations or invalidations, activations comprising an indication of a start time of a given tuple and a reference to the given tuple stored in a given partition, and invalidations comprising an indication of an end time of the given tuple and the reference to the given tuple, wherein the distributed partial timeline indexes respectively comprise a local component for storing tuple events that occur within their respective time intervals and a foreign component for storing tuple events that occur outside their respective time intervals, wherein the tuple events comprise at least one activation event and at least one invalidation event, the activation event occurs within a time interval of a first partition, the invalidation event occurs within a time interval of a second partition different from the first partition, and the invalidation event is stored twice: in a foreign component of a partial timeline index of the first partition and in a local component of a partial timeline index of the second partition;

storing a plurality of tuple references in a plurality of checkpoints respectively associated with the plurality of distributed partial timeline indexes, wherein a given checkpoint stores tuple references to one or more tuples valid at a time interval preceding a time interval of an associated particular partial timeline index;

calculating in parallel a plurality of partial results for a temporal operator, wherein the calculating comprises consulting one or more of the plurality of distributed partial timeline indexes and consulting one or more of the plurality of checkpoints associated with respective of the one or more of the plurality of distributed partial timeline indexes;

combining the plurality of partial results into a global result for the temporal operator, wherein the global result is expressed as a timeline index;

converting the global result expressed as a timeline index into an equivalent temporal table; and outputting the converted equivalent temporal table.

* * * * *